(12) United States Patent
Mousseau

(10) Patent No.: US 7,917,127 B2
(45) Date of Patent: *Mar. 29, 2011

(54) APPARATUS FOR CHANGING THE BEHAVIOR OF AN ELECTRONIC DEVICE

(75) Inventor: Gary P. Mousseau, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/642,587

(22) Filed: Dec. 18, 2009

(65) Prior Publication Data

US 2010/0099385 A1    Apr. 22, 2010

Related U.S. Application Data

(63) Continuation of application No. 12/133,612, filed on Jun. 5, 2008, which is a continuation of application No. 10/786,039, filed on Feb. 26, 2004, now Pat. No. 7,398,061.

(51) Int. Cl.
*H04M 3/00*    (2006.01)
(52) U.S. Cl. ............... 455/412.2; 455/412.1; 455/414.1; 455/466; 455/413; 379/201.1; 379/88.18
(58) Field of Classification Search ............... 455/414.1, 455/412.1, 413, 466
See application file for complete search history.

(56) References Cited

U.S. PATENT DOCUMENTS

| | | |
|---|---|---|
| 5,261,045 A | 11/1993 | Scully et al. |
| 5,903,845 A | 5/1999 | Buhrmann et al. |
| 5,973,612 A | 10/1999 | Deo et al. |
| 6,208,996 B1 | 3/2001 | Ben-Shachar et al. |
| 6,393,272 B1 | 5/2002 | Cannon et al. |
| 6,418,309 B1 | 7/2002 | Moon et al. |
| 6,457,062 B1 | 9/2002 | Pivowar et al. |
| 6,603,969 B1 | 8/2003 | Vuoristo et al. |
| 6,604,079 B1 | 8/2003 | Ruvolo et al. |
| 6,633,758 B1 | 10/2003 | Heinonen et al. |
| 6,662,012 B1 | 12/2003 | Do |
| 6,731,932 B1 | 5/2004 | Rune et al. |
| 6,785,868 B1 | 8/2004 | Raff |

(Continued)

FOREIGN PATENT DOCUMENTS

EP    0399520    11/1996

(Continued)

OTHER PUBLICATIONS

Olaf Drogehorn et al., "Personalised Applications on Services for a Mobile User", Autonomous Decentralized Systems, 2005, ISADS 2005, Proceedings, [Online]Apr. 4, pp. 473-479, XP002419282.

(Continued)

*Primary Examiner* — Nick Corsaro
*Assistant Examiner* — Michael T Vu
(74) *Attorney, Agent, or Firm* — Perry + Currier, Inc.

(57) ABSTRACT

A novel apparatus and method for changing the behavior of an electronic device is provided. In an embodiment, an electronic device includes the functionality of a cellular phone, a voice mail system and a calendar application. The device is configured to use the calendar application to determine whether to direct a phone call to the user or whether to instantly direct the call to voice mail.

13 Claims, 44 Drawing Sheets

U.S. PATENT DOCUMENTS

| | | |
|---|---|---|
| 6,928,300 B1 | 8/2005 | Skinner et al. |
| 6,990,333 B2 | 1/2006 | Andrew et al. |
| 6,999,731 B2 | 2/2006 | Cronin |
| 7,076,275 B1 | 7/2006 | Karstens et al. |
| 7,092,925 B2 | 8/2006 | Na et al. |
| 7,181,689 B2 | 2/2007 | Mock et al. |
| 7,184,786 B2 * | 2/2007 | Mumick et al. ............... 455/466 |
| 7,243,130 B2 | 7/2007 | Horvitz et al. |
| 7,248,900 B2 | 7/2007 | Deeds |
| 7,263,353 B2 | 8/2007 | Forsberg et al. |
| 7,283,831 B2 | 10/2007 | Caldini et al. |
| 2002/0032040 A1 | 3/2002 | Tsukamoto |
| 2002/0115429 A1 | 8/2002 | Deluca et al. |
| 2002/0116541 A1 | 8/2002 | Parker et al. |
| 2002/0136368 A1 | 9/2002 | Aoki et al. |
| 2002/0142792 A1 | 10/2002 | Martinez |
| 2002/0165969 A1 | 11/2002 | Gallant |
| 2003/0043765 A1 | 3/2003 | Dawidowsky et al. |
| 2003/0050982 A1 | 3/2003 | Chang |
| 2003/0064746 A1 | 4/2003 | Rader et al. |
| 2003/0131023 A1 | 7/2003 | Bassett et al. |
| 2003/0143954 A1 | 7/2003 | Dettinger et al. |
| 2003/0153368 A1 | 8/2003 | Bussan et al. |
| 2003/0176188 A1 | 9/2003 | O'Neil |
| 2004/0058718 A1 | 3/2004 | Yu |
| 2004/0082317 A1 | 4/2004 | Graefen |
| 2004/0086094 A1 * | 5/2004 | Bosik et al. ............... 379/88.12 |
| 2004/0127203 A1 | 7/2004 | Markki et al. |
| 2004/0198427 A1 | 10/2004 | Kimbell et al. |
| 2004/0203643 A1 * | 10/2004 | Bhogal et al. ............... 455/414.1 |
| 2004/0203644 A1 | 10/2004 | Anders et al. |
| 2004/0203768 A1 | 10/2004 | Ylitalo et al. |
| 2004/0259535 A1 | 12/2004 | Elsey et al. |
| 2004/0268270 A1 | 12/2004 | Hill et al. |
| 2005/0009547 A1 | 1/2005 | Harris et al. |
| 2005/0079863 A1 | 4/2005 | Macaluso |
| 2005/0080862 A1 | 4/2005 | Kent |
| 2005/0096048 A1 | 5/2005 | Clare et al. |
| 2005/0136903 A1 | 6/2005 | Kashima et al. |
| 2005/0164704 A1 | 7/2005 | Winsor |
| 2005/0180362 A1 | 8/2005 | Chin et al. |
| 2005/0260989 A1 | 11/2005 | Pourtier et al. |
| 2005/0289202 A1 | 12/2005 | S et al. |
| 2006/0020804 A1 | 1/2006 | Schleifer et al. |
| 2006/0030315 A1 | 2/2006 | Smith et al. |
| 2006/0099945 A1 | 5/2006 | Helvick |
| 2006/0112427 A1 | 5/2006 | Shahbazi |
| 2006/0190547 A1 | 8/2006 | Bhogal et al. |
| 2006/0223528 A1 | 10/2006 | Smith |
| 2007/0016646 A1 | 1/2007 | Tendjoukian et al. |
| 2007/0032225 A1 | 2/2007 | Konicek et al. |
| 2007/0061712 A1 | 3/2007 | Bodin et al. |
| 2007/0099599 A1 | 5/2007 | Smith et al. |
| 2007/0184858 A1 | 8/2007 | Landschaft et al. |
| 2007/0275767 A1 | 11/2007 | Steele |
| 2008/0200154 A1 | 8/2008 | Maharajh et al. |
| 2008/0307323 A1 | 12/2008 | Coffman et al. |
| 2009/0270068 A1 | 10/2009 | Ahopelto et al. |
| 2010/0222043 A1 | 9/2010 | Dragt |

FOREIGN PATENT DOCUMENTS

| | | |
|---|---|---|
| EP | 1185058 A2 | 3/2002 |
| EP | 1217532 A2 | 6/2002 |
| EP | 1220521 A2 | 7/2002 |
| EP | 1259053 | 11/2002 |
| EP | 1569127 A1 | 8/2005 |
| WO | 97/47120 A2 | 12/1997 |
| WO | 00/62201 A | 10/2000 |
| WO | 02/44958 A | 6/2002 |
| WO | 03/026259 A1 | 3/2003 |
| WO | 03/056791 | 7/2003 |
| WO | 2005/116892 A | 12/2005 |

OTHER PUBLICATIONS

The Information Technology Department Presents Outlook Tips, vol. 2, Sep. 2002.

Intellectual Property Office of Singapore, Search Report dated Dec. 8, 2009.

Canadian Patent Application No. 2,615,313 Office Action dated Sep. 9, 2010.

* cited by examiner

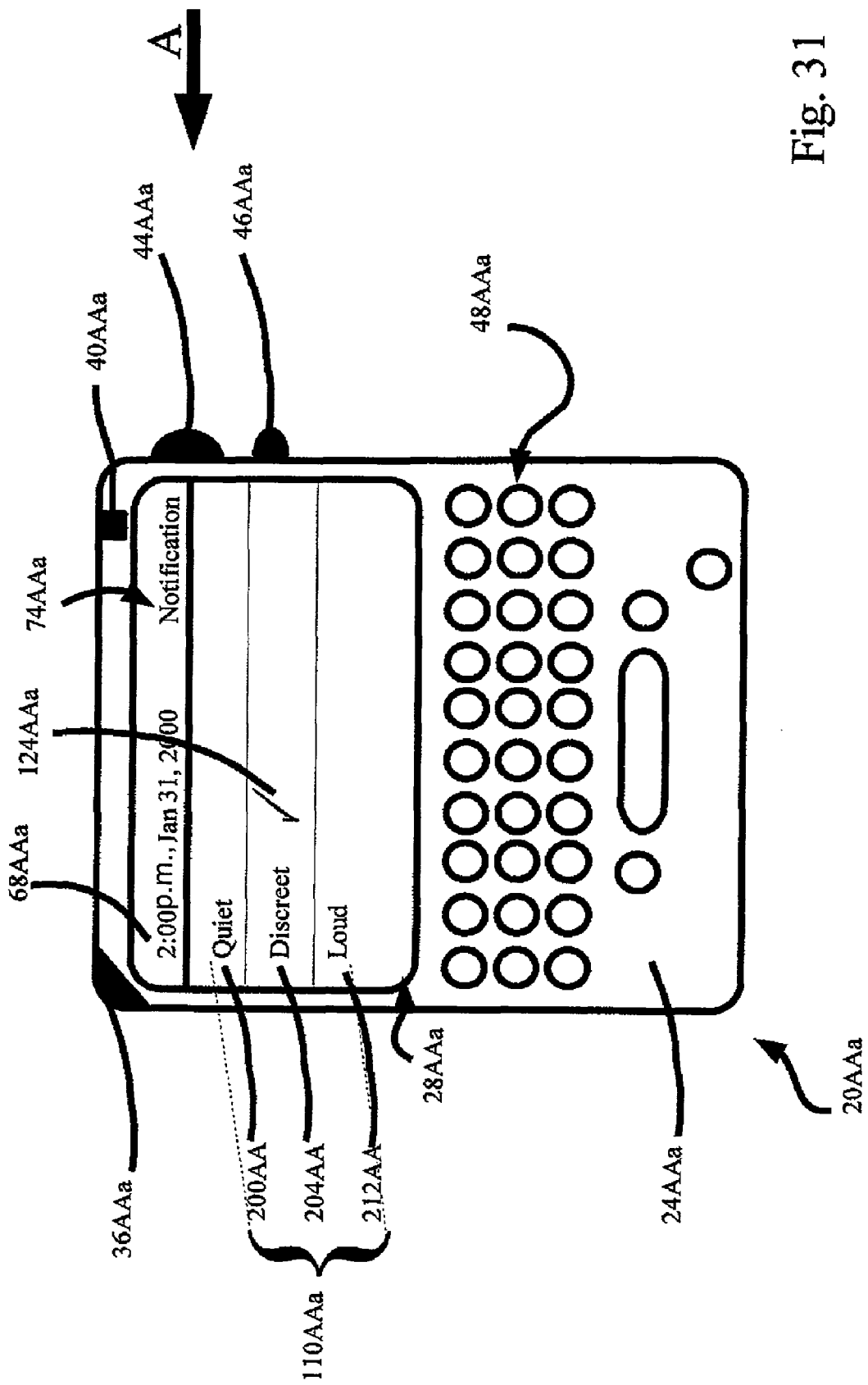

APPARATUS FOR CHANGING THE BEHAVIOR OF AN ELECTRONIC DEVICE

CROSS-REFERENCE TO RELATED APPLICATION

This is a continuation of U.S. patent application Ser. No. 12/133,612, filed Jun. 5, 2008, which is a continuation of U.S. patent application Ser. No. 10/786,039, filed Feb. 26, 2004, the contents of both are incorporated herein by reference.

FIELD OF INVENTION

The present application relates generally to electronic devices and more particularly to a method for changing the behavior of an electronic device.

BACKGROUND OF THE INVENTION

The world has grown accustomed to the presence of mobile telephonic devices (MTD) such as cell phones and phone-based Personal digital assistants (PDA's). These devices function in a wireless network where one or more such devices communicate using voice or data to each other or to external services. Services can include making external phone calls to land-line voice networks, making phone calls to other cell phones, leaving or retrieving voice mail messages or exchanging data messages. Despite the prevalence of MTD's, however, more and more people are finding problems with MTD's as they interrupt people at inopportune times to notify the user of various events such as the receiving of a phone call. MTD's can, for example, ring a number of times before the user responds, the call ends, or the call goes to voice mail. Such ringing, although useful in alerting users of various events, can also be a source of constant interruption, annoyance and even embarrassment. For example, cell phones ring loudly in the middle of lectures, exams, movies, performances or various ceremonies, causing embarrassment to the user of the device, interrupting the event and distracting the other participants. Moreover, in circumstances where there is a live performance, a lecture or an actual person performing a ceremony, the ringing (or any other loud method of notification) distracts the lecturer or the performer and can ruin the event.

These problems have become so widespread that organizers of events have started speaking out and some have started taking precautions. For example, most lectures and movie theatres post signs asking people to turn off their cell phones and personal digital devices. Also, it is not uncommon for the chair of meetings, or the first speaker of any proceeding to politely remind all participants to turn off their cell phones or other electronic devices.

In an effort to solve this problem, manufacturers have come up with different mechanisms where users can swiftly turn notification off, for example, by pressing an icon or a special key to stop notification or they can request all calls be forwarded to voice mail. However, although this mechanism puts a stop to the interruption, by the time the user has a chance to turn notification off, the event is already interrupted.

In another effort to solve this problem, manufacturers have come up with devices that have different modes of notification, such as vibrations and visual alerts, so that users can change the mode of notification when attending functions where interruptions are a serious problem. However, one of the shortcomings of these devices is that the user has to remember to manually change the method of notification at the right time. Many users do not put their mind to changing the method of notification, until the device goes off in the middle of the event and causes the embarrassments, interruptions and distractions described above. Moreover, in an effort to change the method of notification, users may mistakenly choose an even louder or just as distractive mode of notification and do not notice their mistake until the device goes off and interrupts the event.

Another problem is that if the user has set the MTD to a quiet mode and does not intend to answer any calls, the caller is forced to wait on the line for several rings until the call can be re-routed to a voice mail server within the network structure, and the caller is able to leave a voice mail. This can be very frustrating for callers, who, for example, may know the person is unavailable and are only interested in leaving a voice mail. As a result, such callers may give up and hang up, and the user and caller miss an opportunity to communicate.

It is known to provide means for recording a voice mail both at a switch or other location operated by the service provider or to record the voice mail locally at a telephone voice mail or locally at a wireless telephone device. See WO 02/05527, entitled "Method and System for Call Answering", assigned to Soma Networks, Inc., the contents of which are incorporated herein by reference. WO 02/05527 is, however, primarily directed to bandwidth optimization and does not address the problems of certain unwanted interruptions. Despite the various means for recording a voice mail, it is still common for devices to ring before rolling to voice mail, thereby interrupting the event, unless the subscriber remembers to turn off the device, or otherwise effect forward settings to force incoming calls directly to voice mail.

Additionally, electronic devices can provide a variety of functions including notifying users of various events throughout the day. As mentioned, events that can require notification include receiving a telephone call by a cell phone or a regular telephone. Other events can include receiving an e-mail or fax by a chiming of the daily alarm or alarm notifying the user of an upcoming appointment.

Although notifications are useful in alerting users of various events, they can also be a source of constant interruption, annoyance and even embarrassment. Users of devices with notification functions can face constant interruption and distraction as the devices ring or vibrate loudly at inappropriate times and places. For example, cell phones ring loudly in the middle of lectures, exams, movies, meetings, performances or various ceremonies. Such inopportune ringing causes embarrassment for the user of the device, interrupts the event and distracts the other participants. Moreover, in circumstances where there is a live performance, a lecture or an actual person performing a ceremony, the ringing (or any other loud method of notification) distracts the lecturer or the performer and can ruin the event. Another example is the chiming of the notification function on an electronic device during an important meeting, perhaps in the middle of an intense conversation or during court proceedings or cross-examination of witnesses. Once again, the chiming of the notification function can cause embarrassment to the owner of the device, can interrupt the mood of the event and can generally disrupt the entire event.

These problems have become so widespread that organizers of events have started speaking out and some have started taking precautions. For example, most lectures and movie theatres post signs asking people to turn off their cellular phones and personal digital devices. Also, it is not uncommon for the chair of meetings, or the first speaker of any proceeding to politely remind all participants to turn off their cell phones or other electronic devices.

In an effort to solve this problem, manufacturers have come up with devices that have different modes of notification, such as vibrations and visual alerts, so that users can change the mode of notification if they are attending functions where interruptions are a serious problem. However, these devices fall short of solving the problem of audible notifications in inappropriate times and offer only a limited control for the user to reduce the problem. One of the short comings is that the user has to remember to manually change the method of notification at the right time. Many users do not put their mind to changing the method of notification, until the device goes off in the middle of the event causing the embarrassments, interruptions and distractions described above. Moreover, in an effort to quickly change the method of notification, users may mistakenly choose an even louder or just as distractive mode of notification and do not notice their mistake until the device goes off in the middle of the event, causing the same embarrassments, interruptions and distractions referred to above. The user needs to manually invoke these alternative notification methods each time s/he wants to change the method of notification. Another problem arises because the mode of notification does not get switched back to the "default" mode after the event is over. The user has to remember to turn notification back on to "default mode". Many users forget to turn notification back to the "default mode" and end up missing important appointments, phone calls or voice-mails. Further, the user may turn off the device prior to the event, and may forget to turn the device back on, causing notifications to be visible instead of audible. This may have consequences for users that are very dependant on their electronic devices.

SUMMARY OF THE INVENTION

It is an object to provide a novel system, apparatus and method for changing the behavior of an electronic device that obviates or mitigates at least one of the above-identified disadvantages.

According to one aspect, there is provided a computing device comprising a microcomputer that receives live communications and processes various events in the device. Whenever the live communication is received during one of these events, the device makes a determination as to whether to accept the live communication, reject the communication and/or direct it to a message application. This determination is made based on a set of criteria that can be associated with the event or that can be associated with a combination of the event and the live communication. Examples of such criteria include time and duration of an event and/or communication, whether the event and/or communication include a predefined string or whether the communication is being originated from a predefined person or location.

The live communication can be any type of communication that is live and enables at least two people to communicate in real-time. Telephone calls and "instant text messages" such as those found in "chat" systems are examples of live communications. Similarly the message application can consist of any type of voice mail application or text messaging system such as pagers or email and can be either internal or external to the device.

It is contemplated that the microprocessor be operable to execute the voicemail application and the device include a storage device to store live communications whenever live communications are directed to the voice mail application. It is further contemplated that the criterion used to direct the live communication to the voice mail application be based on at least one criterion that is associated with either the live communication and/or the event. The voice mail application can be capable of automatically accepting the incoming caller, playing a selected outgoing message and recording the incoming voice for a pre-determined length of time. As a variation, different steps can be taken with the same effect of eliminating, or reducing, interruptions to the user. For example after automatically accepting the call and playing the out going message, the call could be re-routed to another device to record the incoming voice. As a still further variation, after auto-accepting the incoming caller and playing an outgoing message the user is told they can leave a call back number using Dual Tone Multi Frequency ("DTMF") tone sequences. This later case might be useful if the computing device is running out of memory and wants to conserve memory.

It is also contemplated that the event can be an appointment in a calendar application or that it can be a task in a task application. The electronic device itself can be a cell phone, a smart telephone, a desktop computer or a laptop having telephony equipment and a personal digital assistant with cell phone features.

BRIEF DESCRIPTION OF THE DRAWINGS

Certain embodiments will now be described, by way of example only, with reference to the attached figures, wherein:

FIG. 31 is a schematic representation of another embodiment with the notification setup application displaying a plurality of methods of notification;

DETAILED DESCRIPTION OF THE INVENTION

Figure 1:
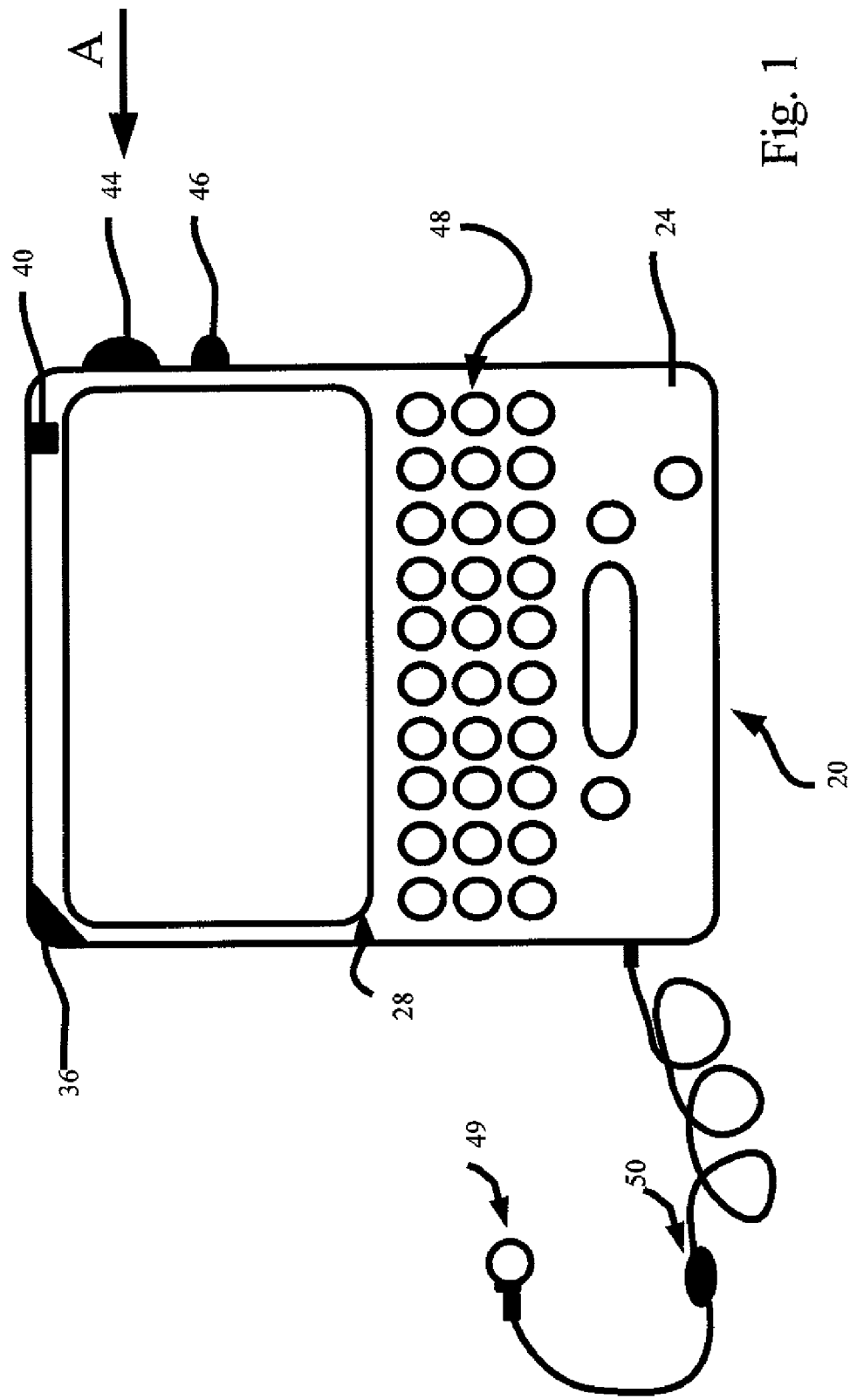
FIG. 1 is a schematic representation of an electronic device in accordance with an embodiment.

Referring to FIG. 1, an electronic device for modifying notifications, in accordance with an embodiment of the invention is indicated generally at 20. In the present embodiment, electronic device 20 is based on the computing environment and functionality of an enhanced personal digital assistant with cell phone features. It is, however, to be understood that electronic device 20 can be based on the construction and functionality of other electronic devices, such as smart telephones, desktop computers or laptops having telephony equipment. In a present embodiment, electronic device 20 includes, a housing 24, which frames an LCD display 28, a speaker 36, an LED indicator 40, a trackwheel 44, an exit key 46 and key pad 48 and a telephone headset comprised of an ear bud 49 and a microphone 50. Trackwheel 44 and exit key 46 can be inwardly depressed along the path of arrow "A" as a means to provide additional user-input. It will be understood that housing 24, can be made from any suitable material as will occur to those of skill in the art. Device 20 is operable to conduct wireless telephone calls, using any known wireless phone system such as a Global System for Mobile Communications ("GSM") system, Code Division Multiple Access ("CDMA") system, Cellular Digital Packet Data ("CDPD") system and Time Division Multiple Access ("TDMA") system. Other wireless phone systems can include Bluetooth and the many forms of 802.11 wireless broadband, like 802.11a, 802.11b, 802.11g, etc that can support voice. Other embodiments include Voice Over IP (VoIP) type streaming data communications that can simulate circuit switched phone calls. Ear bud 49 can be used to listen to phone calls and other sound messages and microphone 50 can be used to speak into and input sound messages to device 20.

Figure 2:
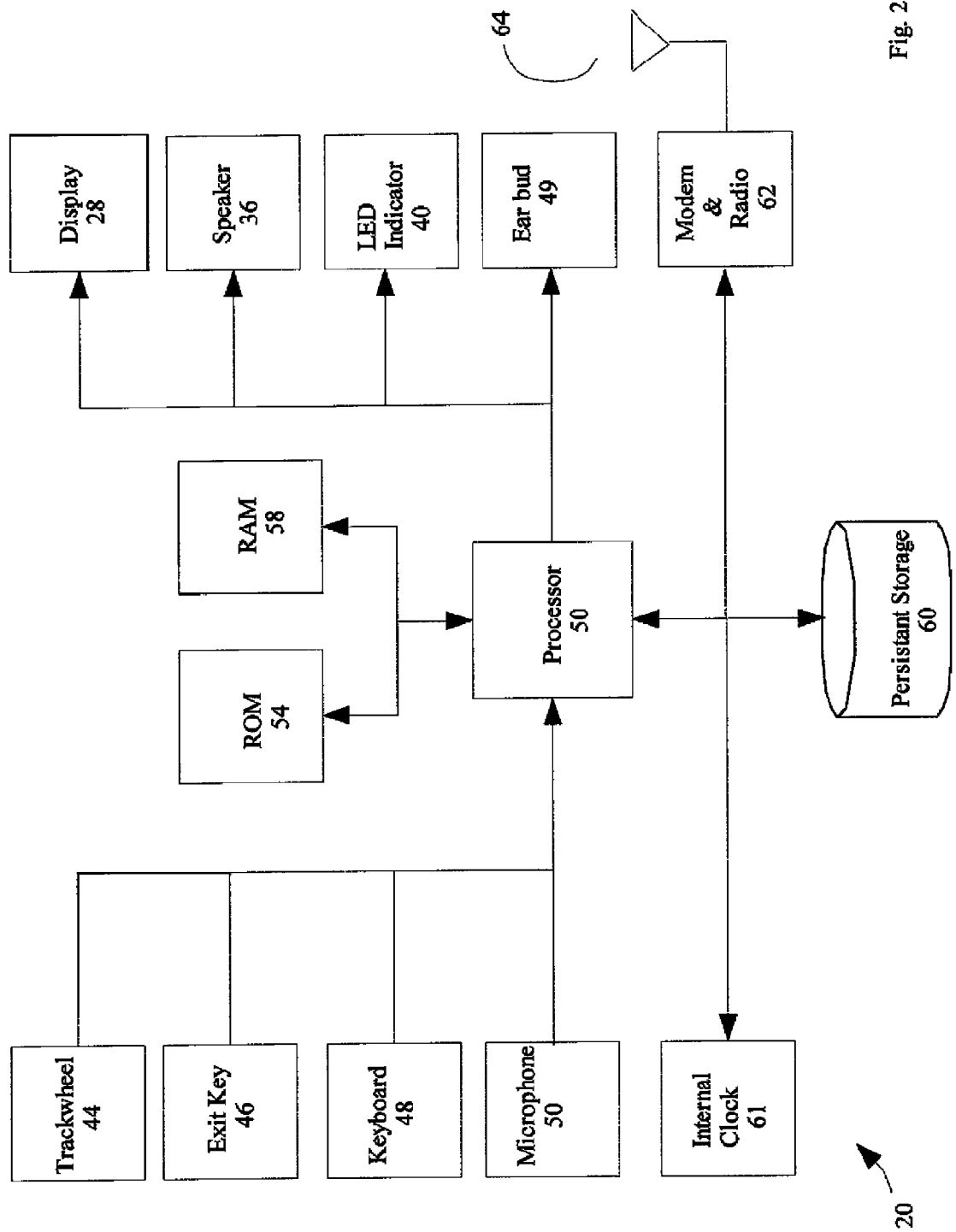
FIG. 2 is a block diagram of certain internal components within the device in FIG. 1.

Referring now to FIG. 2, a block diagram of certain internal components within device 20 is shown. Device 20 is based on a microcomputer that includes a processor 50 that is connected to a read-only-memory ("ROM") 54, which contains a plurality of applications executable by processor 50 that enables device 20 to perform certain functions. Processor 50 is also connected to a random access memory unit ("RAM") 58 and a persistent storage device 60, which are responsible for various nonvolatile storage functions of device 20. Processor 50 can send output signals to various output devices including display 28, speaker 36, LED indicator 40, and ear bud 49, each of which generate specific outputs as instructed by processor 50. Processor 50, can also receive input from various input devices including trackwheel 44, exit key 46, keyboard 48, and microphone 50. Processor 50 is also connected to an internal clock 61 and a modem and radio 62. Modem and radio 62 can be connected to various wireless networks through an antenna 64. As will be explained further below, persistent storage device 60 is open to share incoming voicemail message for device 20.

Figure 3:
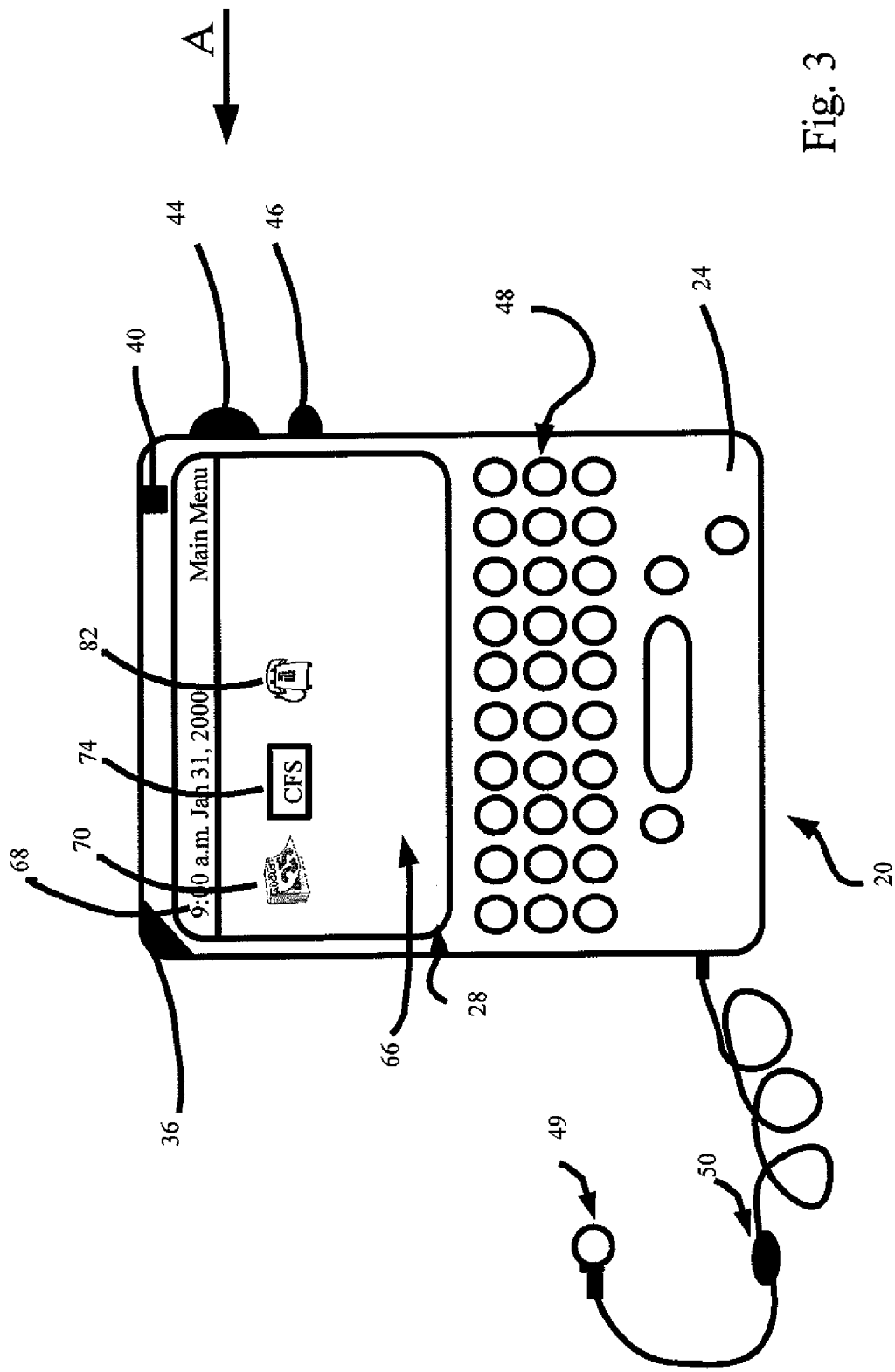
FIG. 3 shows the device of FIG. 1 with the main menu screen displaying a plurality of applications including a calendar, a call-forwarding setup and a phone call manager.

Device 20 is operable to execute various applications stored in ROM 54. Referring now to FIG. 3, device 20 is shown with a main menu screen 66, that displays a system clock 68 which is updated according to internal clock 61. Main menu screen 66 also displays a plurality of applications that are executable on processor 50. In a present embodiment, such displayed applications include a calendar 70, a C.F.S. 74 and a P.C.M. 82. When executed on processor 50, these applications cause device 20 to operate in various ways, as will be discussed further below. Trackwheel 44 can be used to scroll through the applications and to select a desired application by pressing inwardly, along the path of arrow A, on trackwheel 44. Exit key 46 can be used to exit any application by pressing inwardly, along the path of arrow A, on exit key 46.

Figure 4:
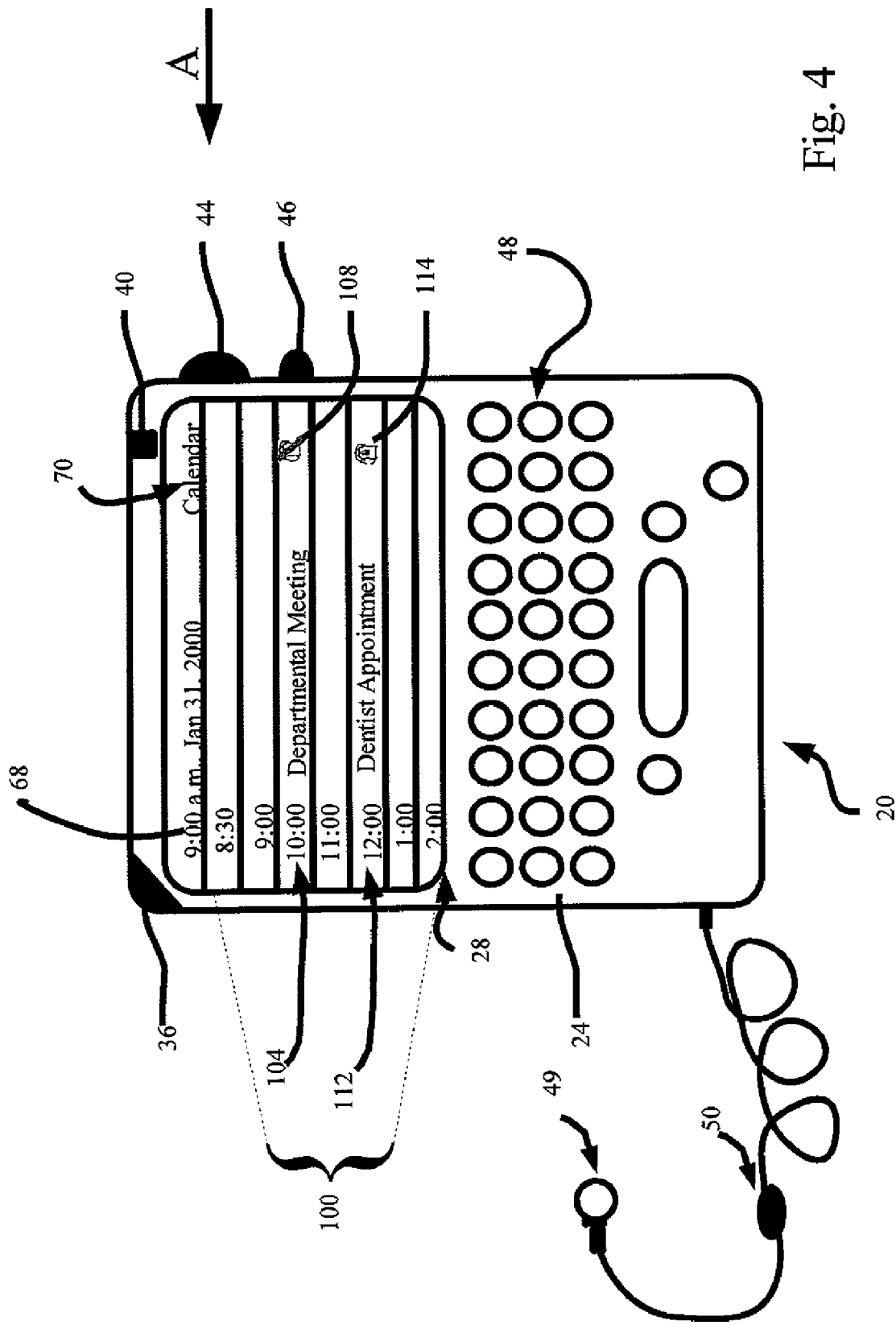
FIG. 4 shows the device of FIG. 1 with the calendar application displaying a plurality of individual appointments for the date of Jan. 31, 2000.

Referring now to FIG. 4, device 20 is shown displaying the day's schedule 100 for Jan. 31, 2000, using the application called calendar 70 on display 28. Schedule 100 includes a plurality of individual appointments 104 and 112. As illustrated in FIG. 4, appointment 104 is a departmental meeting, from 10:00-11:00 a.m., and appointment 112 is a dentist appointment, from 12:00-1:00 p.m. Appointment 104 has a "no-telephone" icon 108 associated with it, while appointment 112 has a telephone icon 114 associated with it.

Figure 5:
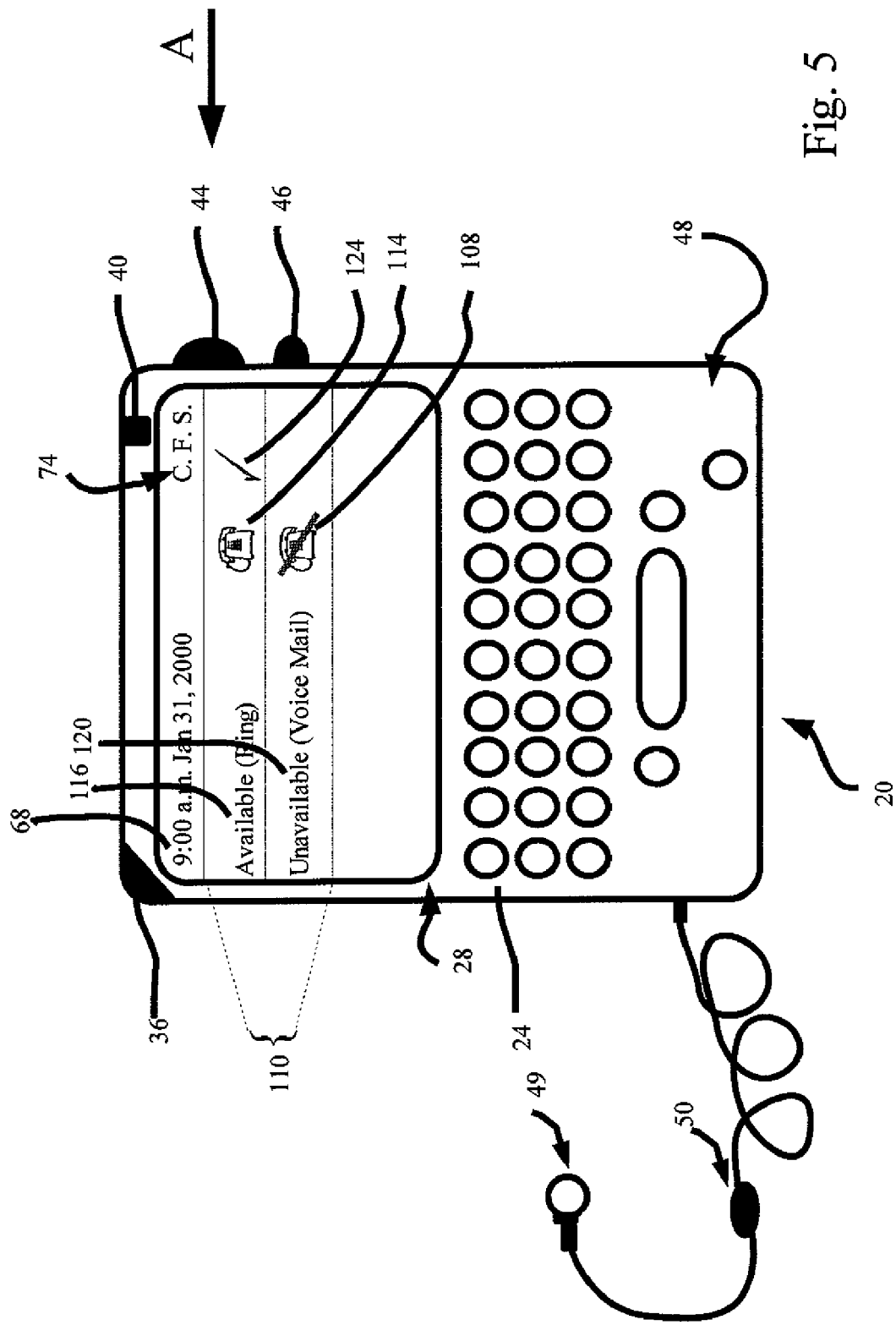
FIG. 5 shows the device of FIG. 1 with the call-forwarding setup application displaying a plurality of modes of operation.

Referring now to FIG. 5, device 20 is shown displaying different call-handling options 110 using the application called C.F.S. 74 on display 28, comprising an "Available (Ring)" mode 116 and an "Unavailable (Voice Mail)" mode 120. For this embodiment (Ring) mode 116 is associated with telephone icon 114 and Unavailable (Voice Mail) mode 120 is associated with "no-telephone" icon 108. As shown in FIG. 5, there is a "check-mark" 124 beside telephone icon 114, indicating that the default mode of operation of device 20 is Available (Ring) mode 116. This means that if device 20 was to receive an incoming phone call, the default mode of operation of device 20 would be to make the call available to the user by having the phone ring in the usual manner. Using trackwheel 44, check-mark 124 can be placed beside "no-telephone" icon 108, indicating that the default mode of operation is Unavailable (Voice Mail) mode 120. Once the default mode of operation is set to Unavailable (Voice Mail) mode 120, it would be assumed that the user of device 20 is "unavailable" and, in the event of an incoming phone call, the device would go straight to voice mail.

Figure 6:
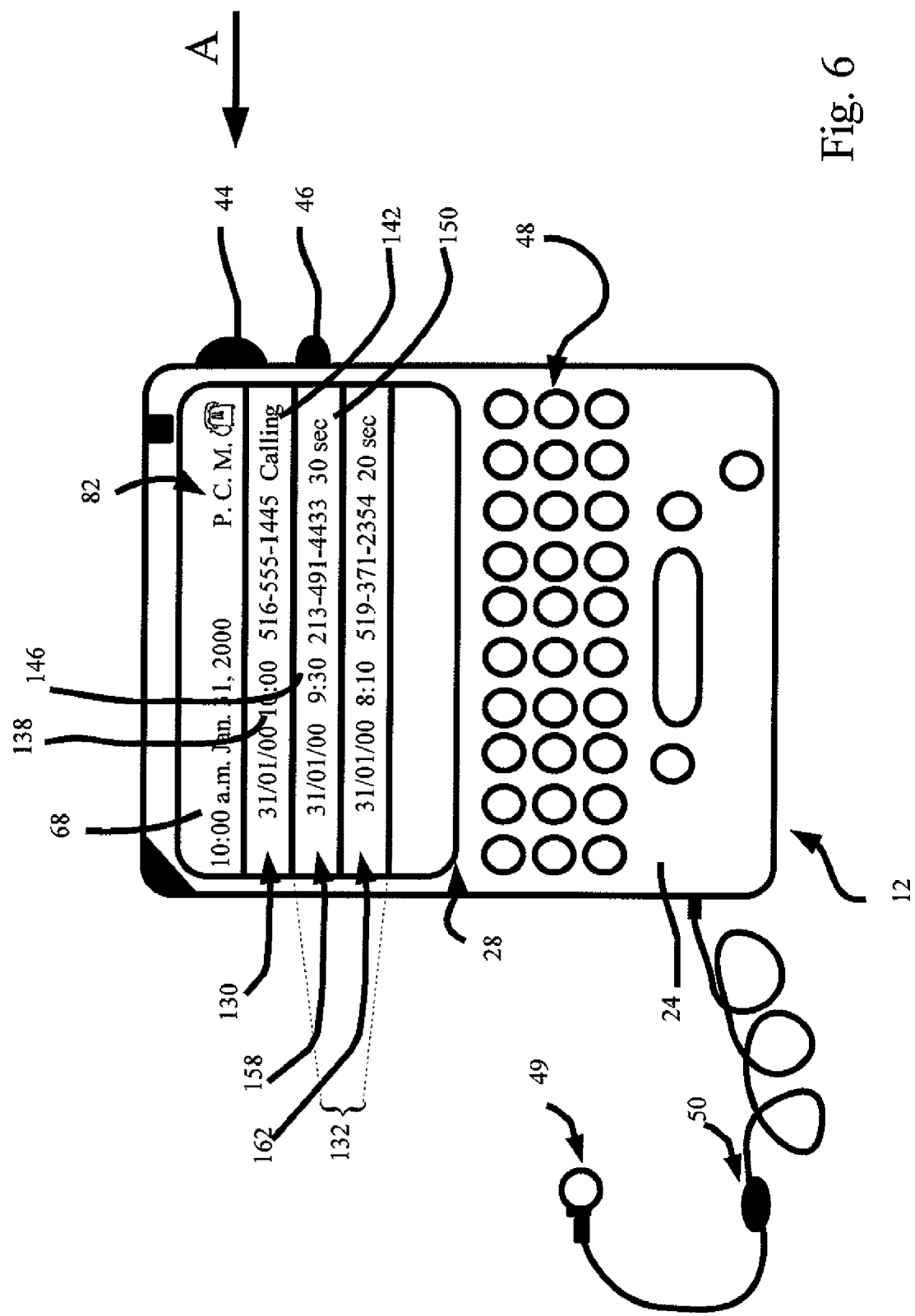
FIG. 6 shows the device of FIG. 1 with the phone call manager application displaying an incoming phone call at 10:00 a.m. on Jan. 31, 2000, as well as, a plurality of voice mail recordings.
Figure 7:
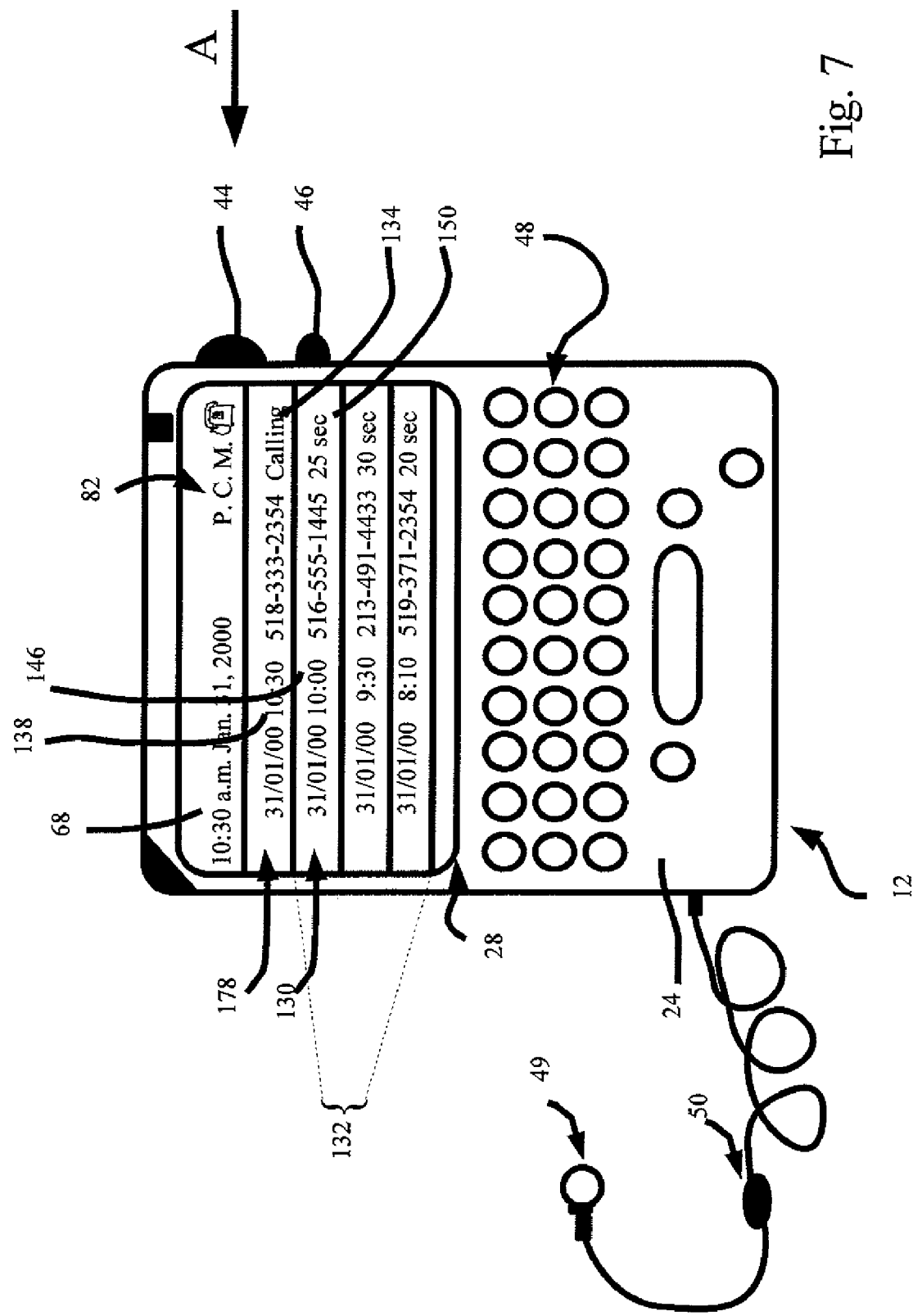
FIG. 7 shows the device of FIG. 1 with the phone call manager application having received an incoming phone call at 10:30 a.m. on Jan. 31, 2000.

Referring now to FIG. 6, device 20 is shown displaying (a representation of) an incoming phone call ("phone call") 130 and (a representation of) a plurality of previously recorded voice mails ("voice mails") 132, using the application called P.C.M. 82 on display 28. Phone call 130 is received through a wireless network (not shown), that connects to device 20 via modem and radio 62 through antenna 64. P.C.M. 82 includes a voice mail function such that, if a phone call 130 goes unanswered, or if C.F.S. 74 is set to Unavailable ("Voice Mail"), the caller is able to leave a voice mail and such that (the representation of) incoming phone call 130 on screen 28 is recorded as a voice mail 132, that is recorded locally on device 20 and saved on persistent storage device 60. (As previously mentioned there can also be additional steps taken on the incoming caller, such as playing an outgoing message, or re-routing the caller to an alternative voice recording device.) Phone call 130 has a series of information associated with it, including, time of receipt 138 and a description of the status of the call 142. Similarly, each voice mail recording 132 has a series of information associated with it, including time of recording 146 and the duration 150 of each voice mail in seconds. Trackwheel 44 can be used to scroll through individual voice mails 132 on device 20, and inwardly depress to get access to and listen to each individual voice mail 132. Similarly, exit key 46 can be inwardly depressed to skip the unheard part of the recording and/or exit an individual voice mail 132. For example in FIG. 6, it is shown that phone call 130 is being received by device 20 at 10:00 a.m., voice mail 158 was recorded at 9:30 a.m. and is 30 seconds long and voice mail 162 was recorded at 8:10 a.m. and is 20 seconds long. In FIG. 7, it is shown that phone call 130 was unanswered, the caller left a message and phone call 130 is now represented on the screen by a voicemail that is 25 seconds long.

A method for modifying notifications will now be discussed with reference to the flow chart shown in FIG. 8 and is indicated generally at 500. In order to assist in the explanation of method 500, reference will be made to the foregoing discussion of device 20. In order to further assist in the explanation of method 500, the sequence of steps in method 500 shall be followed in connection to a series of examples using device 20. In these examples, it will be assumed that device 20 receives a series of phone calls at different times during the day.

Figure 8:
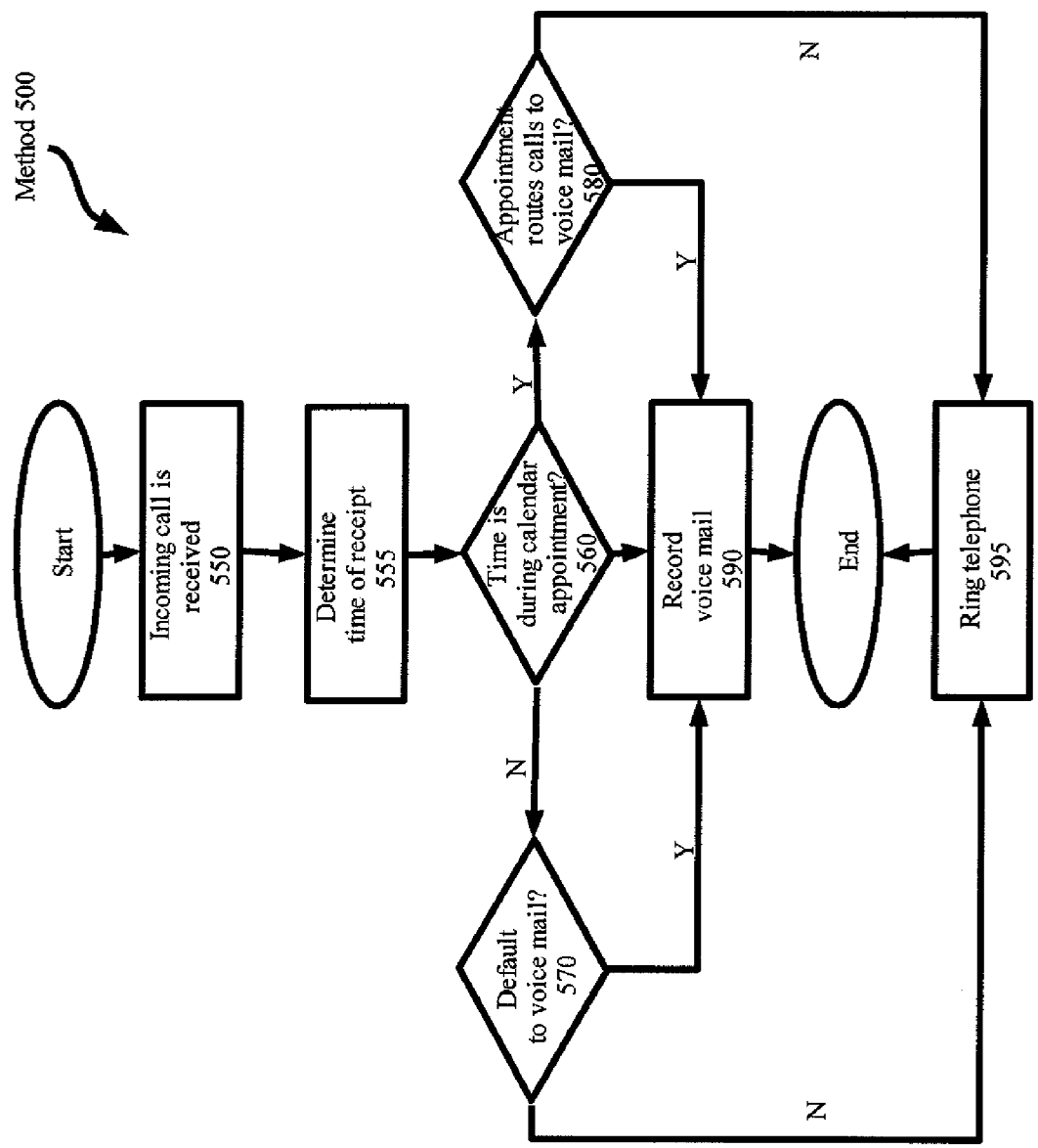
FIG. 8 shows a flow chart depicting a method for changing the behavior of an electronic device in accordance with another.
Figure 9:
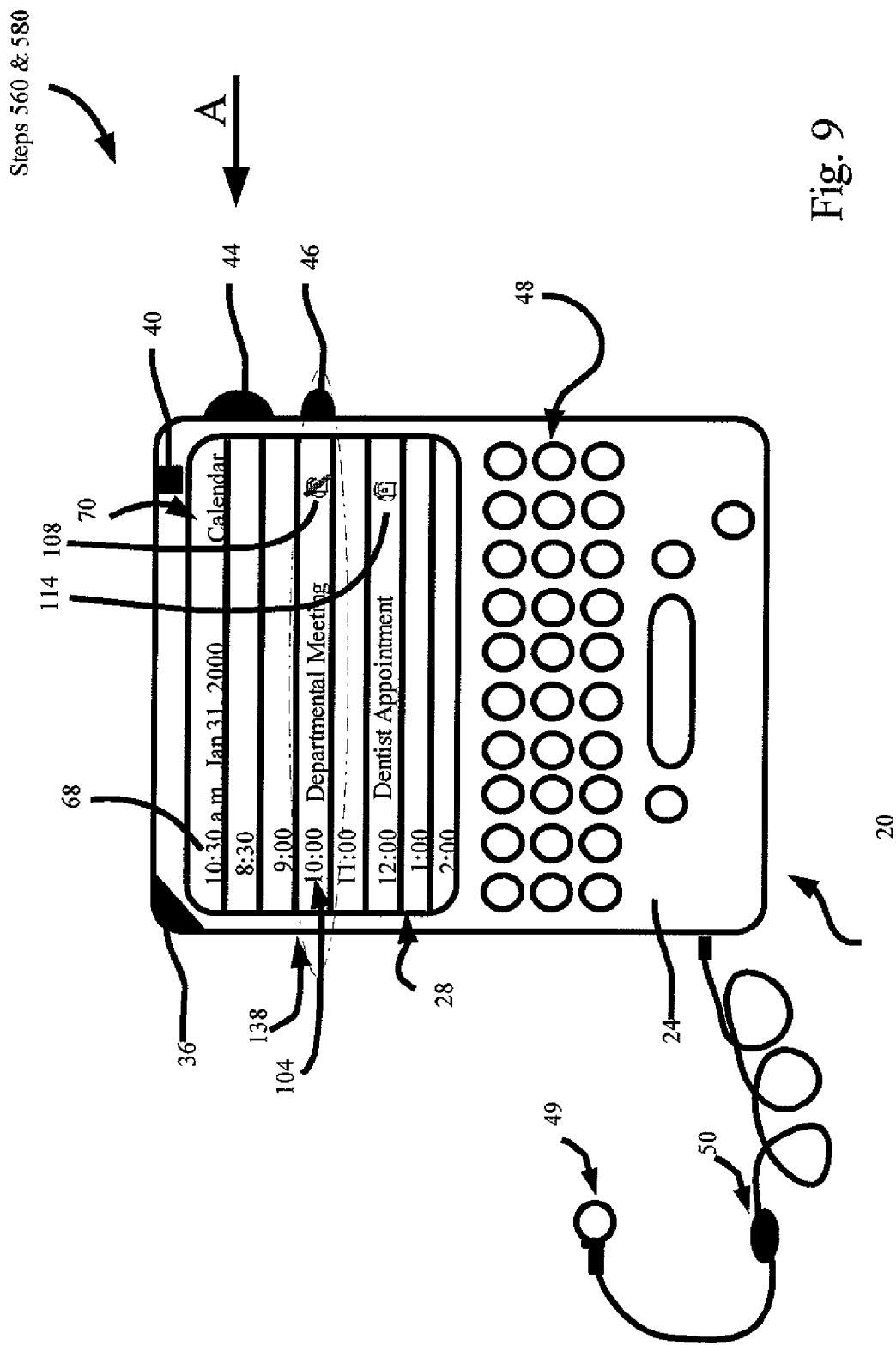
FIG. 9 shows the device of FIG. 1 with the calendar application, showing that at 10:30 a.m. on Jan. 31, 2000, the user of the device is at a departmental meeting.
Figure 10:
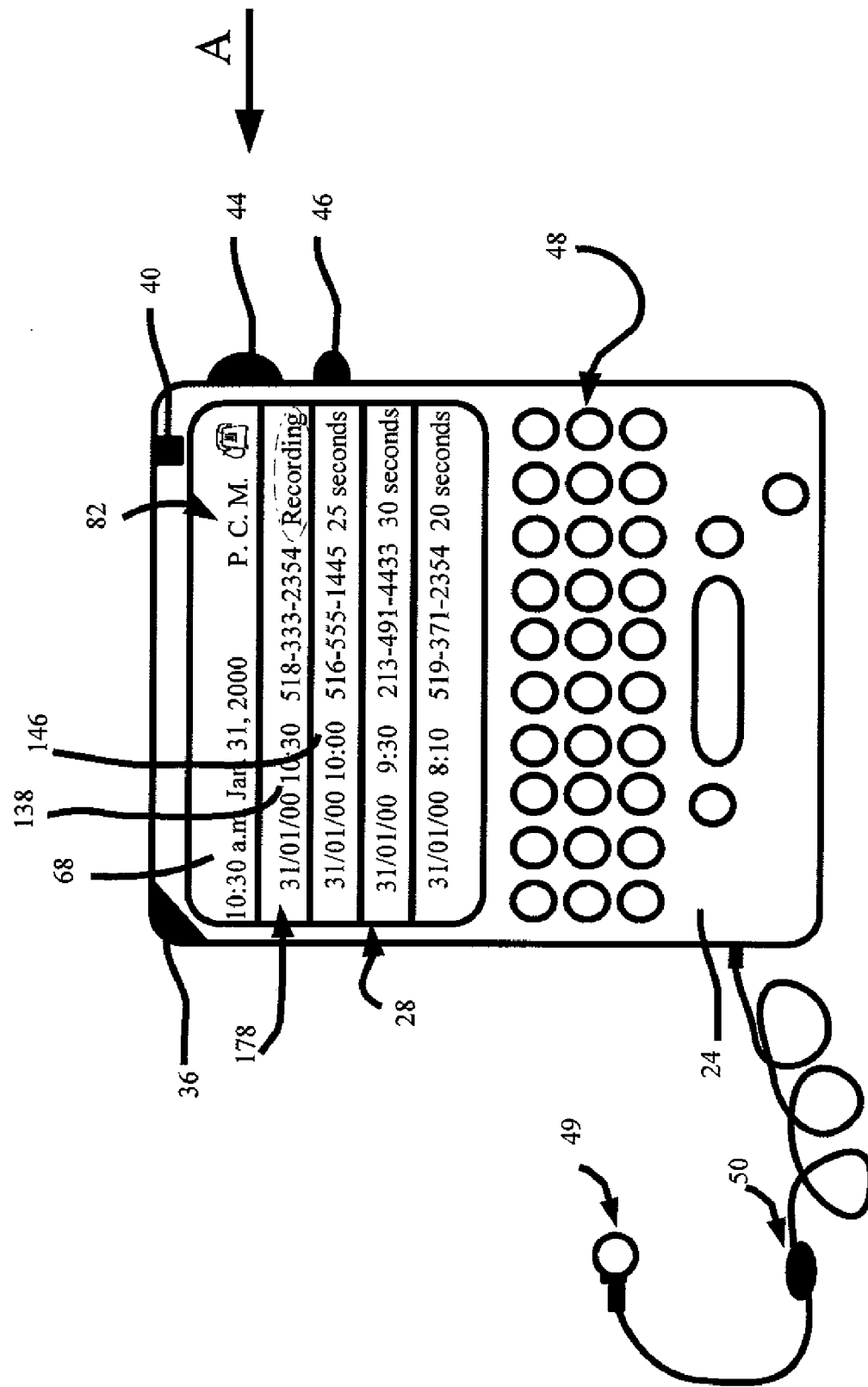
FIG. 10 shows the device of FIG. 1 with the phone call manager application recording a voice mail corresponding to the incoming phone call in FIG. 7.

As demonstrated in the flow chart in FIG. 8, a phone call is received by device 20 at step 550. In the case of the present example, and referring now back to FIG. 7, it will be assumed that the phone call received is phone call 178. At step 555, the time of receipt 138 of the phone call is determined. Referring to FIG. 7, time of receipt 138 of phone call 178, is determined to be 10:30 a.m. At this point, the method advances to step 560 where it is determined whether time of receipt 138 is during any of the appointments marked in calendar 70. If time of receipt 138 is during one of such appointments, the method then advances to step 580. However, if time of receipt 138 is not during any of these times, the method advances to step 570. In connection with phone call 178, and referring now to FIG. 9, it is determined that time of receipt 138 is during appointment 104 and the method, advances to step 580. At step 580, it is determined whether the appointment, with which time of receipt 138 is associated, is designated as Available (Ring) 116 or Unavailable (Voice Mail) 120. If the appointment, with which time of receipt 138 is associated, has telephone icon 114 associated with it, then the method proceeds to step 595 and device 20 rings to notify the user of the incoming phone call. If however, the appointment with which time of receipt 138 is associated with has "no-telephone" icon 108 associated with it, then the method proceeds to step 590 and the phone call is directly routed to voice mail. In the case of phone call 178, since appointment 104 is associated with "no-telephone" icon 108, referring now to FIG. 10, the method advances to step 590 and the phone call is directly routed to voice mail. At this point method 500 ends.

Figure 11:
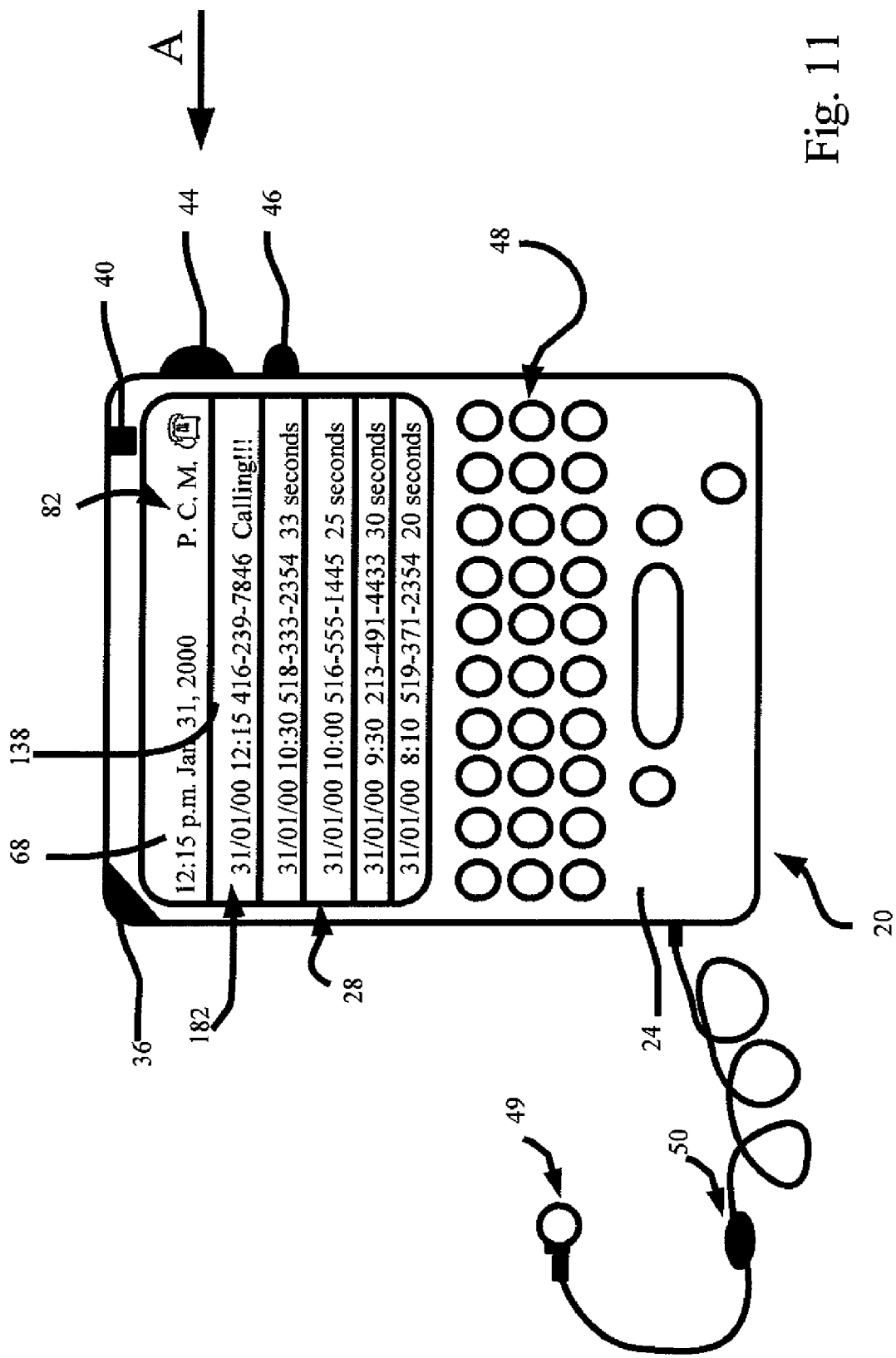
FIG. 11 shows the device of FIG. 1 with the phone call manager application having received an incoming phone call at 12:15 p.m. on Jan. 31, 2000.
Figure 12:
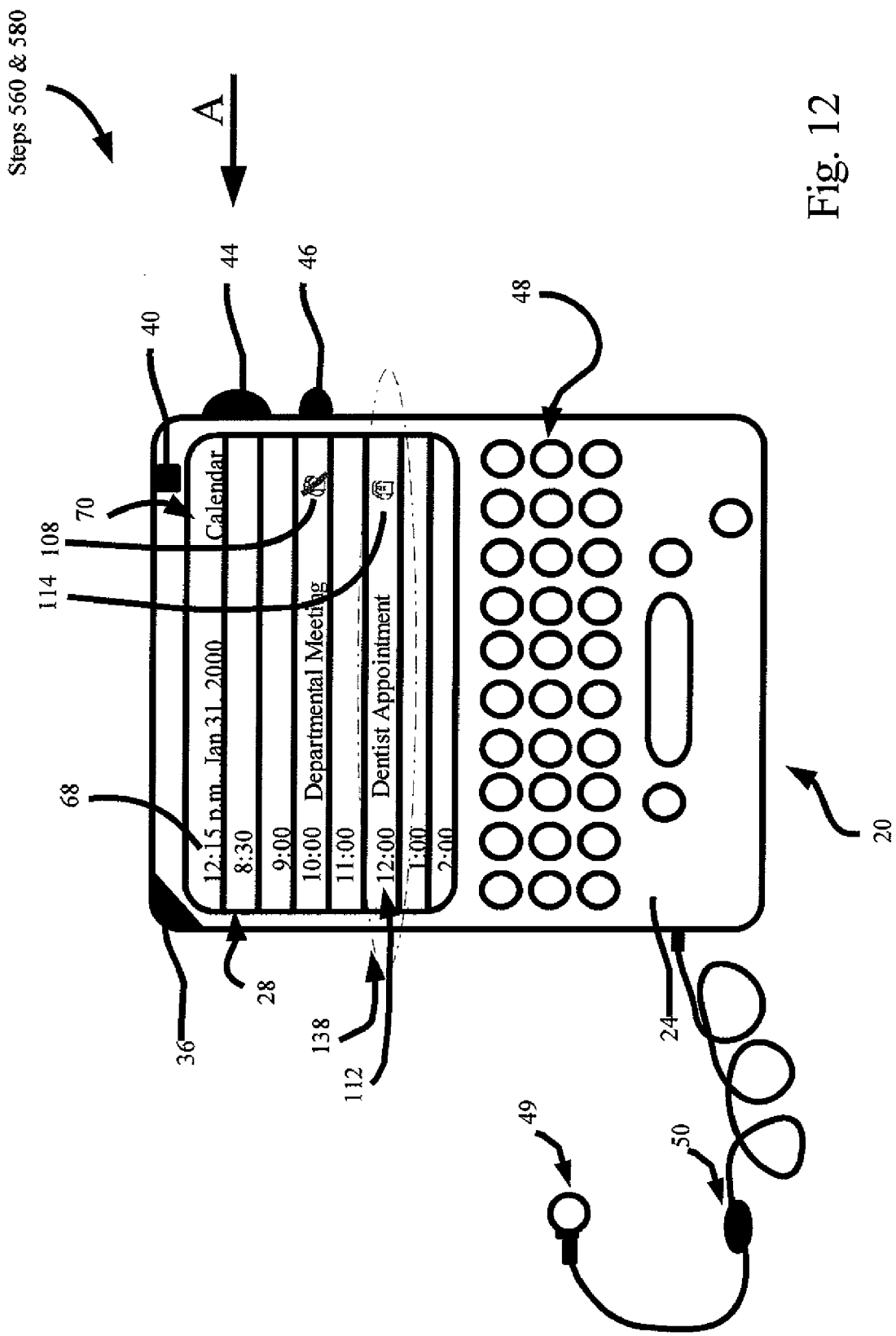
FIG. 12 shows the device of FIG. 1 with the calendar application, showing that at 12:15 p.m. on Jan. 31, 2000, the user of the device is in the middle of a dentist appointment.

To further illustrate method 500, an additional example is helpful. Let us assume that device 20 receives another phone call 182 at 12:15 p.m., as shown in FIG. 11. Following the steps of method 500 outlined above, at step 555, time of receipt 138 is determined to be 12:15 p.m. At step 560, and referring now to FIG. 12, it would be determined that time of receipt 138 is during appointment 112 and hence the method proceeds to step 580. At step 580, and still referring to FIG. 12, it will be determined that appointment 112 is associated with telephone icon 114. Hence the method proceeds to step 595, and device 20 rings to notify the user of the incoming phone call.

Figure 13:
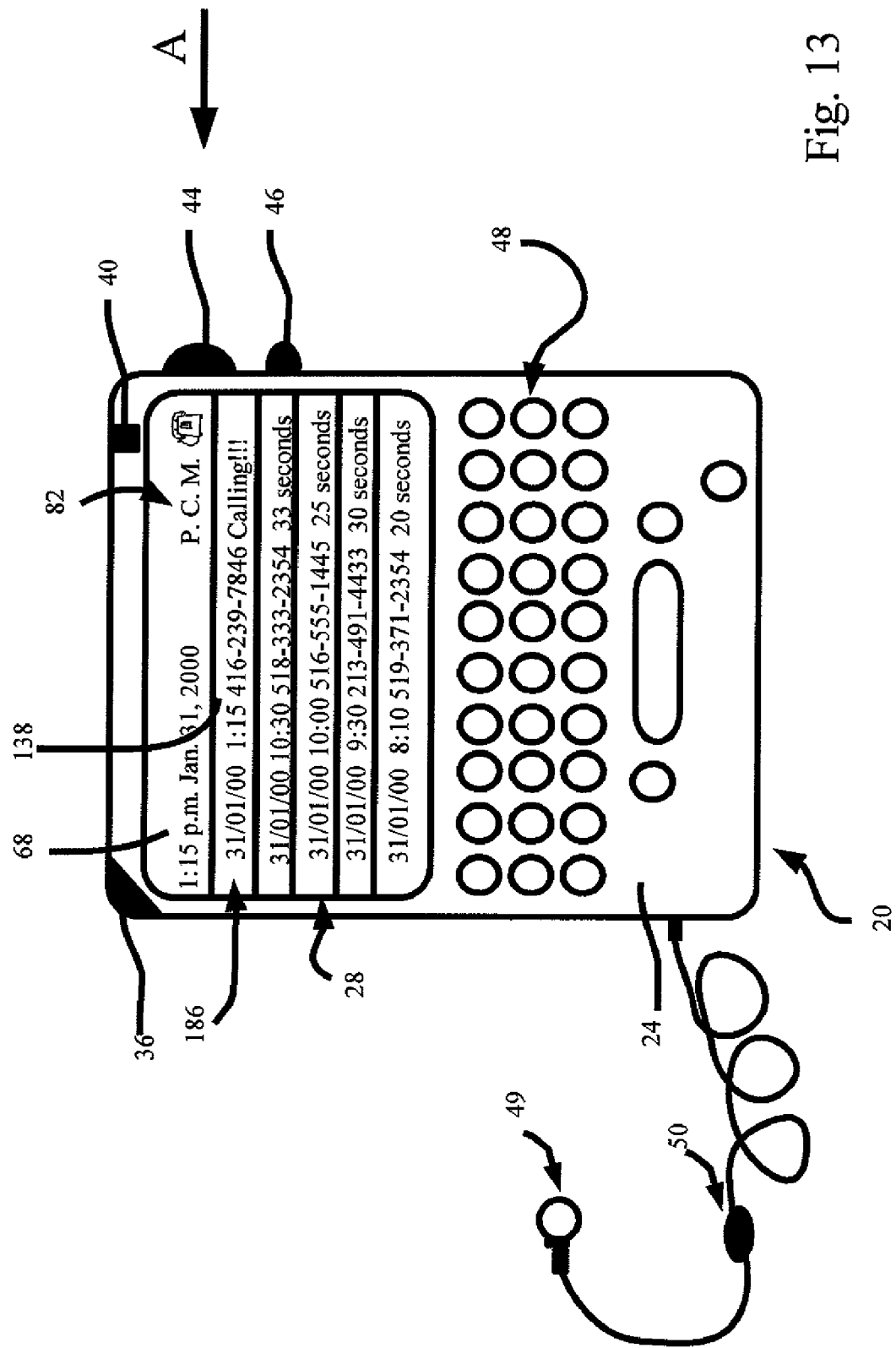
FIG. 13 shows the device of FIG. 1 with the phone call manager application having received an incoming phone call at 1:15 p.m. on Jan. 31, 2000.
Figure 14:
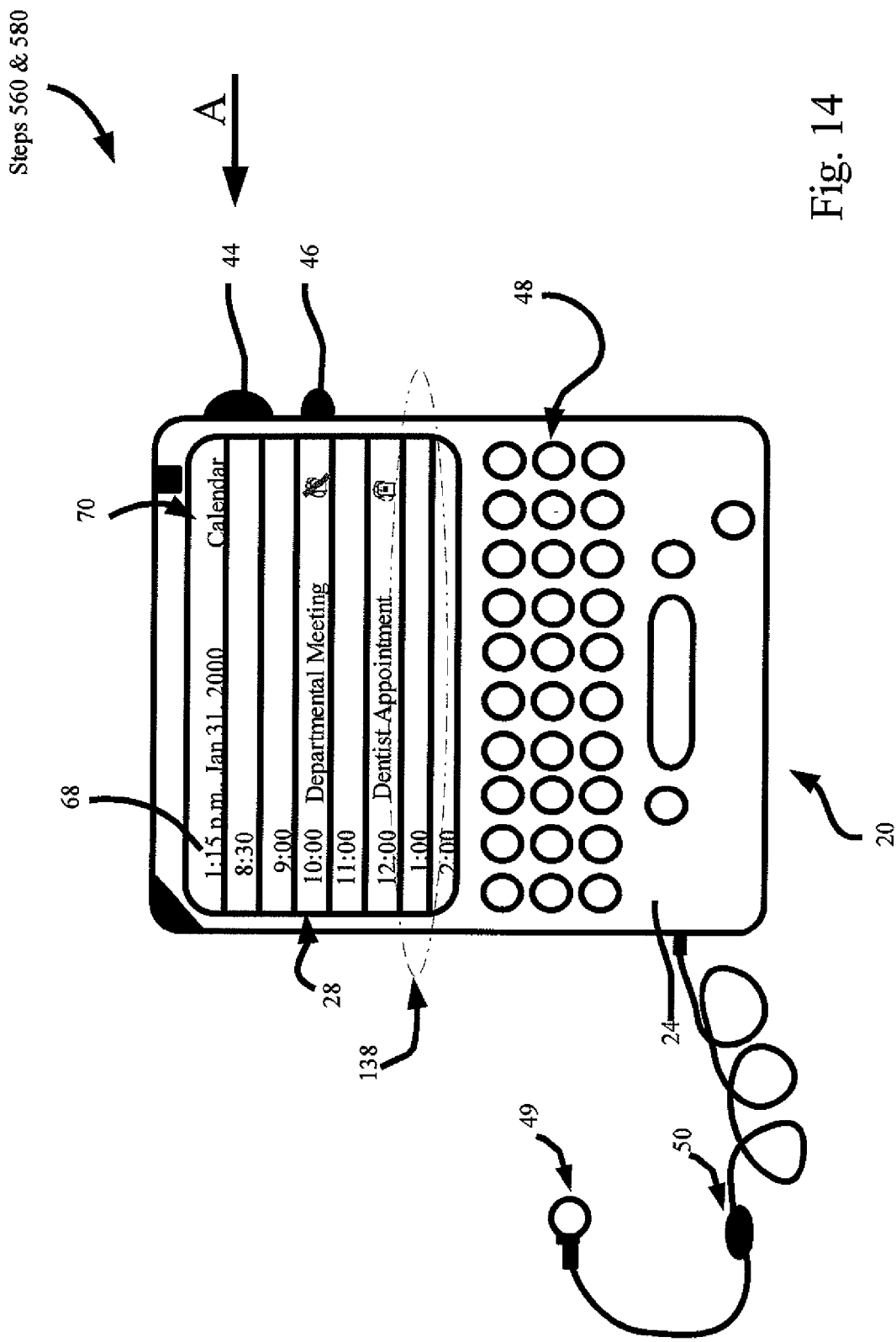
FIG. 14 shows the device of FIG. 1 with the calendar application, showing that at 1:15 p.m, on Jan. 31, 2000, the user of the device does not have any appointments scheduled.

To help even further in illustrating method 500, it will be assumed that device 20 receives yet another phone call 186 at 1:15 p.m., as shown in FIG. 13. As demonstrated in the flow chart in FIG. 8, the incoming call is received by device 20 at step 550. At step 555, the time of receipt 138 of the information is determined. Referring now to FIG. 13, time of receipt 138 of phone call 186, is determined to be 1:15 p.m. At this point, method 500 advances to step 560 where it is determined whether time of receipt 138 is during any of appointments marked in calendar 70. If time of receipt 138 is during one of such appointments, the method then advances to step 580. If, however, time of receipt 138 is not during any of these times, the method advances to step 570. In connection with phone call 186, and referring now to FIG. 14, it is determined that time of receipt 138 is not during any of the appointments in calendar 70 and the method advances to step 570. At step 570, the default mode of operation in C.F.S. 74 is determined. If the mode of notification is set to Available (Ring) mode 116, the method would proceed to step 595 and device 20 would ring to notify the user of the incoming phone call. If, on the other hand, the mode of notification was set to Unavailable (Voice Mail) mode 120, the method would proceed to step 590 and the phone call is directly routed to voice mail. For the purposes of the example with phone call 186, it is assumed that C.F.S. 74 is configured as shown in FIG. 5. Referring back to FIG. 5, because checkmark 124 is associated with telephone icon 114, the default mode of notification is Available (Ring). The method, thus, proceeds to step 595 and device 20 rings to notify the user of the incoming phone call.

While the teachings herein are directed to specific embodiments, it will be understood that subsets, combinations and variations of the embodiments are within the scope of the invention. For example, the voice mail function can be either internal and part of the device, or it can be external and provided by a service provider. Furthermore, it is to be understood that an incoming phone call is merely an example of the type of communication. Other examples include live electronic text communications (i.e. "instant text messages"), such as "chat" services, or any other type of communication that is live and enables at least two people to communicate in real-time. Those skilled in the art will understand that a chat system is any system that allows any number of users to have a typed, real-time, on-line conversation, either by all users logging into the same computer, or more commonly, via a network. "Internet Relay Chat" ("IRC"), "ICQ" and "Palace" are examples of well known chat systems. Additional incoming events can include video conferencing, voice-over-IP (VoIP) communication, push-based web page downloads and push-to-talk applications. In an alternative embodiment, an incoming push-to-talk interruption is handled by attempting to wait until the push-to-talk floor is available and automatically taking control of the floor and playing an outgoing message indicating the user is busy.

Similarly, the forwarding of communications to voice mail is just an example of the type of response that a caller can receive. Voice mail can be replaced by any type of message application or any type of communication to the caller in real time. For example, a caller can be prompted to leave a text-based message, DTMF tones or email, instead of, or in addition to, a voice message. As additional example, a person starting a chat can receive a message that the person being contacted is unavailable and the person starting the chat can be prompted to leave a text-based message, voicemail or a combination thereof. In general, where a first user at a first computer attempts to initiate a chat with a second user at a second computer, the second computer can include a modified version of method 500, wherein the first user will either be prompted to leave a message, or be allowed to start the chat session, depending on any event, such as an appointment event in a calendar application or a task event in a task manager application. Those skilled in the art will appreciate that the task manager application in many devices has various status settings, which can consist of "not started", "in progress", "deferred" and "completed". Accordingly the status setting of a task can function as a criterion which determines whether an incoming call gets directed to voice mail. For example, every time there is a task that is "in progress" the user may be deemed busy and incoming calls can be routed directly to voice mail.

It is also contemplated that in circumstances where the user is available and ready to receive the in-coming communication, device behavior is not limited to ringing and can include a variety of audible, inaudible or mechanical modes of notification, such as various sounds, tunes, flashings of light or vibrational modes and/or combinations thereof, which are familiar to those skilled in the art.

It is further contemplated that the modes of operation are not limited to "available" and "unavailable" and include a variety of modes of operation that can be programmed into the device by either the manufacturer or the user. Examples of modes of operation include (1) "available but forward to voice mail after two rings", (2) "unavailable (i.e. forward to voice mail) but vibrate twice to notify the user of the incoming communication" or (3) "unavailable but ring once after the event is over to remind the user to check messages". The device can ring one way if a communication is forwarded to voice mail and no message is left and another way if there is a message.

It is further contemplated that different modes of operation can be selected manually in association with each appointment, and as such that mode of operation can be considered a criterion of that appointment. It is also contemplated that modes of operation be selected automatically based on a variety of criteria associated with each event and/or incoming communication. For example one such criterion can be the presence or absence of certain predefined words in each event. Another example of multiple complex criteria can be the timing of the communication and/or the person the communication originates from. Accordingly the device could be configured to, for example, direct all incoming calls to an answering machine if the call is received during any appointments containing the word "meeting", except to override this string and ring the phone and make the call available if the call is from the user's spouse or if the call is received 2 minutes before the end of the meeting. In general, a device can be configured to have modes of operation that are as simple or as complex as desired.

It is also to be understood that types of information stored in association with the applications stored in the ROM of the electronic device, and the way in which such information is displayed on the device is not particularly limited. For example, Table A shows an alternative way of displaying the information in phone call manager 82.

TABLE A

Example format for displaying information in Phone Call Manager

| Field 1 Entry Number | Field 2 Date/Time | Field 3 Type | Field 4 Phone Number | Field 5 Status/Duration |
|---|---|---|---|---|
| 1 | 2000-01-01 at 10:30 AM | Voice Mail | 555-333-2354 | In progress |
| 2 | 2000-01-01 at 10:00 AM | Accepted | 555-555-1445 | 25 Seconds |

TABLE A-continued

Example format for displaying information in Phone Call Manager

| Field 1 Entry Number | Field 2 Date/Time | Field 3 Type | Field 4 Phone Number | Field 5 Status/Duration |
|---|---|---|---|---|
| 3 | 2000-01-01 at 9:30 AM | Placed Call | 555-491-4433 | 30 Seconds |
| 4 | 2000-01-01 at 8:30 AM | Placed Call | 555-371-2354 | 20 Seconds |

As can be seen by examining Table A, Field 1, "Entry Number" identifies a number associated with a particular telephone call handled by Phone Call Manager. By the same token, Field 2 "Date/Time" identifies the date and time of a particular telephone call. All of the telephone calls in Table A occurred on Jan. 1, 2001, at the respective times indicated in each row. Field 3, "Type" indicates the type of call. More specifically, where "Type" is identified as "Voicemail", then that particular telephone call will have been an incoming call routed to voicemail. Where "Type" is identified as "Accepted", then that particular telephone call will have been an incoming call that was accepted as a voice call. Where "Type" is identified as "Placed Call", then that particular telephone call will have been an outbound telephone call. Field 4, "Phone Number", indicates the phone number associated with that particular call. Field 5, "Status/Duration" indicates whether the call is actually "in-progress", or, where the call is in the past, the duration of the call will be indicated in terms of the length of time of the call. It should now be apparent that other information can also be included in Table A.

Figure 15:
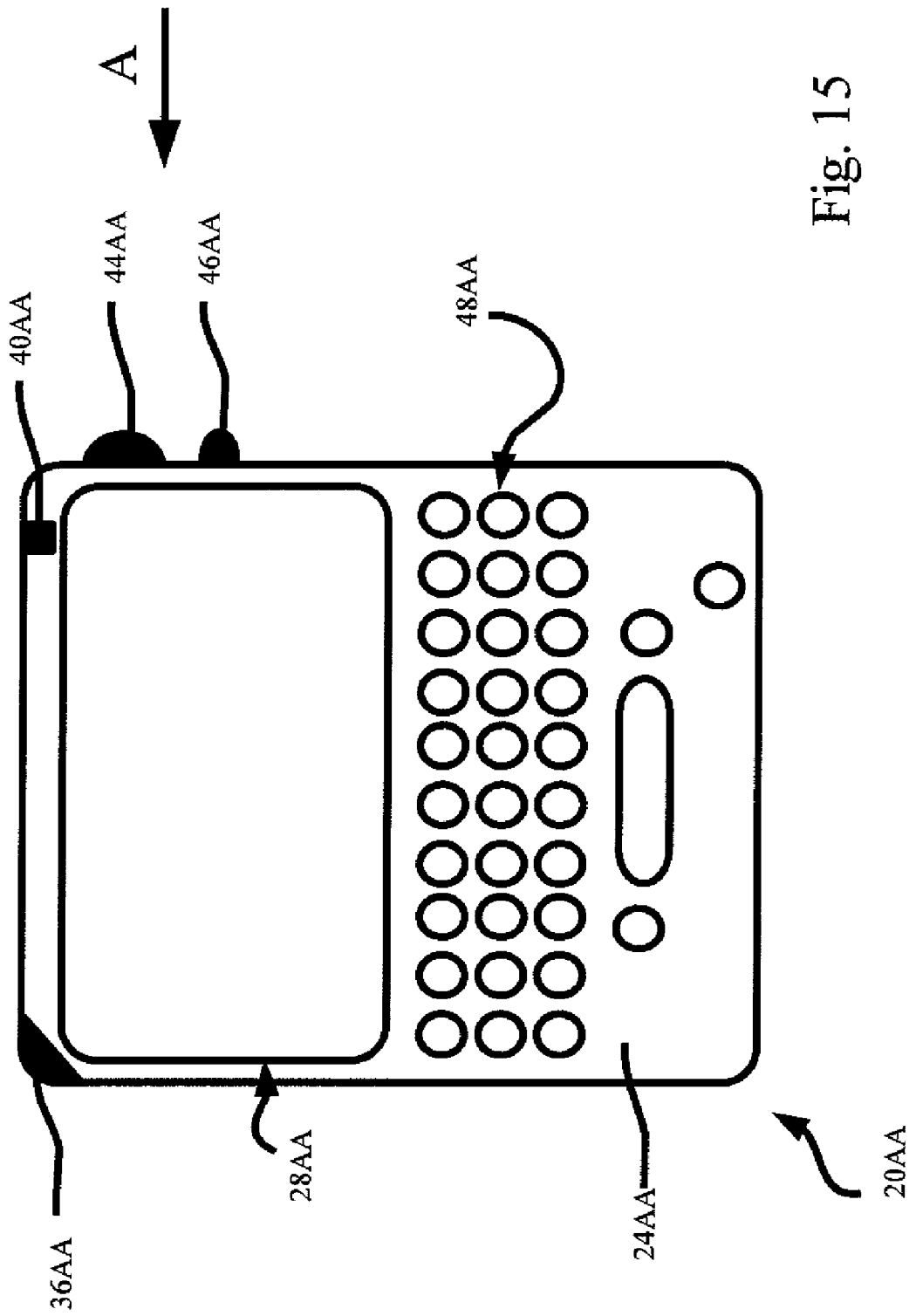
FIG. 15 is a schematic representation of an electronic device for modifying notifications in accordance with an embodiment.

Referring to FIG. 15, an electronic device for modifying notifications, in accordance with an embodiment, is indicated generally at 20AA. The functionality described below in relation to device 20AA (and its variants) can be combined with the functionality discussed above in relation to device 20 (and its variants), In this embodiment, electronic device 20AA is based on the computing environment and functionality of a wireless personal digital assistant. It is, however, to be understood that electronic device 20AA can include the construction and functionality of other electronic devices, such as desktop computers, cell phones, smart telephones, and laptops with wireless 802.11 or Bluetooth(TM) chip sets and the like. In one embodiment, electronic device 20AA includes, a housing 24AA, which frames an LCD display 28AA, a speaker 36AA, an LED indicator 40AA, a trackwheel 44AA, an exit key 46AA and key pad 48AA, Trackwheel 44AA and exit key 46AA can be inwardly depressed along the path of arrow "A" as a means to provide additional user-input. It will be understood that housing 24AA, can be made from any suitable material as will occur to those of skill in the art.

Figure 16:
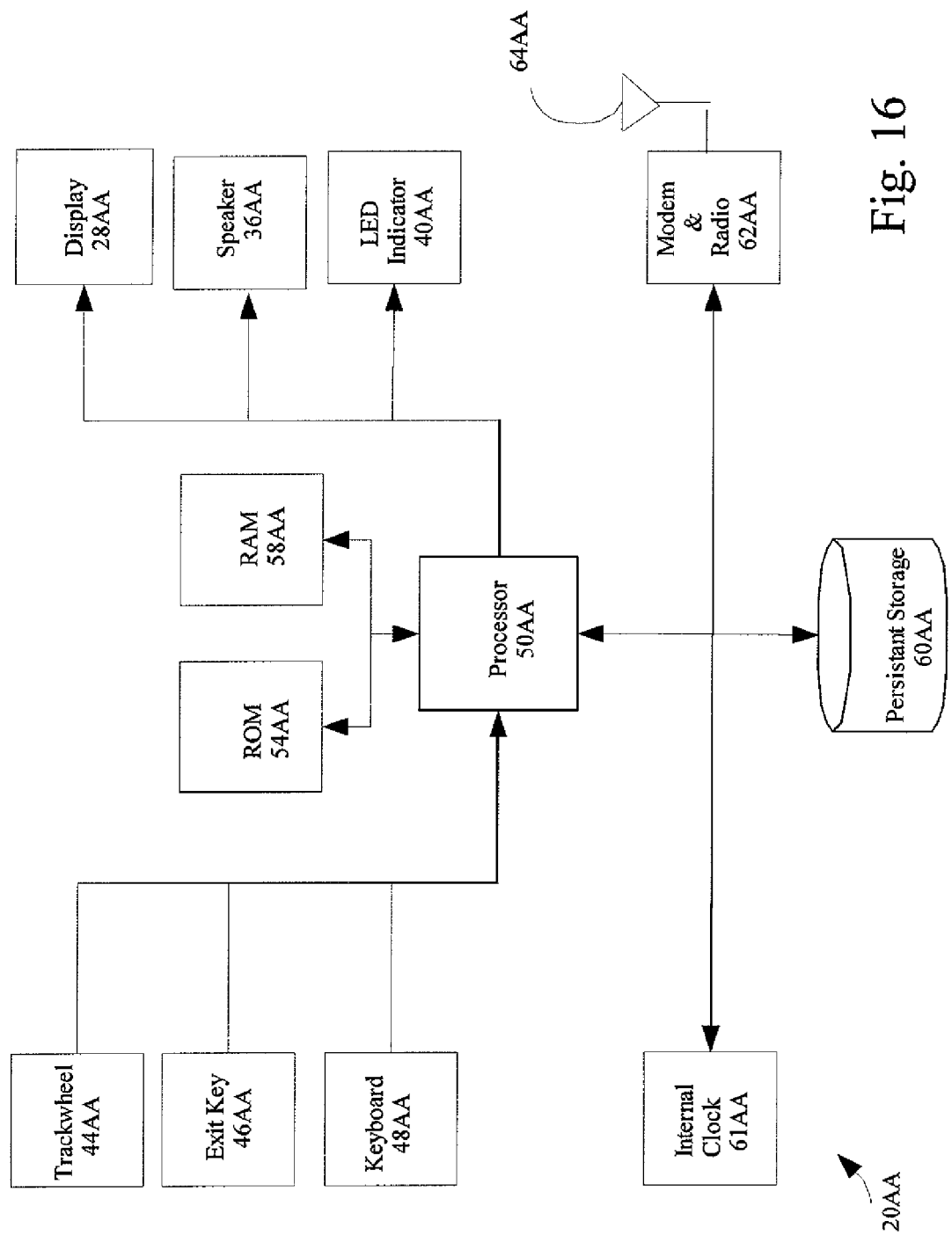
FIG. 16 is a block diagram of certain internal components within the device in FIG. 15.

Referring now to FIG. 16, a block diagram of certain internal components within device 20AA is shown. Device 20AA is based on a microcomputer that includes a processor 50AA that is connected to a read-only-memory ("ROM") 54AA, which contains a plurality of applications executable by processor 50AA that enables device 20AA to perform certain functions. Processor 50AA is also connected to a random access memory unit ("RAM") 58AA and a persistent storage 60AA which are responsible for various nonvolatile storage functions of device 20AA. Processor 50AA can send output signals to various output devices including display 28AA, speaker 36AA, and LED indicator 40AA, each of which generate specific outputs as instructed by processor 50AA. Processor 50AA, can also receive input from various input devices including trackwheel 44AA, exit key 46AA and keyboard 48AA. Processor 50AA is also connected to an internal clock 61AA and a modem and radio 62AA (not shown). Modem and radio 62AA can be connected to various wireless networks through an antenna 64AA.

Figure 17:
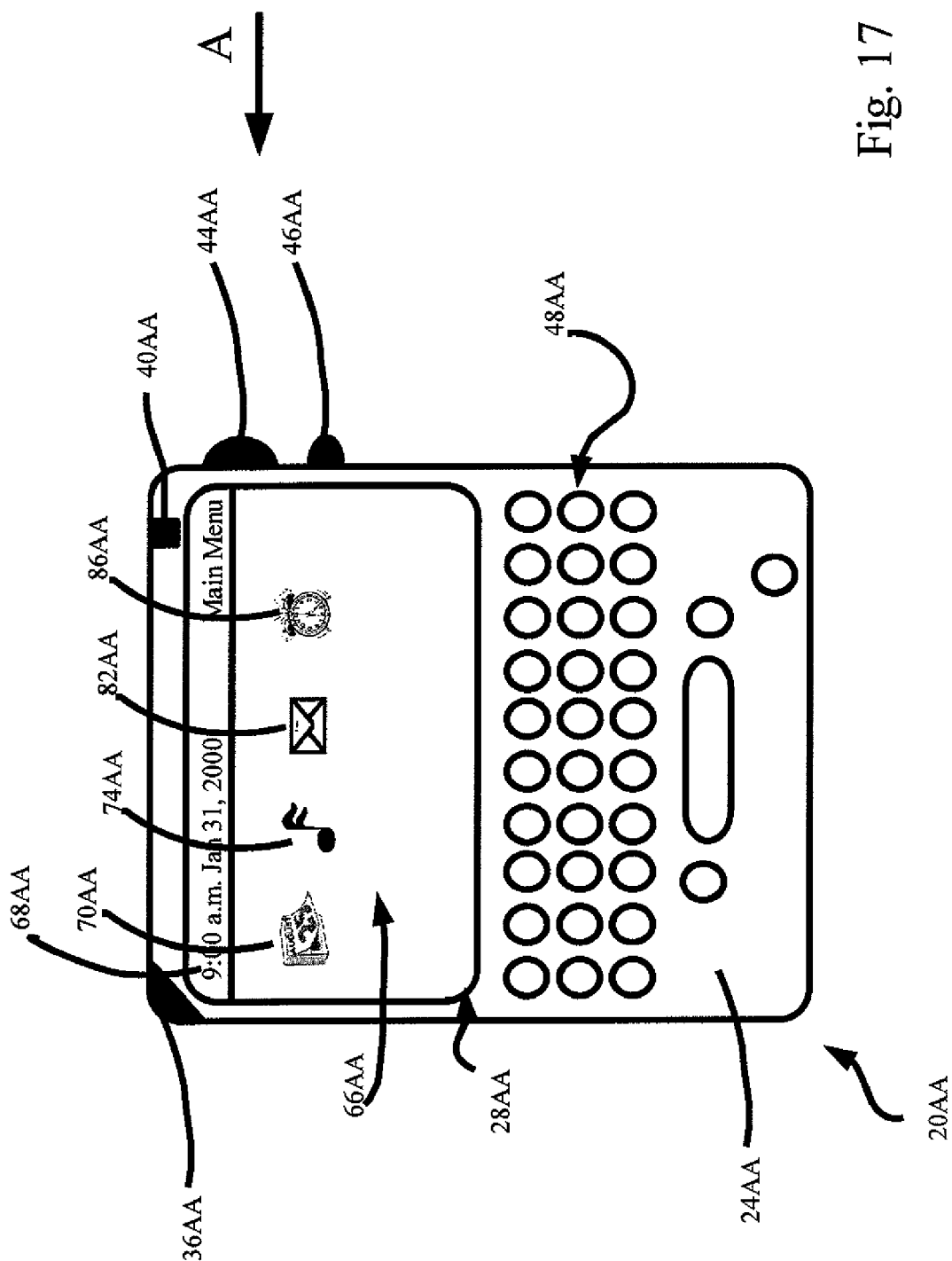
FIG. 17 shows the device of FIG. 15 with the main menu screen displaying a plurality of applications including a calendar, a notification setup, a message reader and a daily alarm.

Device 20AA is operable to execute various applications stored in ROM 54AA. Referring now to FIG. 17, device 20AA is shown with a main menu screen 66AA, that displays a system clock 68AA which is updated according to internal clock 61AA. Main menu screen 66AA also displays a plurality of applications that are executable on processor 50AA. In one embodiment, such displayed applications include a calendar 70AA, a notification setup 74AA, a message reader 82AA, and a daily alarm 86AA. When executed on processor 50AA, these applications cause device 20AA to operate in various ways, as will be discussed further below. Trackwheel 44AA can be used to scroll through the applications and to select a desired application by pressing inwardly, along the path of arrow A, on trackwheel 44AA. Exit key 46AA can be used to exit any application by pressing inwardly, along the path of arrow A, on exit key 46AA.

Figure 18:
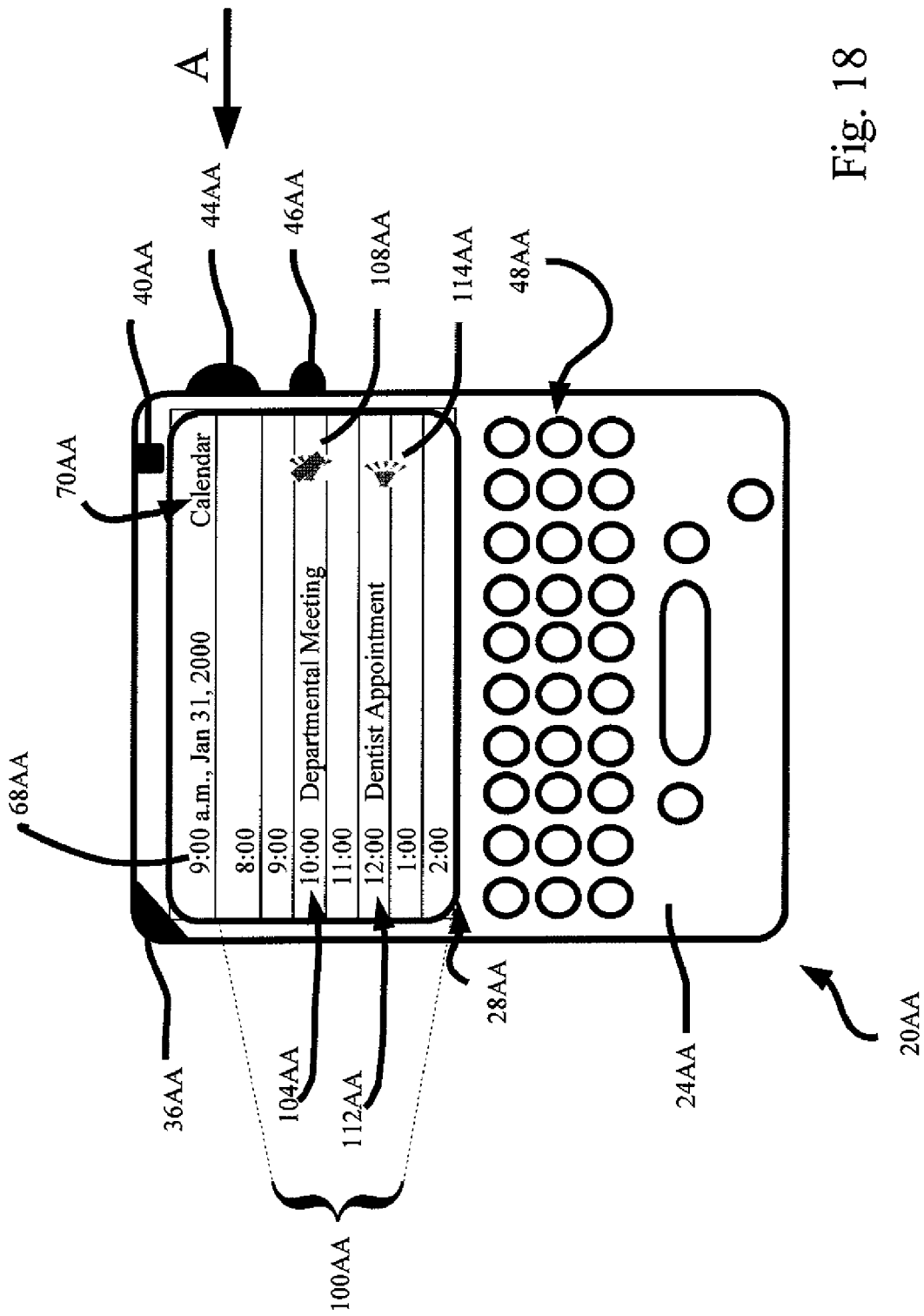
FIG. 18 shows the device of FIG. 15 with the calendar application displaying a plurality of individual appointments for the date of Jan. 31, 2000.

Referring now to FIG. 18, device 20AA is shown displaying the day's schedule 100AA for Jan. 31, 2000 using the application called calendar 70AA on display 28AA. Schedule 100AA includes a plurality of individual appointments 104AA and 112AA. As illustrated in FIG. 18, appointment 104AA is a departmental meeting, from 10:00-11:00 a.m., and appointment 112AA is a dentist appointment, from 12:00-1:00 p.m. Appointment 104AA has a "no-speaker" icon 108AA associated with it, while appointment 112AA has a speaker icon 114AA associated with it. Speaker icon 114AA and "no-speaker" icon 108AA will be discussed in greater detail below. Calendar 70AA also displays a clock 68AA that shows the current date and time according to internal clock 61AA maintained in device 20AA.

Figure 19:
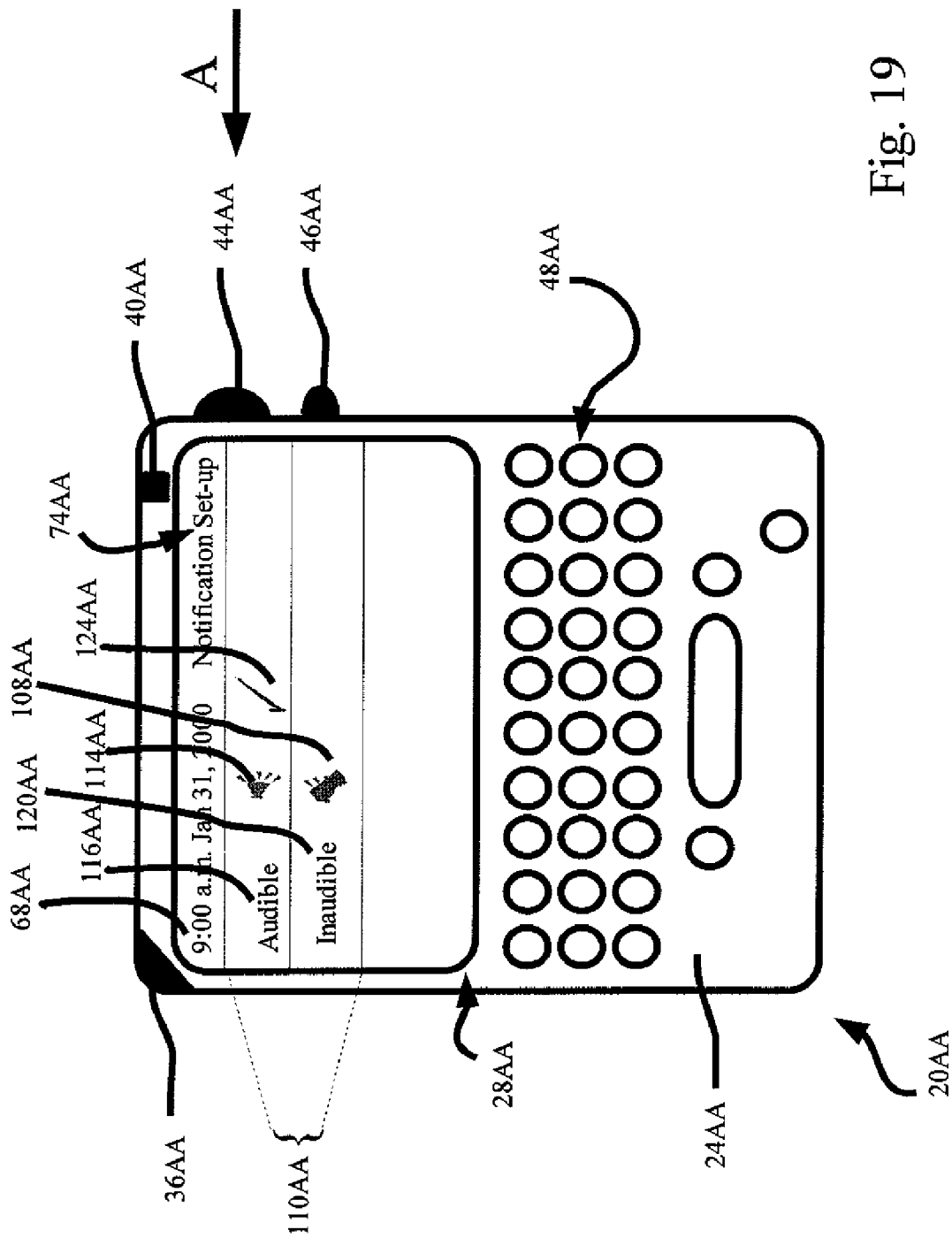
FIG. 19 shows the device of FIG. 15 with the notification setup application displaying a plurality of default modes of notification.

Referring now to FIG. 19, device 20AA is shown displaying the default modes of notification 110AA using the application called notification setup 74AA on display 28AA, comprising an audible mode 116AA and an inaudible mode 120AA. Audible mode 116AA is also associated with speaker icon 114AA and inaudible mode 120AA is also associated with "no-speaker" icon 108AA. As shown in FIG. 19, there is a "check-mark" 124AA beside speaker icon 114AA, indicating that the default mode of notification for the present example is audible mode 116AA. Using trackwheel 44AA, check-mark 124AA can also be placed beside "no-speaker" icon 108AA, indicating that the default mode of notification is inaudible mode 120AA.

Figure 20:
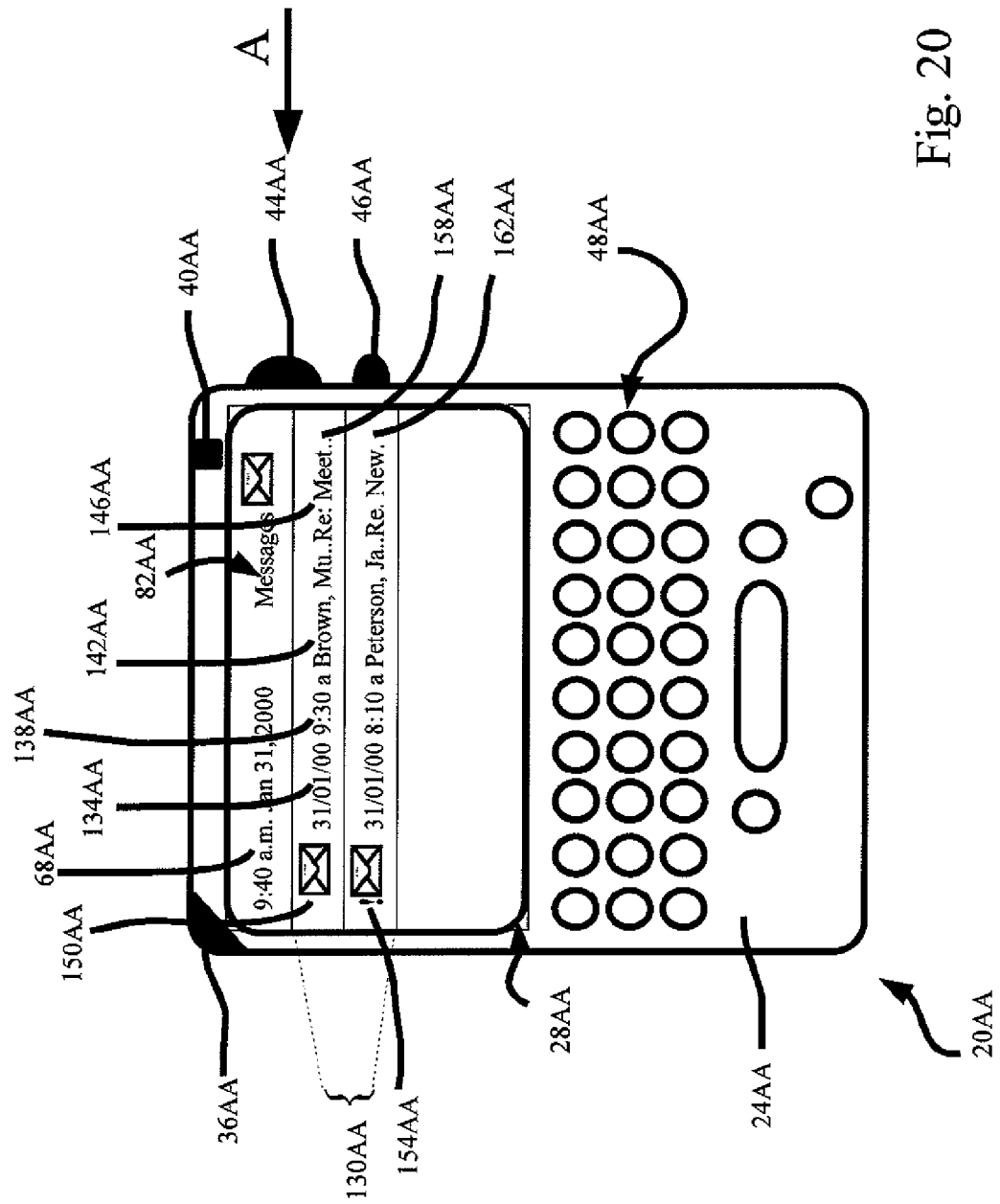
FIG. 20 shows the device of FIG. 15 with the message reader application displaying a plurality of emails received.

Referring now to FIG. 20, device 20AA is shown displaying a plurality of emails 130AA using the application called message reader 82AA on display 28AA. Emails 130AA are received through a wireless network (not shown), that connects to device 20AA via modem and radio 62AA through antenna 64AA. Emails 130AA have a series of information associated with them, including, date of receipt 134AA, time of receipt 138AA, name of sender 142AA, subject line 146AA, and an envelope icon 150AA, that can be either opened or closed, indicating whether the email has been opened. Each email 130AA can also have an exclamation mark 154AA associated with it, indicating that the message is marked urgent by the sender. Trackwheel 44AA can be used to scroll through individual emails 130AA, and inwardly depressed to open each individual email 130AA. Exit key 46AA can be inwardly depressed to exit each individual email. For example, in FIG. 20, it is shown that email 158AA sent by Murphy Brown, at 9:30 a.m. on Jan. 31, 2000, is not marked urgent, has the subject line: "Re.: Meeting" and has not been opened. Similarly, email 162AA sent by Jason Peterson at 8:10 a.m., is marked urgent, has the subject line: "New File" and has not been opened. Message reader 82AA also includes clock 68AA, which functions as previously described in relation to calendar 70AA.

Figure 21:
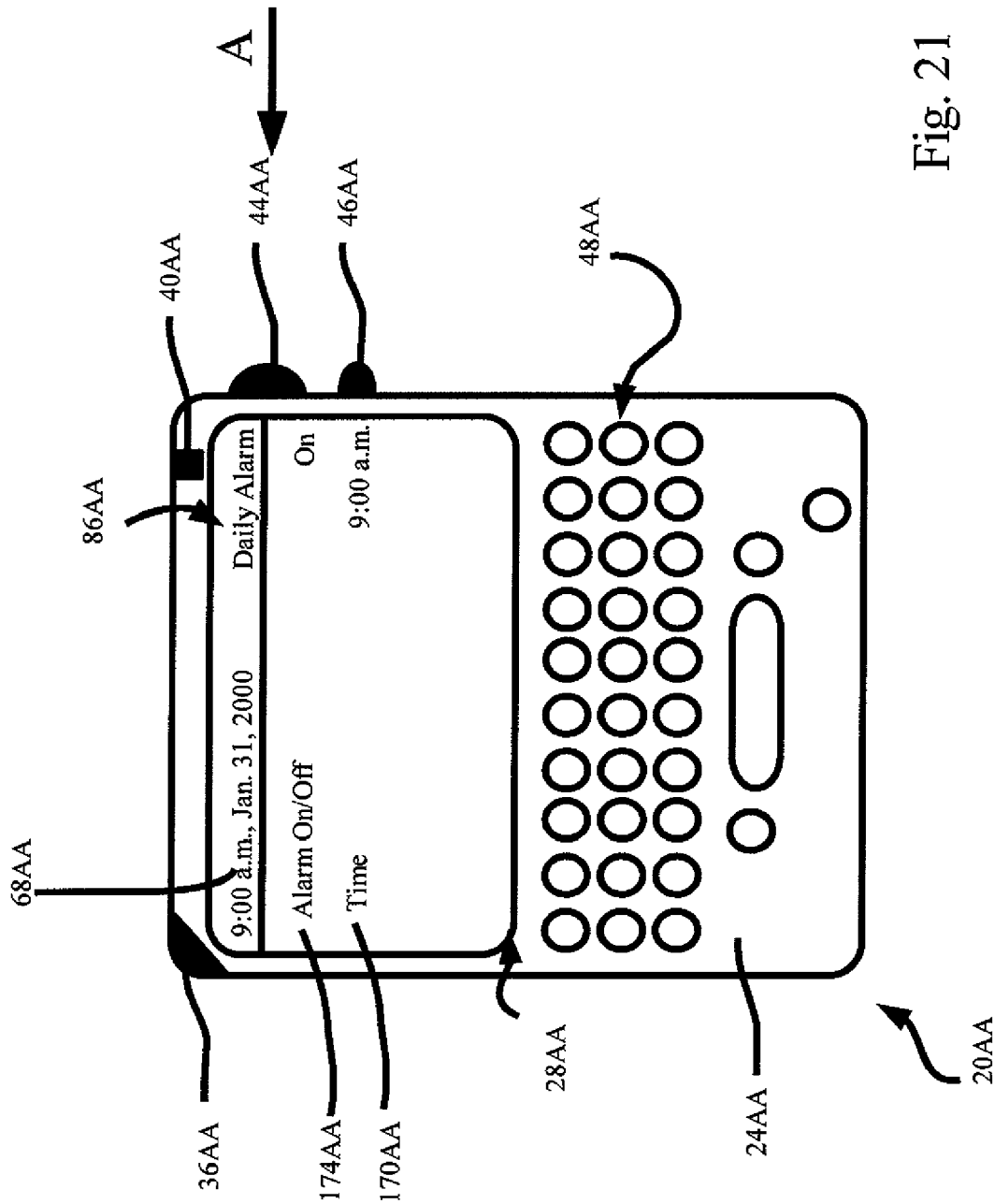
FIG. 21 shows the device of FIG. 15 with the daily alarm application displaying a designated time and an ON/OFF setting for the alarm.

Referring now to FIG. 21, device 20AA is shown displaying a designated "Time" 170AA and an "ON/OFF" setting 174AA using the application called daily alarm 86AA in display 28AA. As seen in FIG. 21, "Time" 170AA is associated with a specific time of the day and "ON/OFF" setting 174AA can be either on or off. Accordingly, at 9:00 a.m. each day, an alarm will be generated by device 20AA as shown in FIG. 21. The operation of alarm 86AA will be discussed further in detail below.

A method for modifying notifications in accordance with another embodiment will now be discussed with reference to the flow chart shown in FIG. 22 and is indicated generally at 500AA. In order to assist in the explanation of method 500AA, reference will be made to the foregoing discussion of device 20AA. In order to further assist in the explanation of method 500AA, the sequence of steps in method 500AA shall be followed in connection to a series of examples using device 20AA. In these examples, it will be assumed that device 20AA receives a series of emails at different times during the day.

Figure 22:
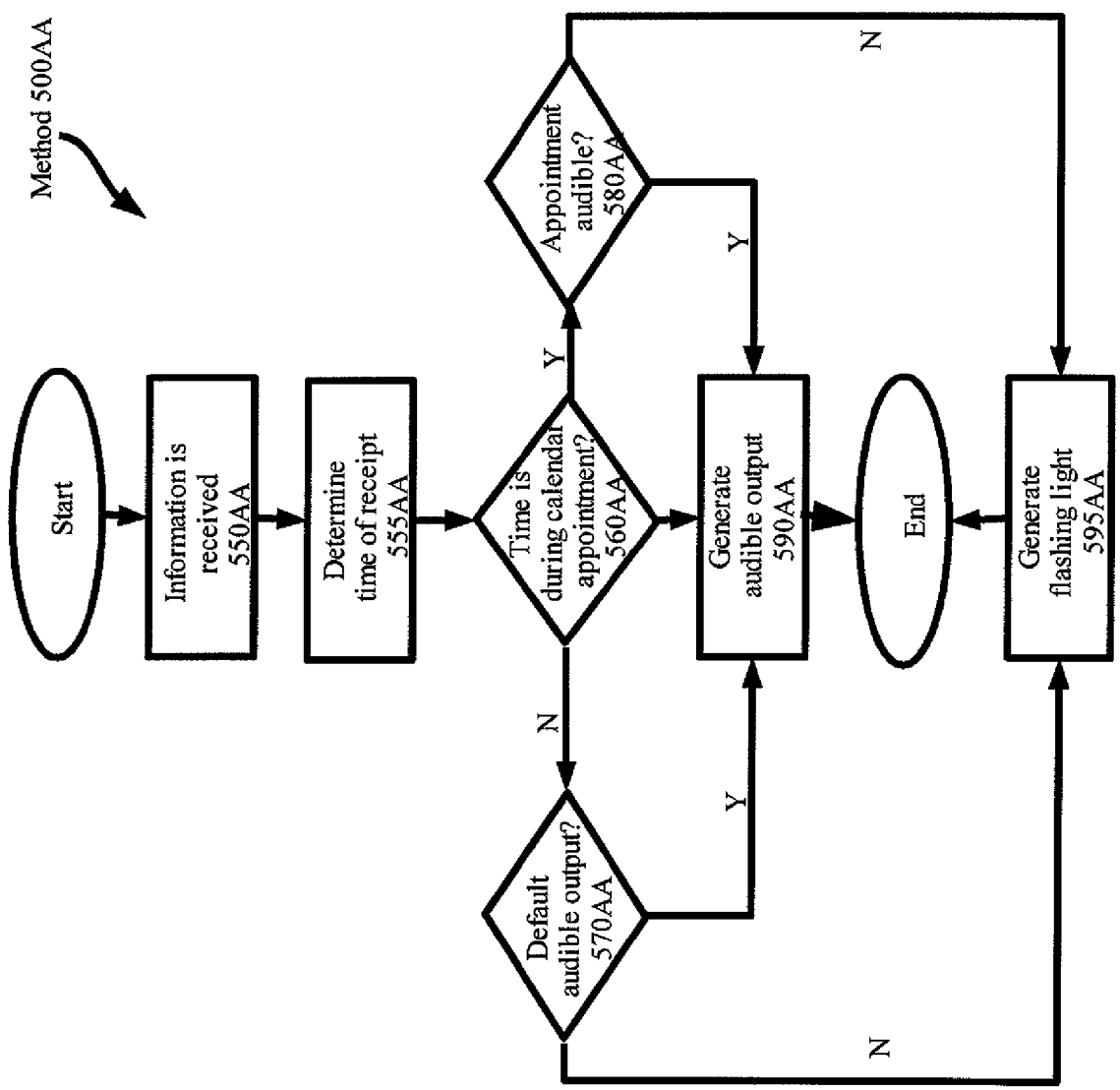
FIG. 22 shows a flow chart depicting a method for modifying notification settings in accordance with another embodiment.
Figure 23:
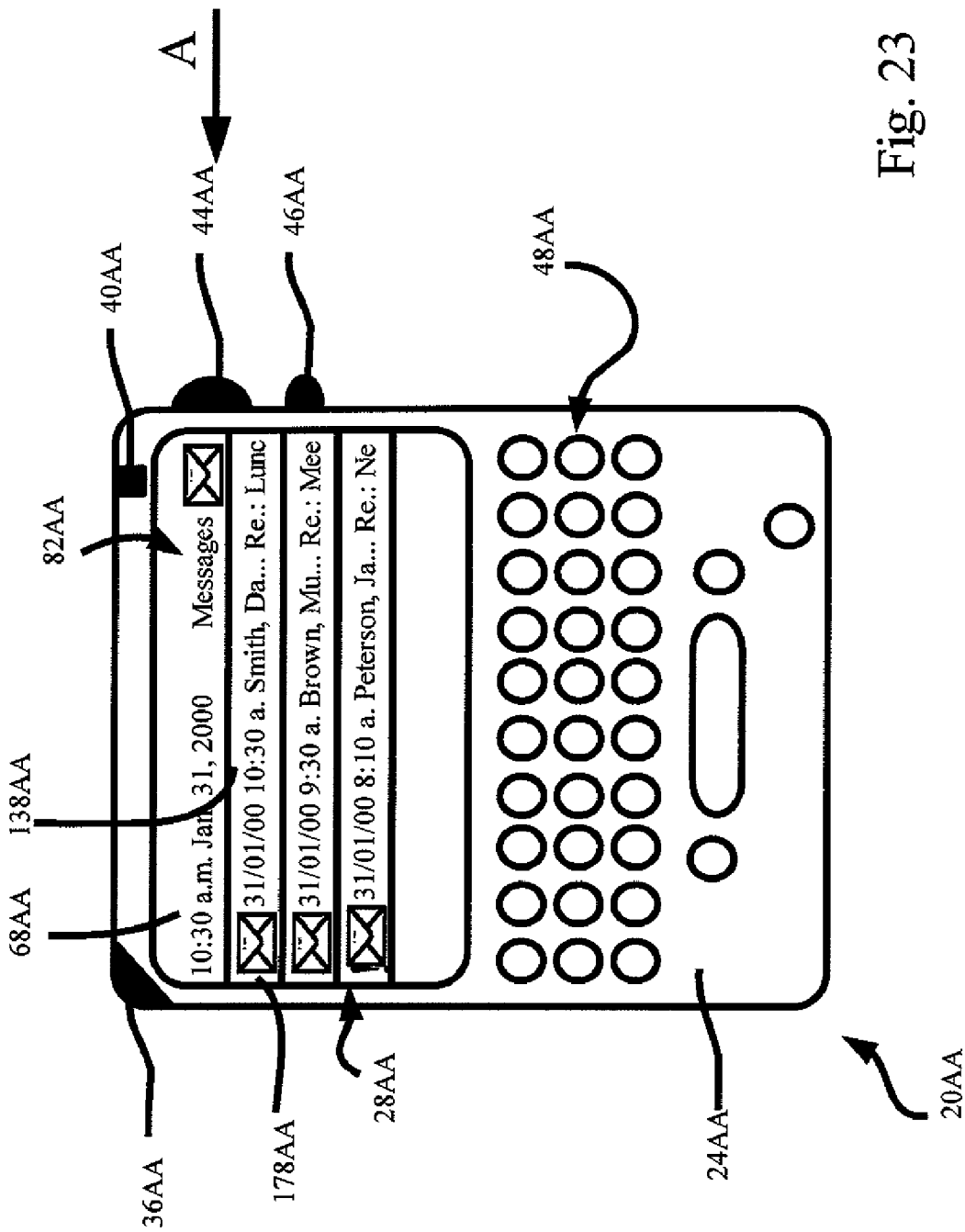
FIG. 23 shows the device of FIG. 15 with the message reader application having received a new email at 10:30 a.m. on Jan. 31, 2000.
Figure 24:
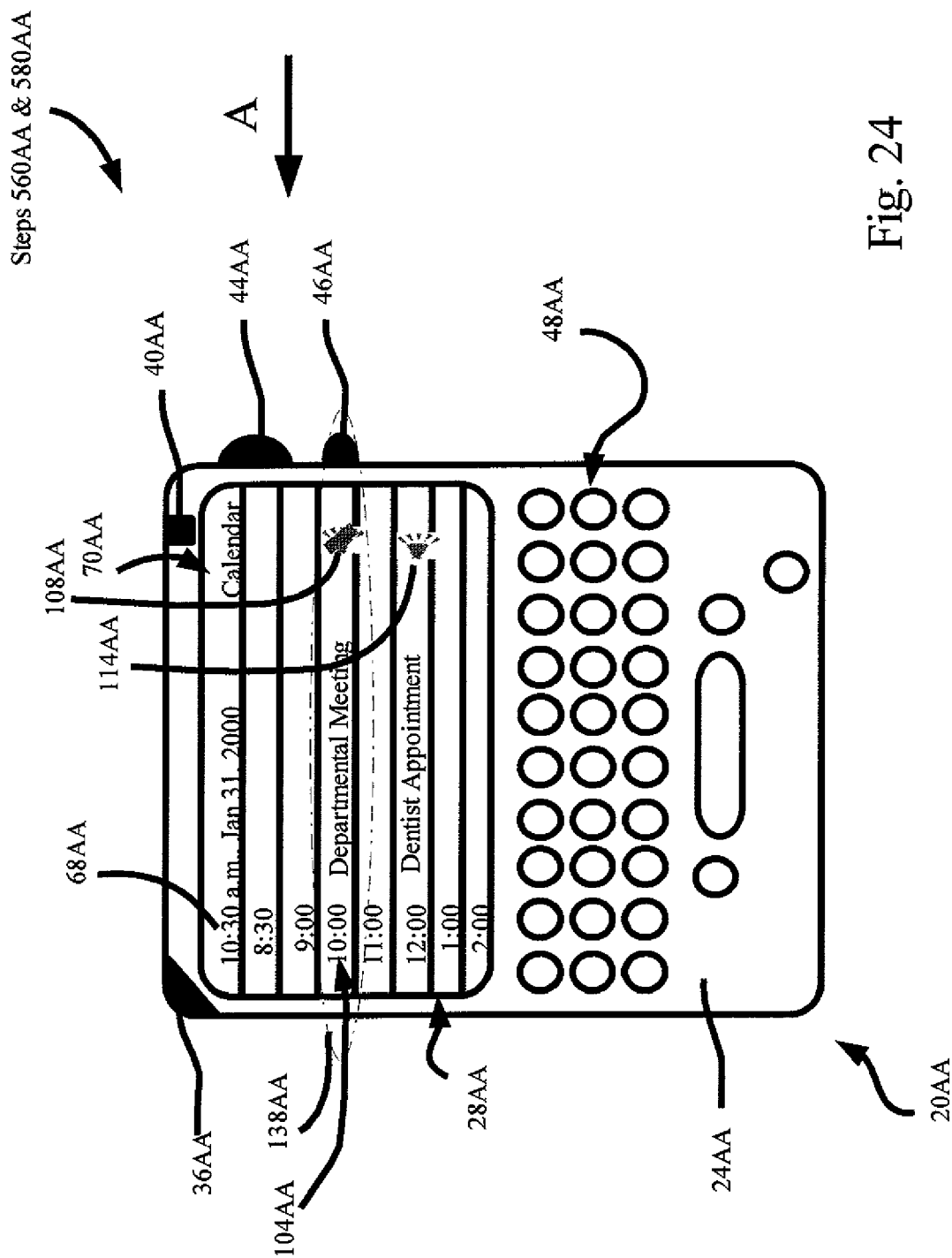
FIG. 24 shows the device of FIG. 15 with the calendar application, showing that at 10:30 a.m. on Jan. 31, 2000, the user of the device is in a departmental meeting.
Figure 25:
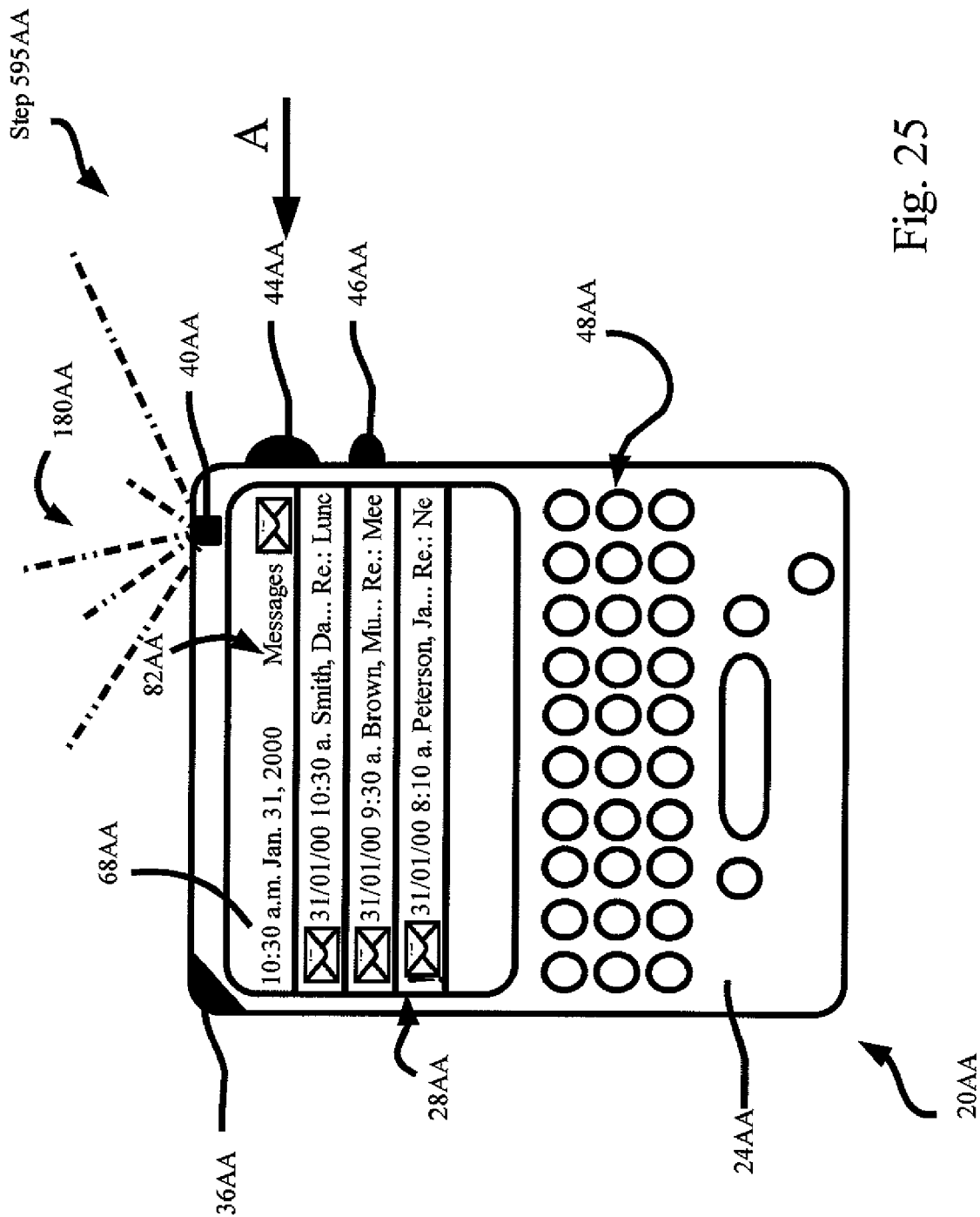
FIG. 25 shows the device of FIG. 15 with the message reader application notifying the receipt of the email in FIG. 23 by a flashing light from the LED indicator.

As demonstrated in the flow chart in FIG. 22, information is received by device 20AA at step 550AA. In the case of the present example, and referring now to FIG. 23, it is to be assumed that the information received is an email and that the email received by device 20AA at this step is email 178AA. Email 178AA from David Smith, is received at 10:30 a.m. on Jan. 31, 2000 and is not marked urgent. At step 555AA, the time of receipt 138AA of the information is determined. Referring to FIG. 23, time of receipt 138AA of email 178AA, is determined to be 10:30 a.m. At this point, the method advances to step 560AA where it is determined whether time of receipt 138AA is during any of appointments marked in calendar 70AA. If time of receipt 138AA is during one of such appointments, the method then advances to step 580AA. However, if time of receipt 138AA is not during any of these times, the method advances to step 570AA. In connection with email 178AA, and referring now to FIG. 24, it is determined that time of receipt 138AA is during appointment 104AA and the method, advances to step 580AA. At step 580AA, it is determined whether the appointment with which time of receipt 138AA is associated is designated as audible or inaudible. If the appointment with which time of receipt 138AA is associated with has speaker icon 114AA associated with it, then the method proceeds to step 590AA and an audible sound will emanate from speaker 36AA. If however, the appointment with which time of receipt 138AA is associated with has "no-speaker" icon 108AA associated with it, then the method proceeds to step 595AA and a flashing light 180AA will emanate from LED indicator 40AA. In the case of email 178AA, since appointment 104AA is associated with "no-speaker" icon 108AA, the method advances to step 595AA and referring now to FIG. 25, flashing light 180AA will emanate from LED indicator 40AA. At this point method 500AA ends. There may be a variety of ways to cancel the output from LED indicator 40AA by, for example, using exit key 46AA and pressing inward on exit key 46AA along arrow A.

Figure 26:
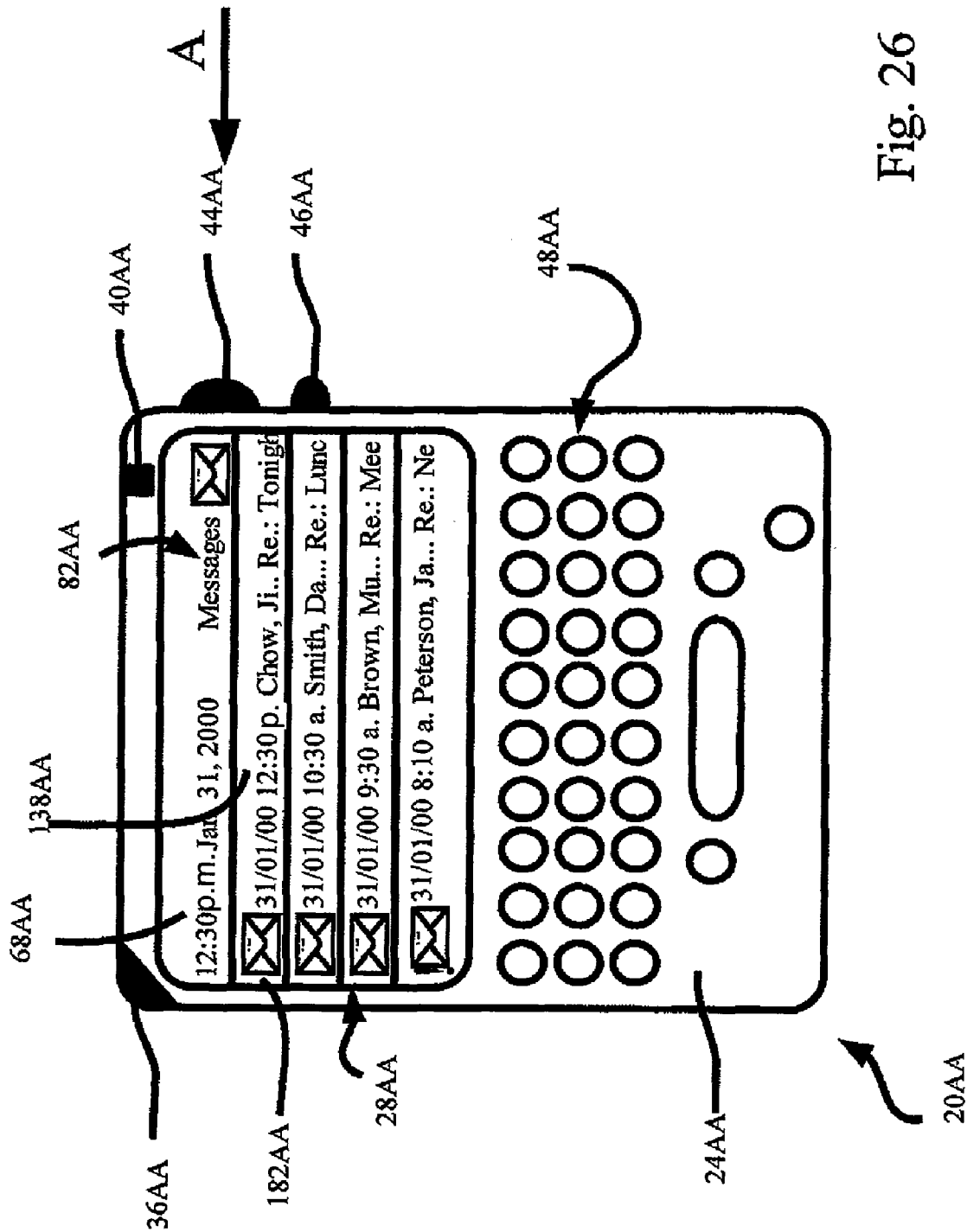
FIG. 26 shows the device of FIG. 15 with the message reader application receiving a new email at 12:30 p.m. on Jan. 31, 2000.
Figure 27:
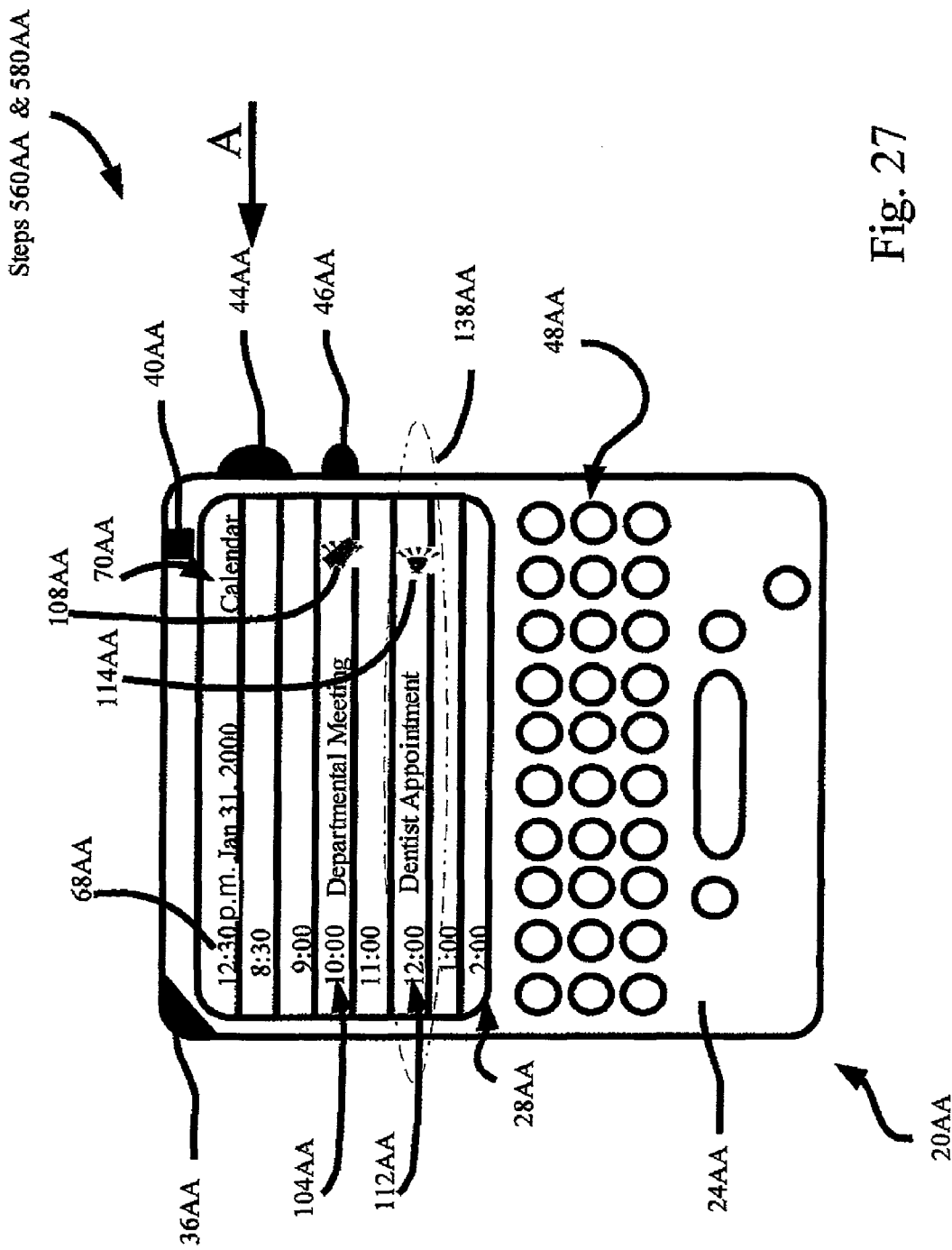
FIG. 27 shows the device of FIG. 15 with the calendar application, showing that at 12:30 p.m. on Jan. 31, 2000, the user of the device is in the middle of a dentist appointment.
Figure 28:
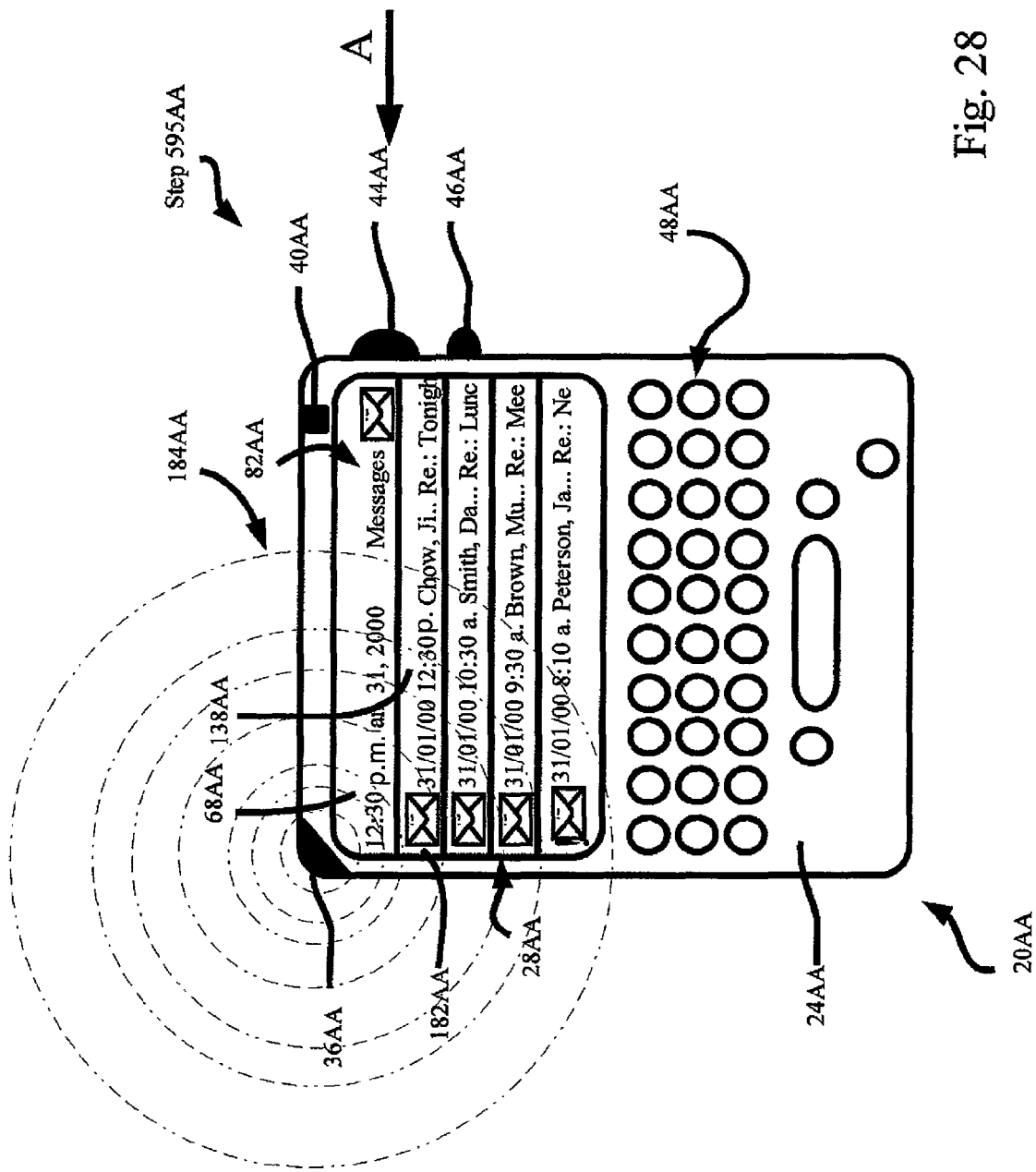
FIG. 28 shows the device of FIG. 15 with the message reader application notifying the receipt of the email in FIG. 26 by producing a sound from the speaker.

To further illustrate method 500AA, an additional example is helpful. Let us assume that device 20AA receives another email 182AA at 12:30 p.m., as shown in FIG. 26. Following the steps of method 500AA outlined above, at step 555AA, time of receipt 138AA is determined to be 12:30 p.m. At step 560AA, and referring now to FIG. 27, it would be determined that time of receipt 138AA is during appointment 112AA and hence method 500AA proceeds to step 580AA. At step 580AA, and still referring to FIG. 27, it will be determined that appointment 112AA is associated with speaker icon 114AA. Hence, the method proceeds to step 590AA, and as illustrated in FIG. 28, a sound 184AA emanates from speaker 36AA. Method 500AA ends. Similar to the example above, there may be a variety of ways to cancel the output from speaker 36AA by, for example, using exit key 46AA and pressing inward on exit key 46AA along arrow A.

Figure 29:
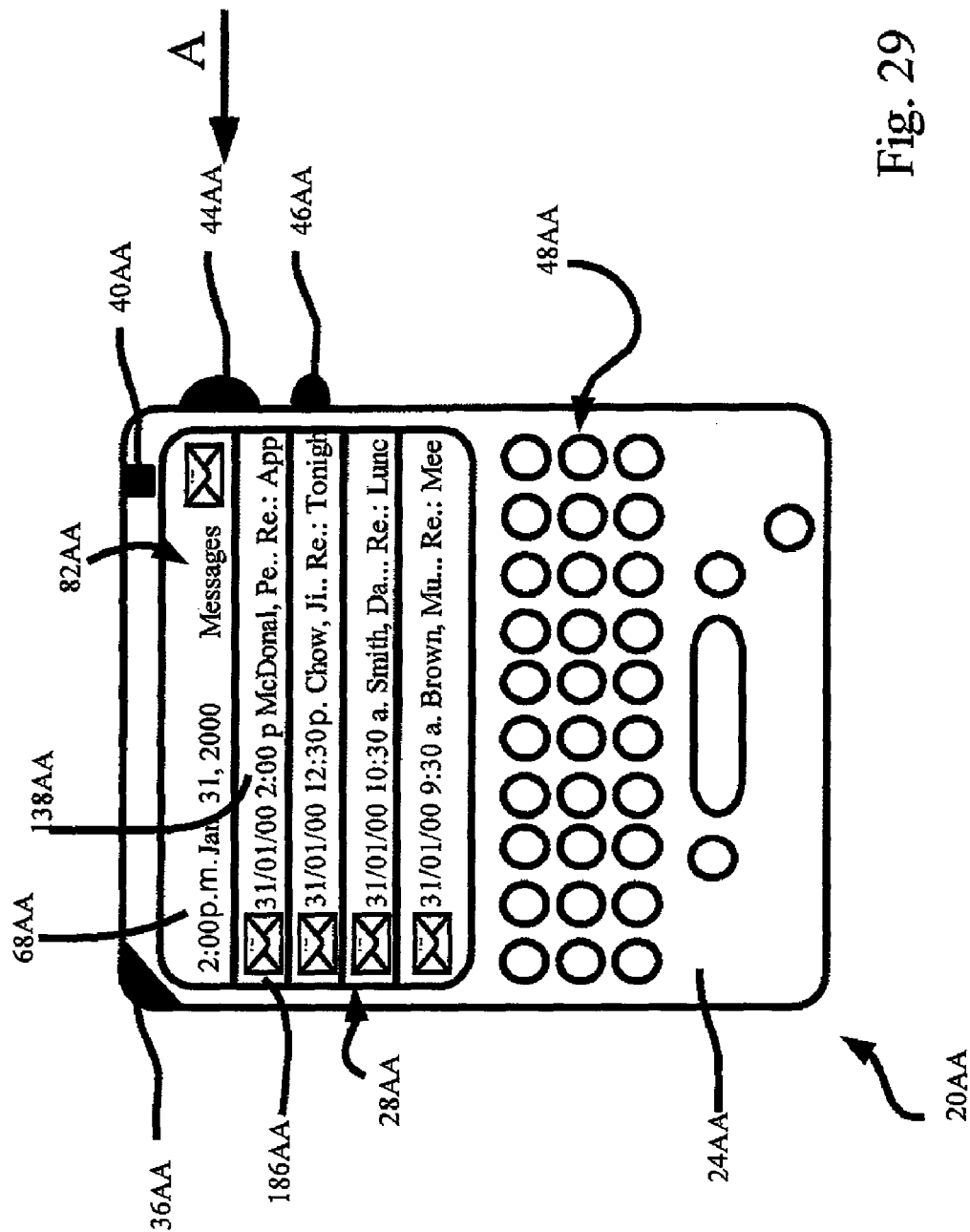
FIG. 29 shows the device of FIG. 15 with the message reader application receiving a new email at 2:00 p.m. on Jan. 31, 2000.
Figure 30:
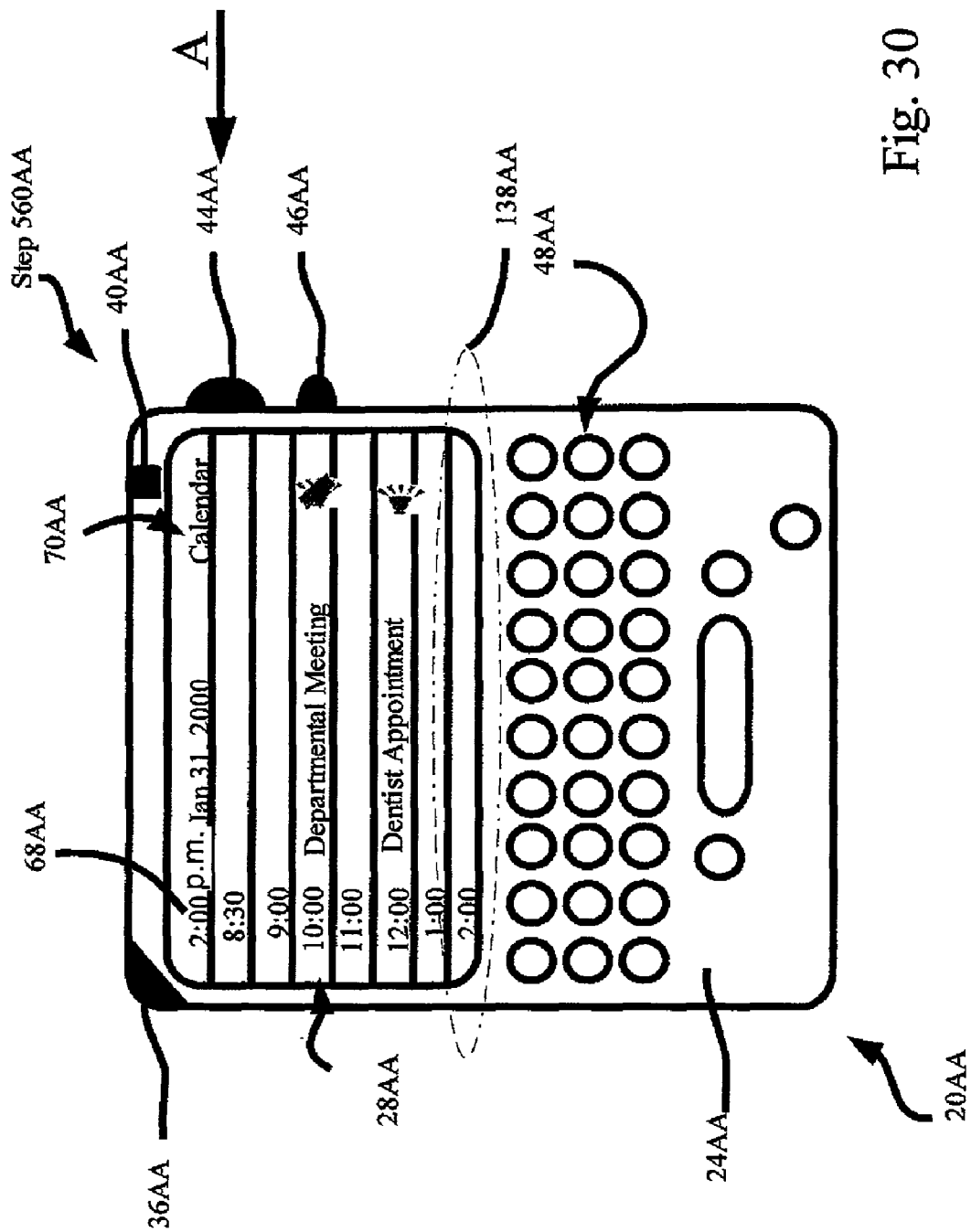
FIG. 30 shows the device of FIG. 15 with the calendar application, showing that at 2:00 p.m. on Jan. 31, 2000, the user of the device does not have any appointments scheduled.

To help even further in illustrating method 500AA, it will be assumed that device 20AA receives yet another email 186AA at 2:00 p.m., as shown in FIG. 29. As demonstrated in the flow chart in FIG. 22, information is received by device 20AA at step 550AA. In the case of the present example, and referring now to FIG. 29, the information received is email 186AA. At step 555AA, the time of receipt 138AA of the information is determined. Referring now to FIG. 29, time of receipt 138AA of email 186AA, is determined to be 2:00 p.m. At this point, method 500AA advances to step 560AA where it is determined whether time of receipt 138AA is during any of appointments marked in calendar 70AA. If time of receipt 138AA is during one of such appointments, the method then advances to step 580AA. If, however, time of receipt 138AA is not during any of these times, the method advances to step 570AA. In connection with email 186AA, and referring now to FIG. 30, it is determined that time of receipt 138AA is not during any of the appointments in calendar 70AA and the method advances to step 570AA. At step 570AA, the default notification in notification setup 74AA is determined. If the mode of notification is set to audible mode 116AA, the method would proceed to step 590AA and sound 184AA would emanate from speaker 36AA. If, on the other hand, the mode of notification was set to inaudible mode 120AA, the method would proceed to step 595AA and flashing light 180AA would emanate from LED indicator 40AA. For the purposes of the example with email 186AA, it is assumed that notification setup 74AA is configured as shown in FIG. 19. Referring back to FIG. 19, because checkmark 124AA is associated with audible mode 116AA the default mode of notification is audible. The method, thus, proceeds to step 590AA and sound 184AA emanates from speaker 36AA.

Although, in the above examples, the information received at step 550AA of method 500AA were incoming emails 178AA, 182AA and 186AA, it will be understood that information received at step 550AA could be any type of information including an alarm from daily alarm 86AA. If for example, "Time" 170AA was set to a time during appointment 104AA, light 180AA would emanate from LED indicator 40AA. Similarly if, "Time" 170AA was set to a time during appointment 112AA, sound 184AA would emanate from speaker 36AA and if, "Time" 170AA was set to a time outside of either appointments 104AA or 112AA, sound 184AA would emanate from speaker 36AA.

Referring now to FIG. 31, an electronic device for modifying notifications in accordance with another embodiment is indicated generally at 20AAa. Device 20AAa is substantially the same as device 20AA and like elements of device 20AAa bear the same reference characters, but followed by the suffix "a". Device 20AAa is shown in FIG. 31 displaying different notification profiles 110AAa using the application called notification setup 74AAa. However, unlike notification setup 74AA where the only choices for notification were audible and inaudible, notification setup 74AAa, allows users to customize their methods of notification. Notification setup 74AAa comprises a plurality of notification profiles 110AAa, which in the present embodiment have been labeled Quiet 200AA, Discreet 204AA, and Loud 212AA. Each of these profiles 110AAa can be customized by the manufacturer or by the user according to user preference. Profiles 110AAa can also be deleted and additional profiles can be added as desired. Table I shows how each profile 110AAa can be customized.

TABLE I

An Example of Customizing Methods of Notification

| Mode of Notification (Profiles 110AAa) | Application | Notification Behavior |
| --- | --- | --- |
| Quiet 200AA | Message Reader | Type: Inaudible Tune: None Volume: Mute |
|  | Daily Alarm | Type: Audible Tune: Ring 2 Volume: Low |
| Discreet 204AA | Message Reader | Type: Audible & Inaudible Tune: Ring 3 Volume: Medium |
|  | Daily Alarm | Type: Audible Tune: Ring 1 Volume: Low |
| Loud 212AA | Message Reader | Type: Audible Tune: Ring 5 Volume: High |
|  | Daily Alarm | Type: Audible Tune: Ring 6 Volume: High |

Referring now to FIG. 31, checkmark 124AAa, located beside the profile Discreet 204AA, indicates that the default mode of notification for the present example is Discreet 204AA. Trackwheel 44AAa can be used to scroll through the different profiles 110AAa and to select a particular profile 110AAa. Notification setup 74AAa can also be used to customize each profile 110AAa.

As illustrated in Table I, each profile can give rise to a different notification output for various applications on device 20AAa, and notification behavior can be customized according to a variety of criteria, such as "type", "tune" and "volume". "Type" can be either audible or inaudible. Audible means a sound emanating from speaker 36AAa and inaudible means a light flashing from LED indicator 40AAa. "Tune" can be any tune chosen by the manufacturer or the user and programmed into device 20AAa. This is the tune that would be played by speaker 36AAa when "type" is set to audible. "Volume" determines the volume of the tune and in the present embodiment can be low, medium or high.

Figure 31A:
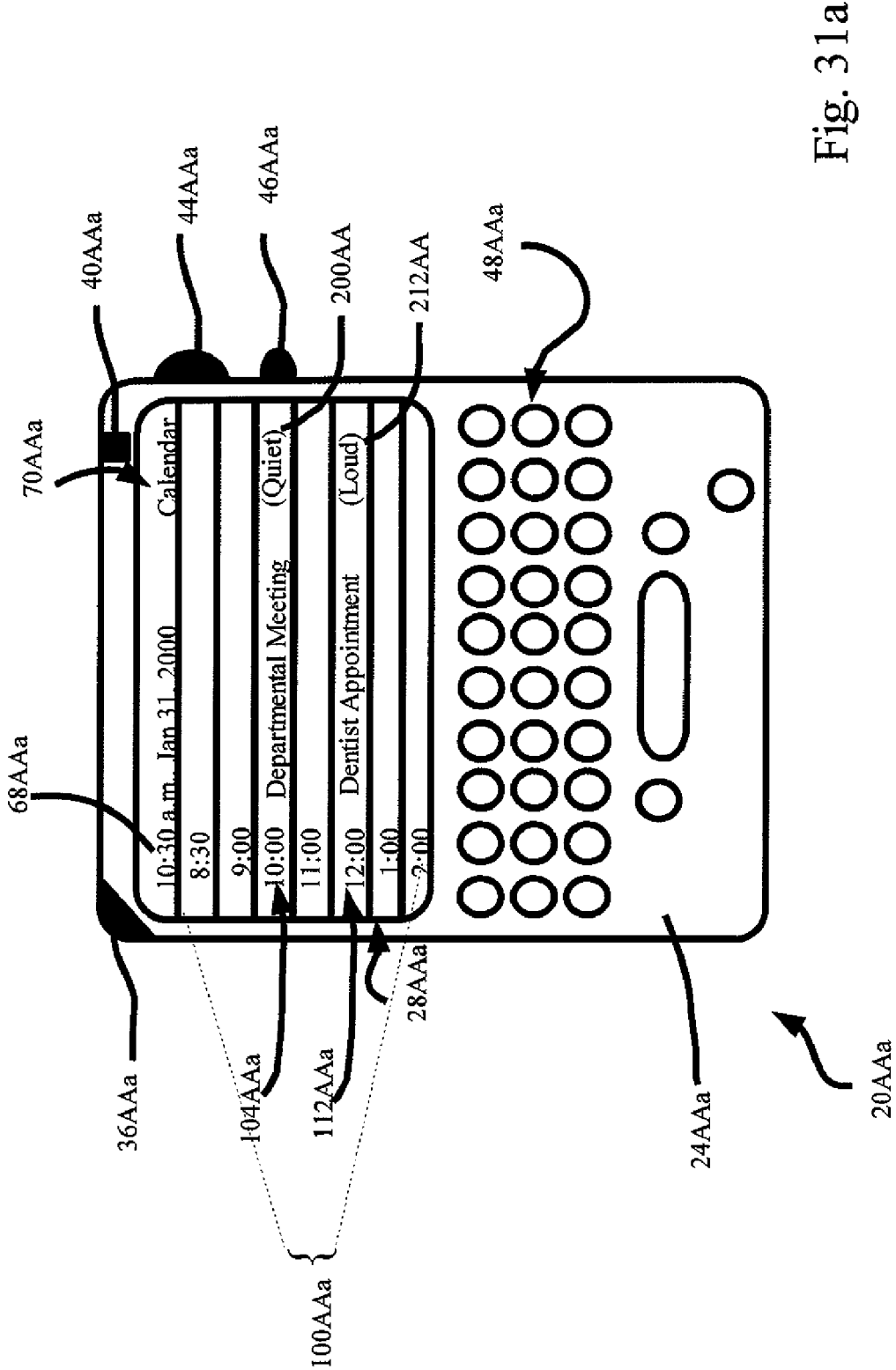
FIG. 31a shows the device of FIG. 31 with the calendar application displaying a plurality of individual appointments for the date of Jan. 31, 2000.

In operation, during appointment 104AAa, the profile Quiet 200AA would be in effect. Referring now to FIG. 31a, the application calendar 70AAa has a series of appointments 100AAa. Appointment 104AAa is associated with the profile Quiet 200AA, and appointment 112AAa is associated with the profile Loud 212AA. It should now be apparent that whereas in device 20AA, each calendar appointment 100AA had either a "speaker icon" 108AA or a "no-speaker icon" 114AA associated with it, in device 20AAa, each appointment, can have a particular profile 110AAa associated with it, instead. This is illustrated in FIG. 31a, where appointment 104AAa is associated with the profile Quiet 200AA and appointment 112AAa is associated with the profile Loud 212AA.

It will be apparent to those skilled in the art that Table I is just one example of the way in which notifications can be customized. Furthermore, the specific types, tunes and volumes outlined in Table I are not particularly limited. Also the list of specific applications associated with each mode is not particularly limited and can match the complete set of applications on device 20AAa.

As seen in Table I, if message reader 82AAa was to receive an email during appointment 104AAa which is associated with the profile Quiet, the output notification would be inaudible, with no tune or volume and light would emanate from LED indicator 40AAa. Similarly, if daily alarm 86AAa w as to go off during appointment 104AAa, the output notification would be a low volume sound corresponding to a tune called "ring 2", emanating from speaker 36AAa.

Figure 32:
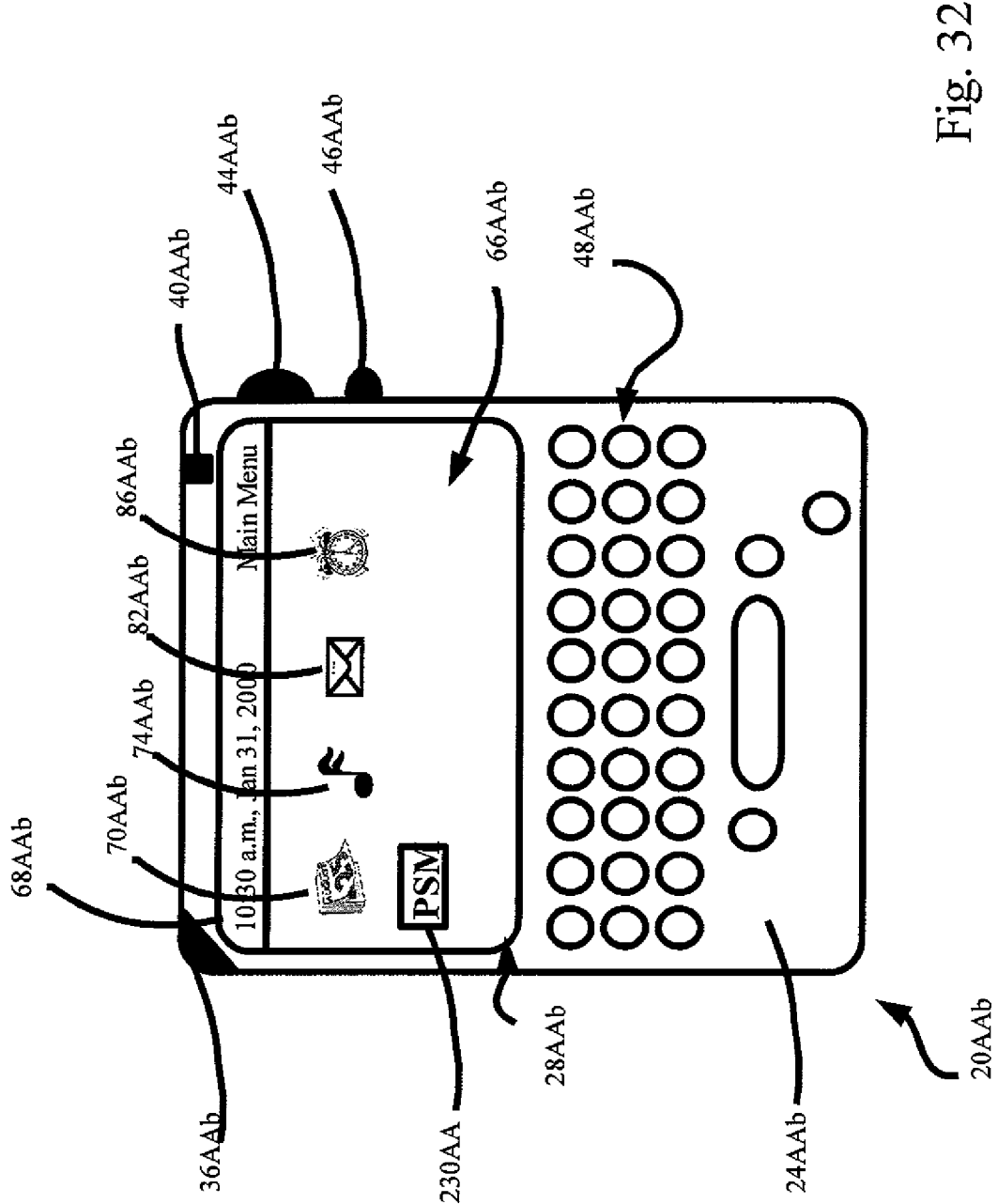
FIG. 32 is a schematic representation of yet another embodiment with the main menu screen displaying a plurality of applications including an application called profile string matcher, as well as the calendar, notification setup, message reader and daily alarm applications.

In another embodiment, and referring now to FIG. 32, an electronic device for modifying notifications in accordance with another embodiment is indicated generally at 20AAb. Device 20AAb is substantially the same as device 20AAa and like elements of device 20AAa and device 20AAb will bear the same reference characters, but followed by the suffix "b" instead of suffix "a". In FIG. 32, device 20AAb is shown with a main menu screen 66AAb, displaying an application called profile string matcher 230AA, as well as calendar 70AAb, notification setup 74AAb, message reader 82AAb and daily alarm 86AAb.

Figure 33:
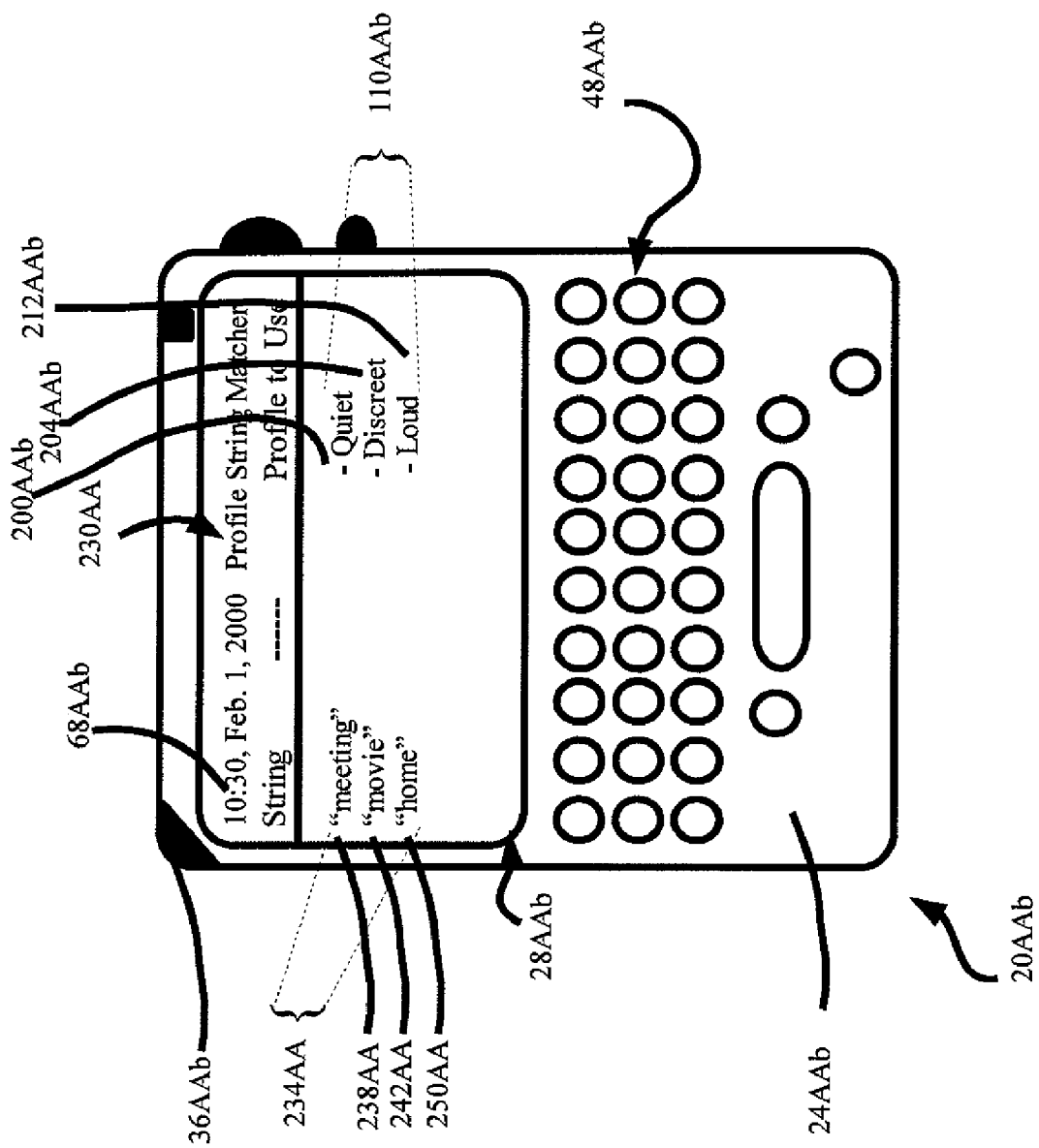
FIG. 33 shows the device of FIG. 32, with the profile string matcher application displaying a plurality of strings, each associated with a different mode of notification.

Referring now to FIG. 33, device 20AAb is shown displaying a list of strings 234AA, associated with a different notification profile 110AAb, using the application called profile string matcher 230AA. List 234AA contains a plurality of individual strings 238AA, 242AA and 250AA, each associated with a notification profile 110AAb. As illustrated in FIG. 33 string 238AA is the word "meeting" and is associated with the profile "Quiet" 200AAb. String 242AA is the word "movie" and is associated with the profile "Discreet" 204AAb. Finally string 250AA is the word "home" and is associated with the profile "Loud" 212AAb.

Figure 34:
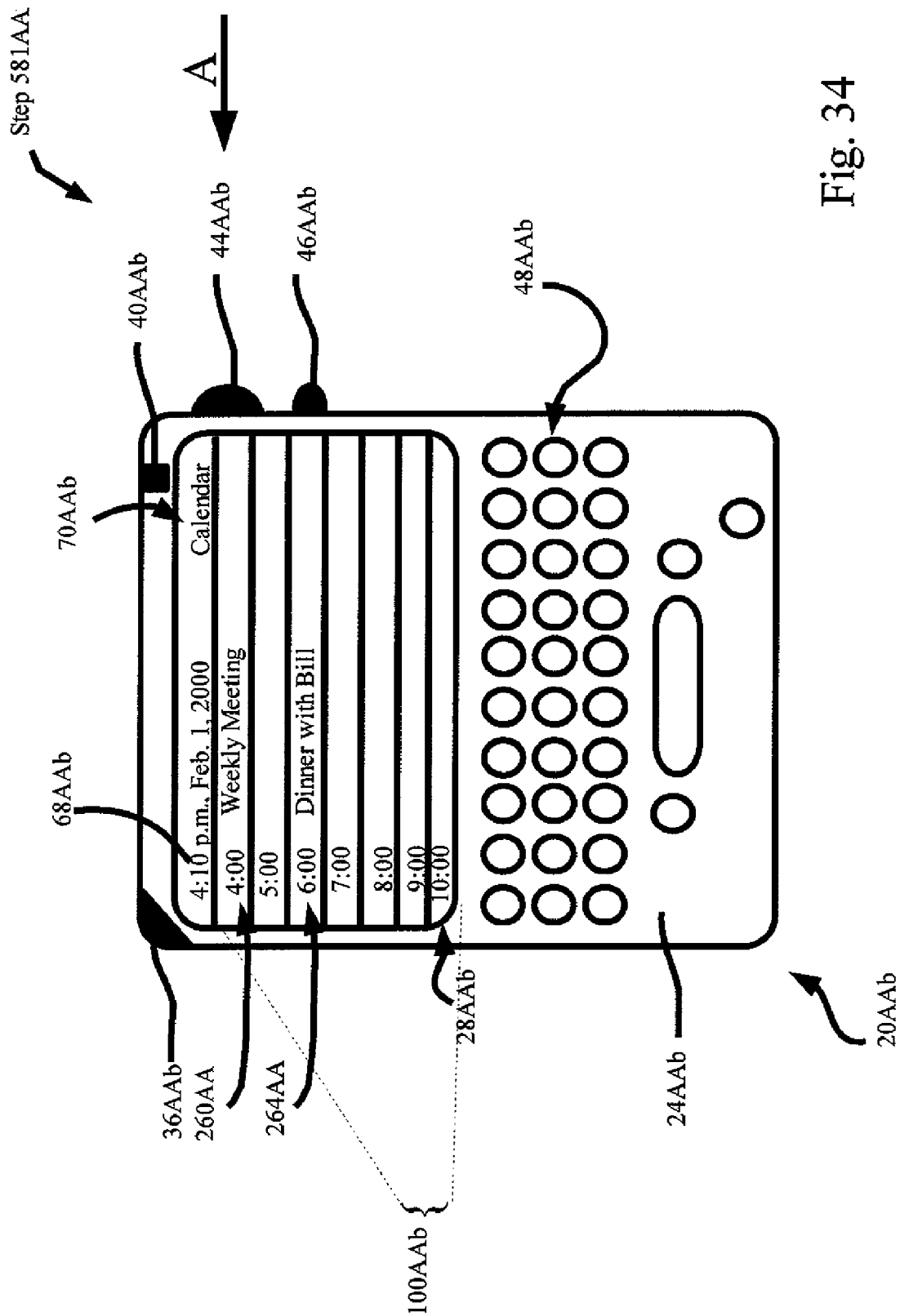
FIG. 34 shows the device of FIG. 32, with the calendar application displaying a plurality of individual appointments for Feb. 1, 2000.

Referring now to FIG. 34, device 20AAb is shown displaying the day's schedule 100AAb for Feb. 1, 2000 using the application called calendar 70AAb on display 28AAb. Schedule 100AAb includes a plurality of individual appointments 260AA and 264AA. As illustrated in FIG. 34, appointment 260AA is "weekly meeting", from 4:00-5:00 p.m., and appointment 264AA is "dinner with Bill", from 6:00-7:00 p.m. Calendar 70AAb also displays a clock 68AAb that shows the current date and time.

A method for modifying notifications in accordance with another embodiment will now be discussed with reference to the flow chart shown in FIG. 35 and is indicated generally at 500AAb. In order to assist in the explanation of method 500AAb, reference will be made to the foregoing discussion of device 20AAb. In order to further assist in the explanation of method 500AAb, the sequence of steps in method 500AAb shall be followed in connection to a series of examples using device 20AAb. In these examples, it will be assumed that device 20AAb receives a series of emails at different times during the day.

Figure 35:
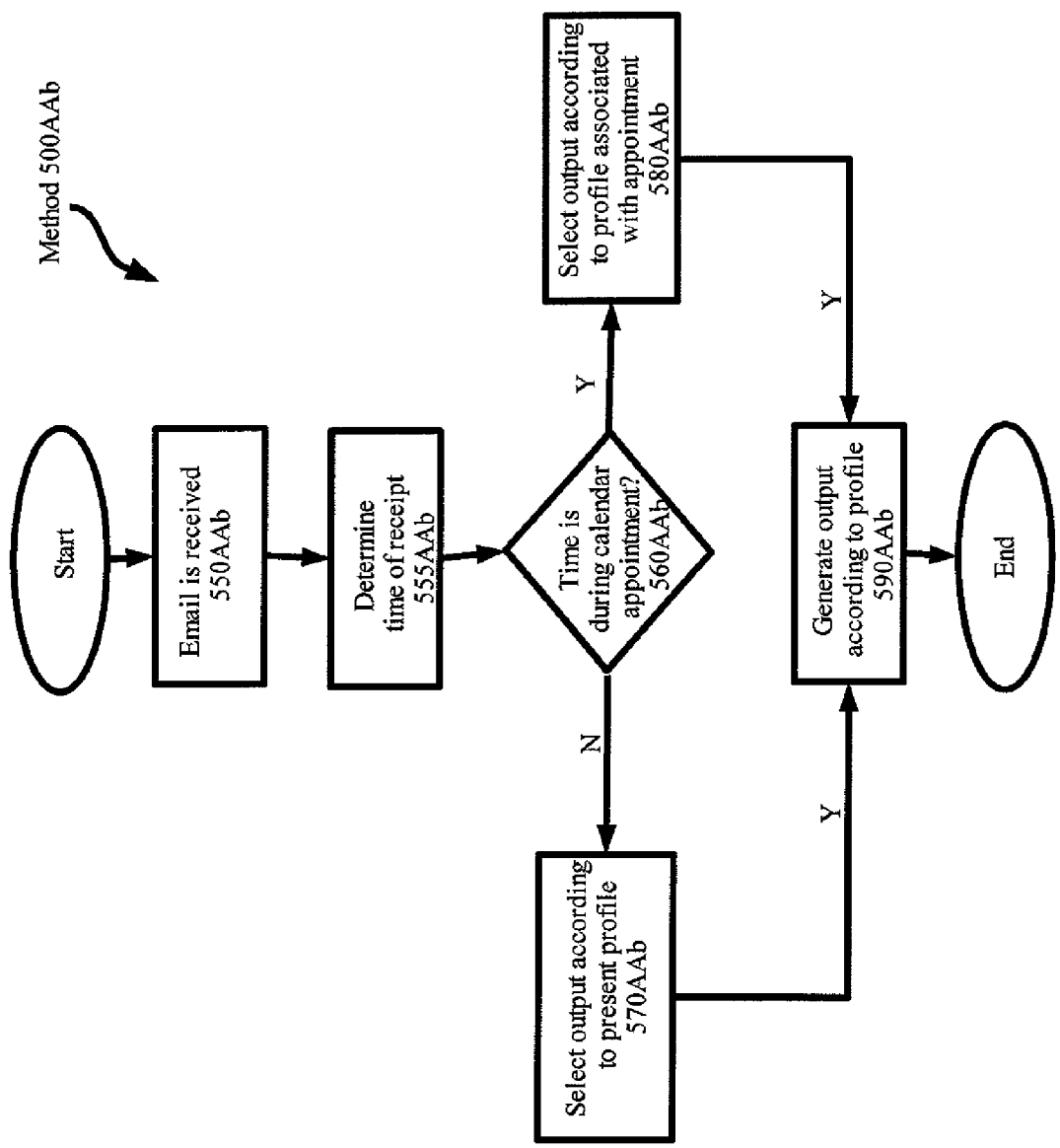
FIG. 35 shows a flow chart depicting a method for modifying notification settings in accordance with another embodiment.
Figure 36:
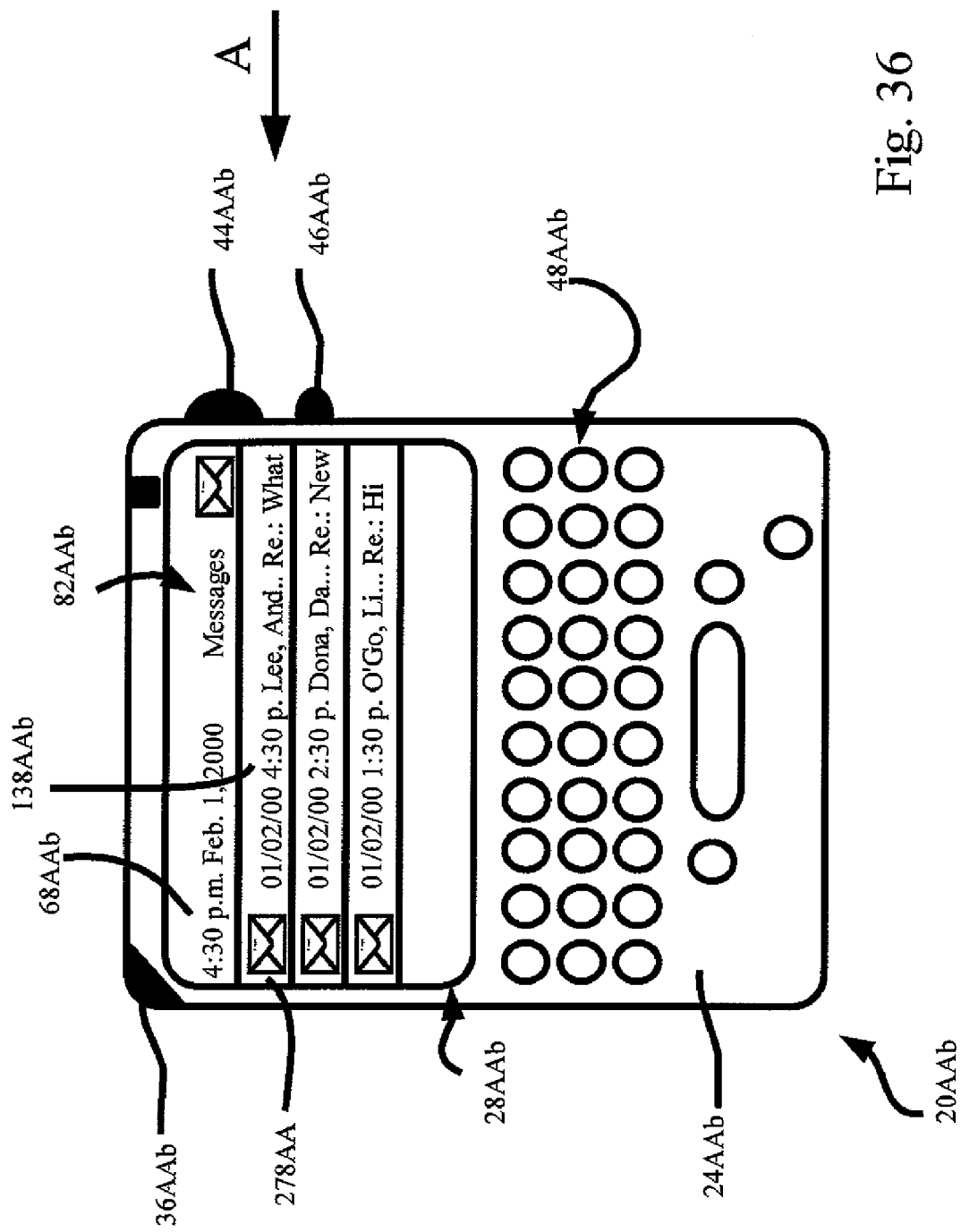
FIG. 36 shows the device of FIG. 32 with the message reader application having received a new email at 4:30 p.m. on Feb. 1, 2000.

As demonstrated in the flow chart in FIG. 35, emails are received by device 20AAb at step 550AAb. In one example, and referring now to FIG. 36, it is to be assumed that one of the emails received by device 20AAb is email 278AA. Email 278AA is sent by Andrea Lee at 4:30 p.m. on Feb. 1, 2000 and is not marked urgent. At step 555AAb, the time of receipt 138AAb of the information is determined. Referring now to FIG. 36, time of receipt 138AAb of email 278AA is determined to be 4:30 p.m. At this point, the method advances to step 560AAb where it is determined whether time of receipt 138AAb is during any of the appointments marked in calendar 70AAb. If time of receipt 138AAb is during one of such appointments, the method then advances to step 580AAb. However, if time of receipt 138AAb is not during any of these appointments, the method advances to step 570AAb. In connection with email 278AA, and referring now to FIG. 37, it is determined that time of receipt 138AAb is during appointment 260AA. The method, thus, advances to step 580AAb. At step 580AAb, the mode of notification according to a profile selected from notification setup 74AAb is determined.

Figure 38:
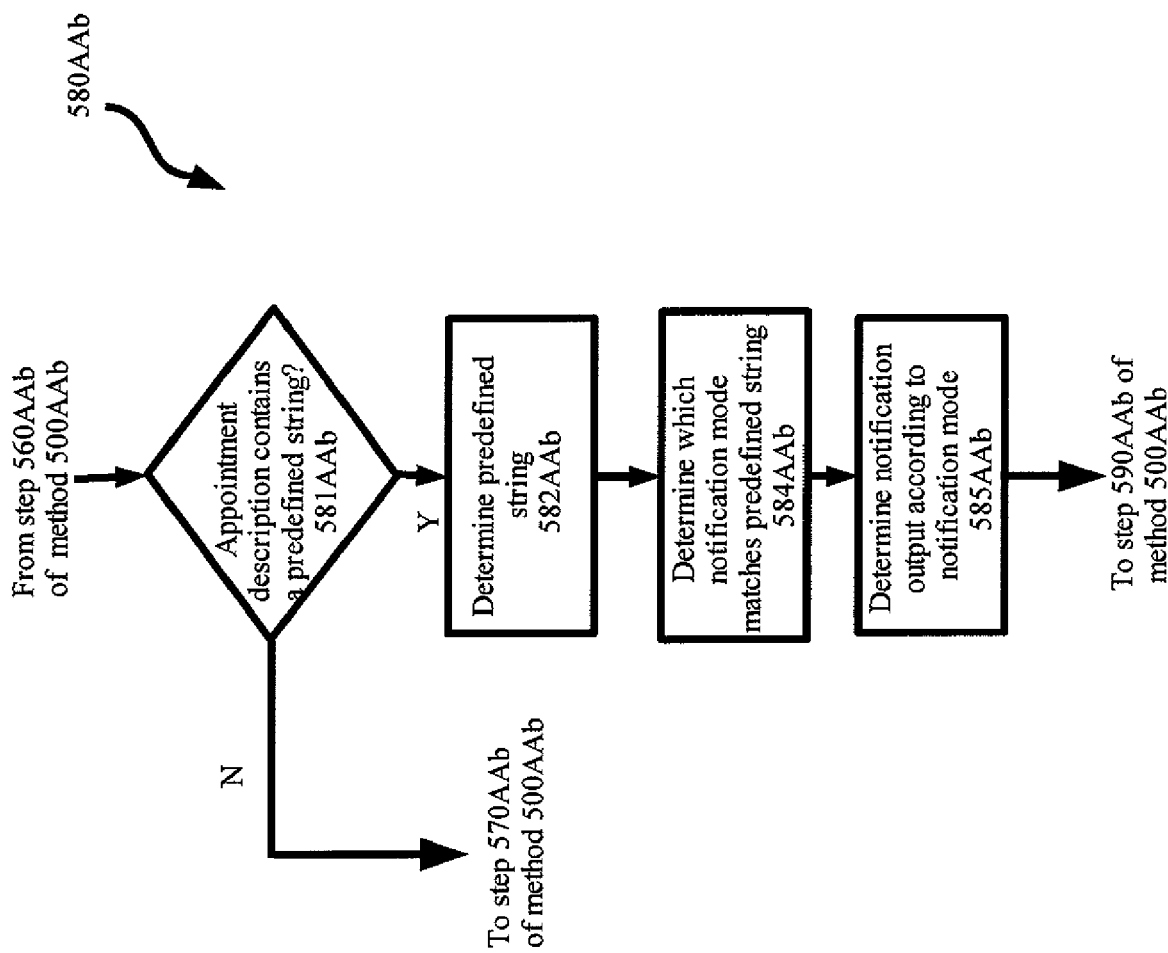
FIG. 38 shows a flow chart depicting a set of substeps that can be used to perform one of the steps shown in FIG. 35.

Step 580AAb "select output according to profile associated with appointment" of method 500AAb can be performed in a variety of ways, one example of which is demonstrated in a number of sub-steps in FIG. 38. At step 581AAb, it is determined whether the appointment, with which time of receipt 138AAb is associated, includes any of the strings on list 234AA of profile string matcher 230AA, outlined in FIG. 19. If the description of the appointment includes one of the strings on list 234AA, the method advances to step 582AAb, where the type of notification corresponding to the matched string is determined. If, on the other hand, the description of the appointment does not include one of the strings on list 234AA, the method advanced to step 570AAb, where the mode of notification is defined according to the default mode of notification per notification setup 74AAb.

Figure 37:
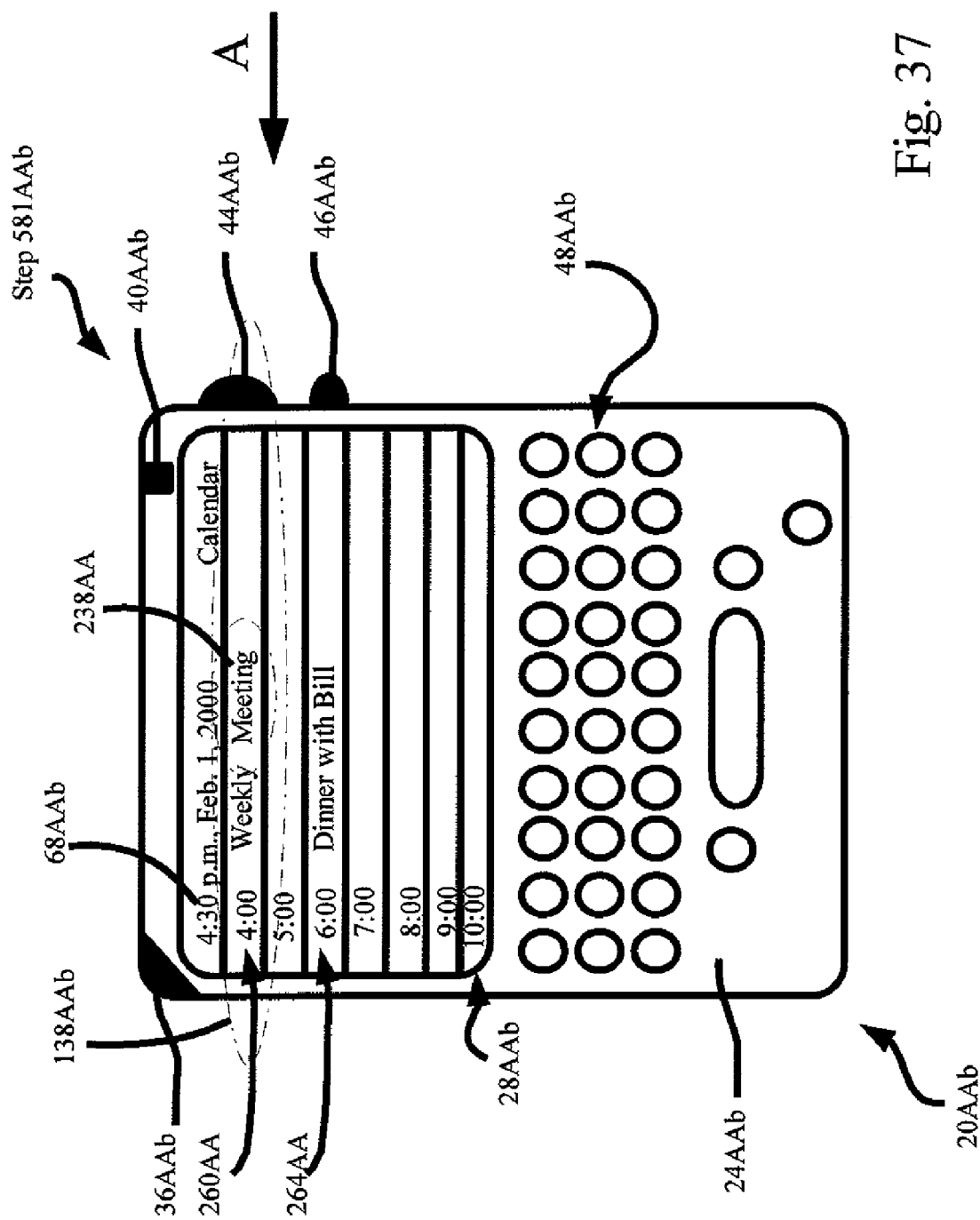
FIG. 37 shows the device of FIG. 32 with the calendar application, showing that the description of the appointment at 4:30 p.m. includes the word "meeting"
Figure 39:
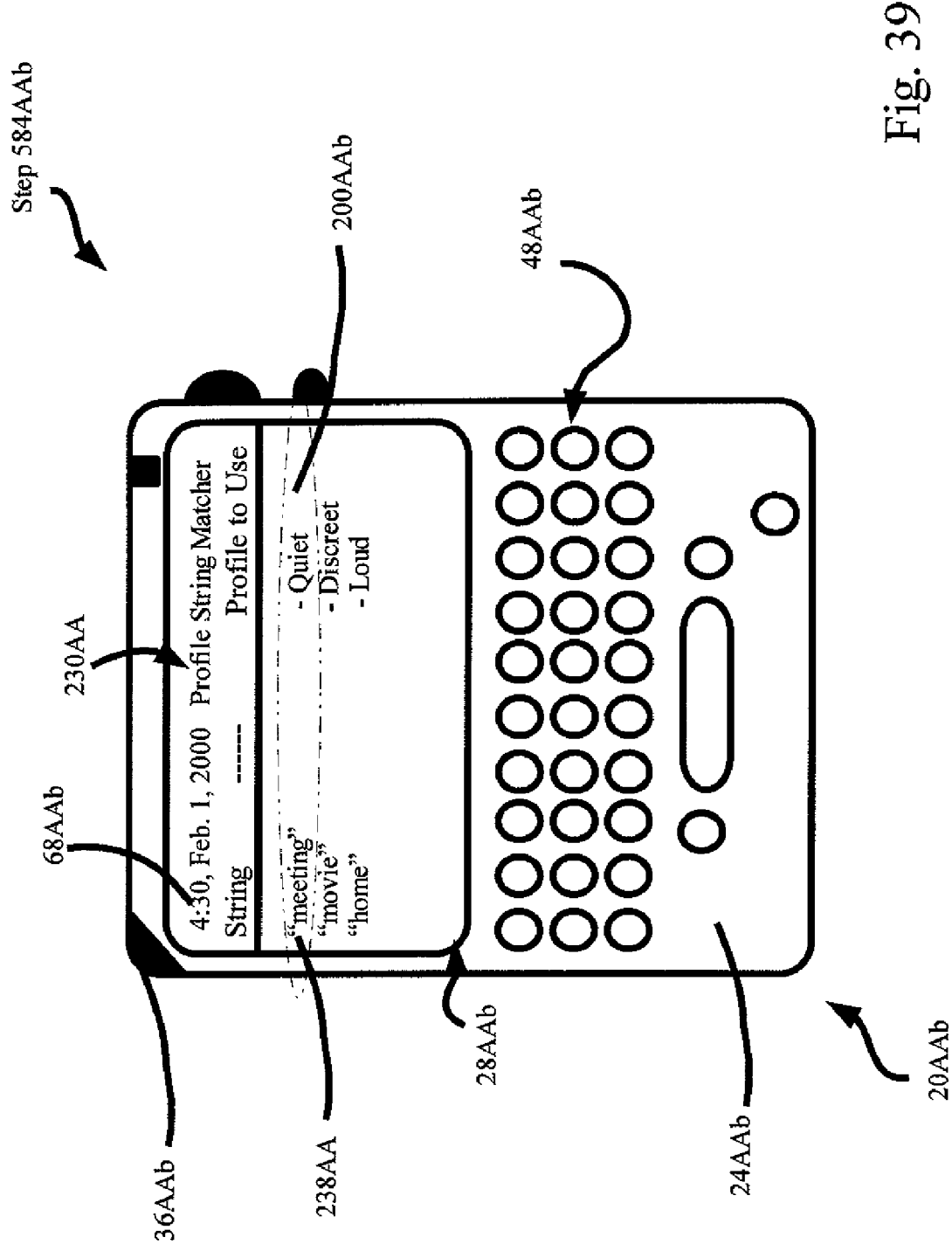
FIG. 39 shows the device of FIG. 32 with the profile string matcher application showing that the string "meeting" is associated with the profile "Quiet".

Referring now back to FIG. 37, at step 581AAb, it is determined that the description of appointment 260AA includes one of the strings on list 234AA. The method then advances to step 582AAb where "weekly meeting" contains the word "meeting", which matches string 238AA. The method then advances to step 584AAb where, referring now to FIG. 39, it is determined that the notification profile associated with string 238AA is the profile Quiet 200AAb. Once the notification profile is determined, the method then advances to step 585AAb where notification behavior is determined. For the purposes of this example, it is assumed that the modes of notification in this embodiment have been defined in accordance with Table I. In the case of the profile Quiet 200AAb, when there is an email received by message reader 82AAb, the notification is described as inaudible, with no tune or volume. Accordingly, at step 590AAb light emanates from LED indicator 40AAb, indicating the receipt of email 278AA. Method 500AAb then ends.

Figure 40:
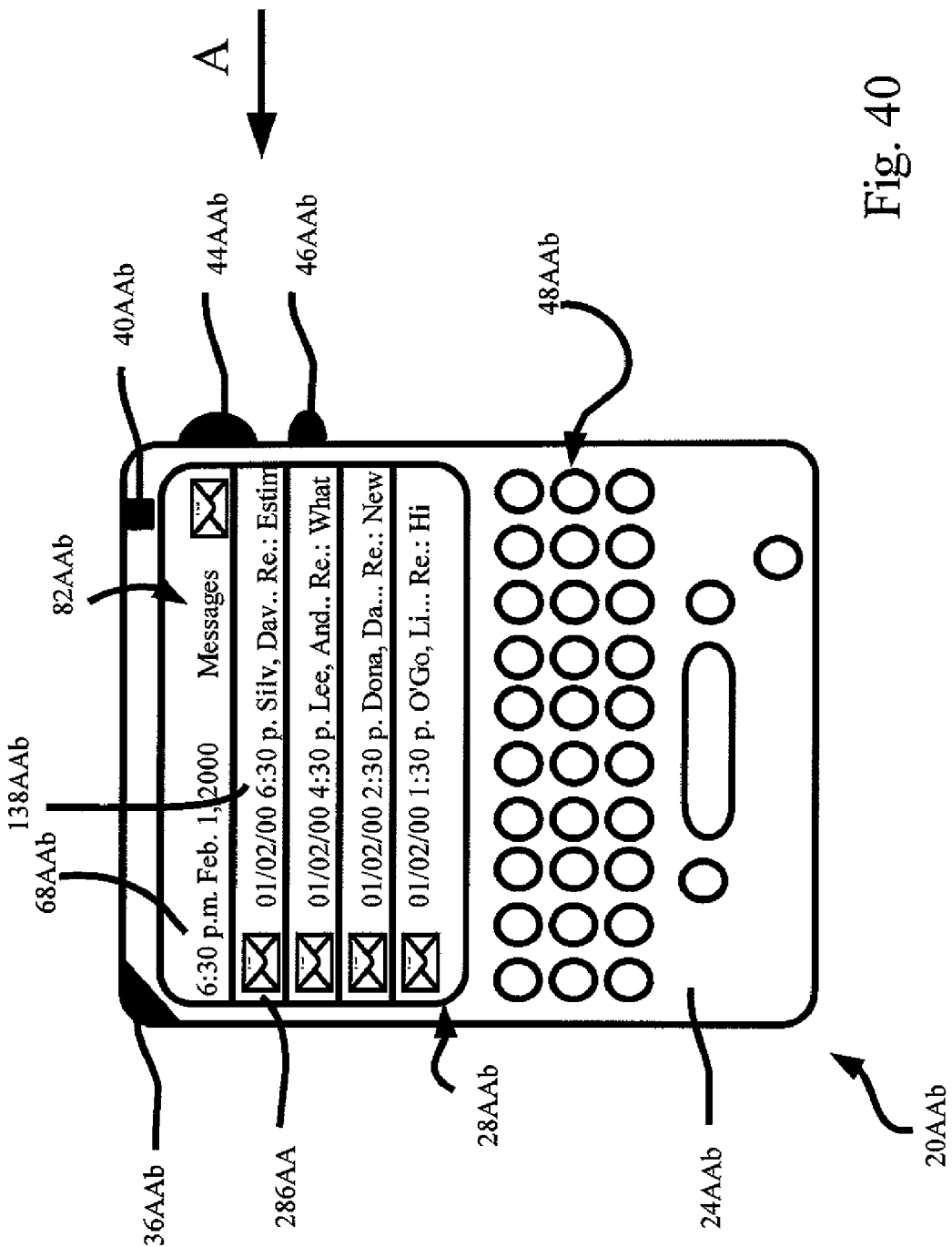
FIG. 40 shows the device of FIG. 32 with the message reader application having received a new email at 6:30 p.m. on Feb. 1, 2000.
Figure 41:
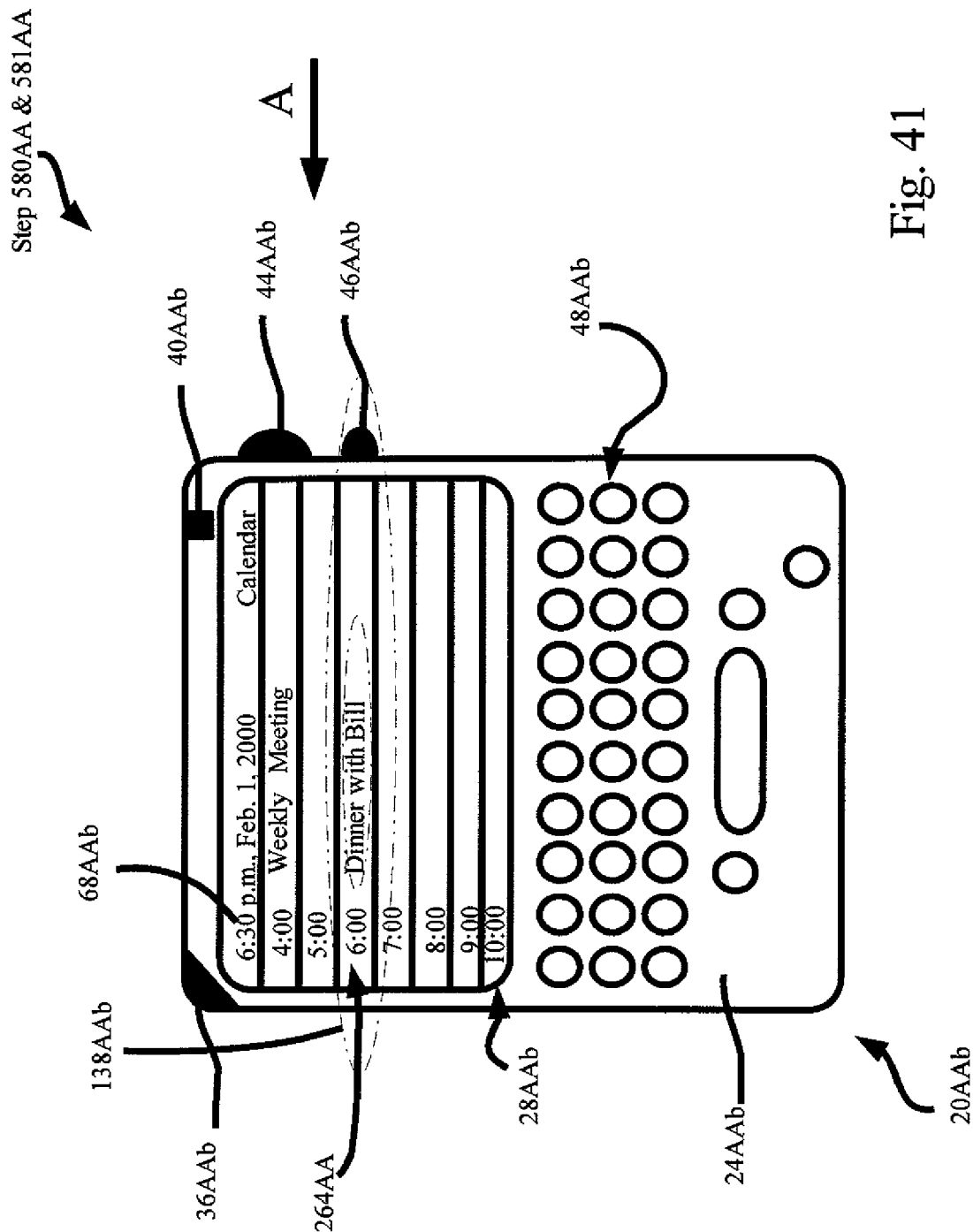
FIG. 41 shows the device of FIG. 32 with the calendar application showing that at 6:30 p.m. the user is scheduled to have dinner with Bill.

Method 500AAb will thus operate according to the receipt of different emails and during different appointments. For example, and referring now to FIGS. 40 and 41, it will be assumed that device 20AAb receives email 286AA at 6:30 pm, which is during appointment 264AA. Since appointment 264AA does not contain any of the strings on list 234AA, then during the performance of method 500AAb the method will advance to step 570AAb and device 20AAb will rely on the default notification profile established according to notification setup 74AAb. Assuming that notification setup 74AAb is similar to notification setup 74AAa and is set to the profile Discreet 204AA as illustrated in FIG. 31, the method advances to step 590AAb where device 20AAb generates output according to specifications of the profile Discreet 204AA in Table I and results in a flashing of light from LED indicator 40AAb and a medium volume sound corresponding to a tune called "ring 3" from speaker 36AAb.

Figure 42:
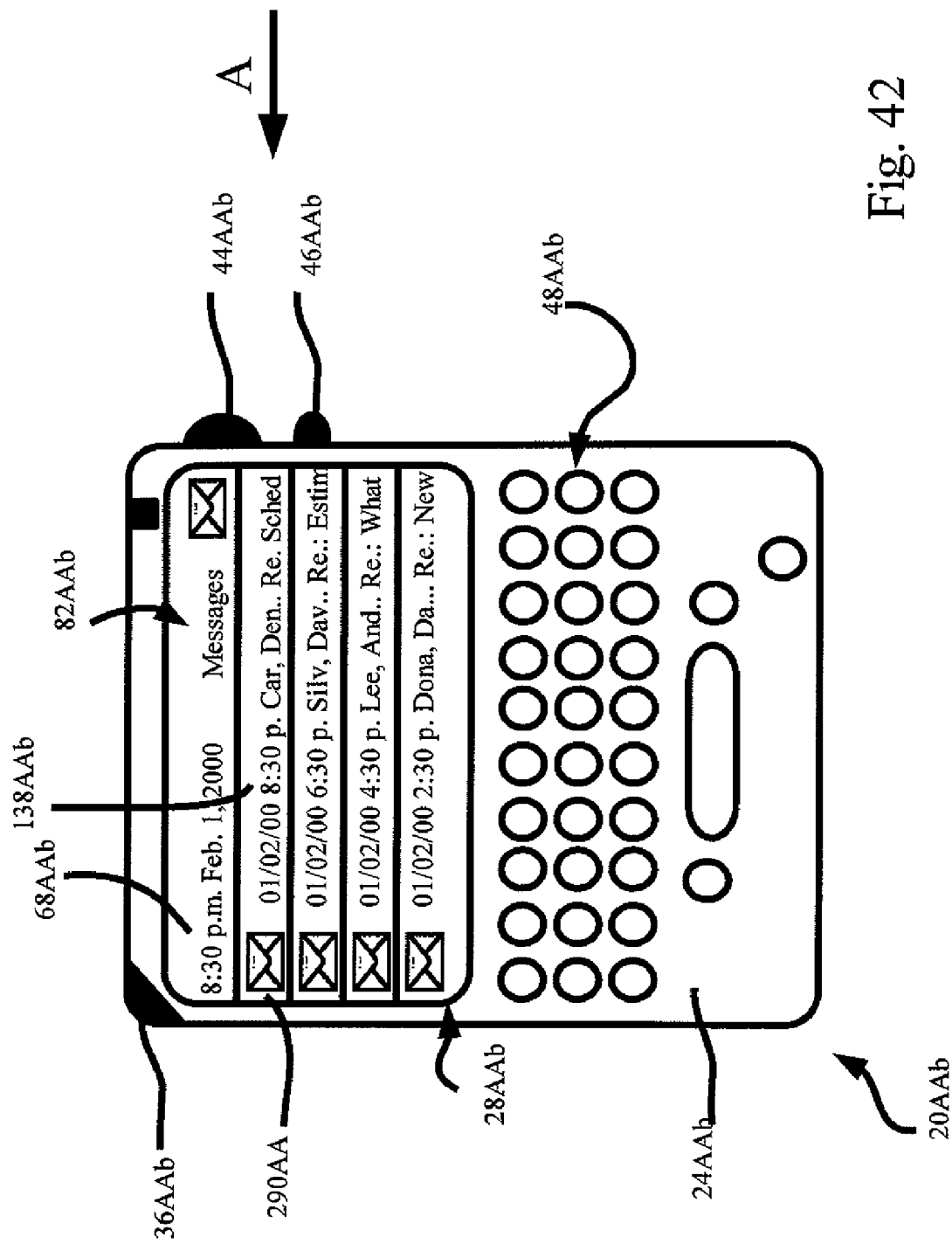
FIG. 42 shows the device of FIG. 32 with the message reader application having received a new email at 8:30 p.m.
Figure 43:
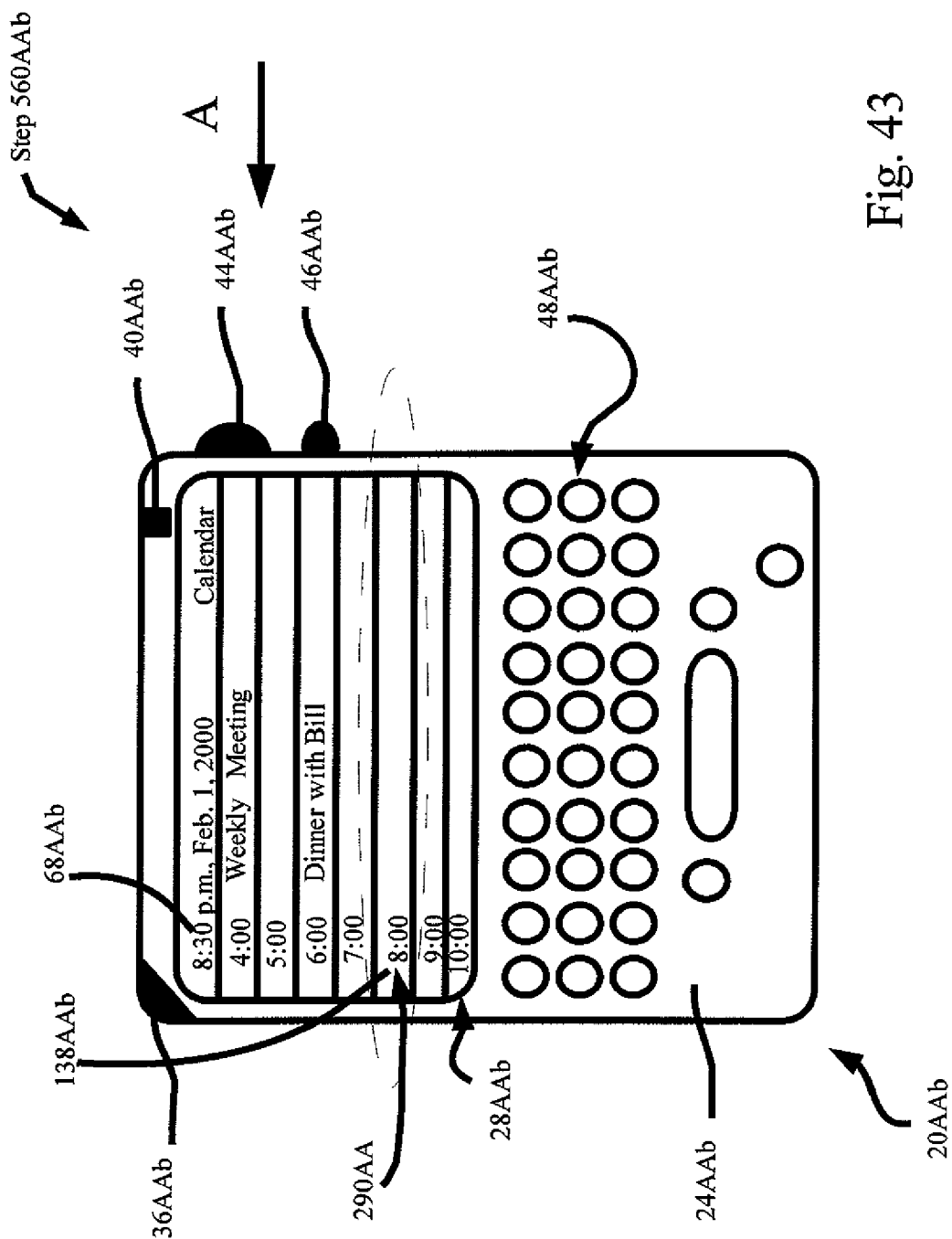
FIG. 43 shows the device of FIG. 32 with the calendar application having no appointments scheduled at 8:30 p.m.

To further illustrate, and referring now to FIGS. 42 and 43, it is assumed that device 20AAb receives yet another email 290AA at 8:30 p.m., which is not during any of the appointments in schedule 100AAb. By now it should be apparent to the reader that device 20AAb would go through each of steps 550AAb to 560AAb of method 500AAb to determine that time of receipt 8:30 is not during any of the appointments in calendar 70AAb. The method would then advance to step 570AAb where output is selected according to the profile selected in notification setup 74AAb. Assuming, as we did before, that notification setup 74AAb is similar to, and is set up as in, notification setup 74AAa, the receipt of email 290AA results in a flashing of light from LED indicator 40AAb and a medium volume sound corresponding to a tune called "ring 3" from speaker 36AAb.

In general it should now be apparent that instead of a user specifically having to configure a different notification for every individual appointment or for every criteria within that individual appointment, rules can be established by a user, or the manufacturer of the device, such that the device recognizes certain keywords or strings within the description of the individual appointment, and/or within the description of information received by the device and signals a particular method of notification. For example the electronic device can be configured to be silent during all appointments that contain the word "business meeting" or "movies" and to signal/beep quietly when the appointment is over. At the same time, it could, also, be configured to vibrate if the information received is an email or voicemail marked urgent within any appointments which contain the words "business meeting" or "movies" in the description of the appointment.

While the teachings herein are directed to specific embodiments, it will be understood that subsets and variations of the embodiments are within the scope of the invention. For example, it is to be understood that the receiving of emails is merely an example of an application that can generate a notification. Other examples of information that can be received by a device include, telephone calls, faxes, voicemail messages, notification of appointments, daily alarm notifications, warning messages from the device in connection to its operation, such as "low battery" messages, or any other set of information for which a notification may be of use.

It is also contemplated that notifications can consist of a variety of audible, inaudible, vibrating and combinations of audible, inaudible and vibrating modes of notification. Audible modes of notification can include software sounds with a plurality of different frequencies and pitch. They can consist of different melodies and songs or they can be connected to the radio amongst many other possibilities. Similarly inaudible modes of notification include a variety of possibilities, such as a plurality of vibrations with varying intensities, plurality of colors of flashing and non-flashing lights and pop-up screens on the displays of computers, cell phones, personal digital assistants and etc. The different modes of notification, or combinations thereof can be predefined by the manufacturer of the electronic device or arbitrarily selected and added on by the user.

It is also contemplated that an electronic device can be configured to use different modes of notification depending on a variety of criteria. For example an electronic device can be configured to have one mode of notification if emails are received during a particular calendar event and a second mode of notification if the alarm goes off, or a voice mail is received, during the same calendar event. An electronic device could be further configured to have a different mode of notification if the email or voicemail is marked urgent or if the voice mail is from a certain person or area code. An electronic device could be configured to simply shut off all modes of notification during certain appointments and/or it could be configured to notify the user of receiving the information after the appointment is over. In general, an electronic device could be configured to have different modes of notification for different calendar events and even within each calendar event, the electronic device can be configured to have different modes of notification based on a plurality of other criteria, such as the type of information received, when and during which calendar event the information was received, by whom the information was sent, whether the information was marked urgent or whether the information was received with certain other attributes.

In general, it is contemplated that rules can be established based on any type of information related to an individual appointment or information received by the device. For example, the electronic device can be configured to vibrate softly during all appointments between 6:00 p.m. to 10:00 p.m. and to be silent regardless of what type of information is received between 10:00 p.m. to 8:00 a.m., unless the information is a long distance phone call from a predefined person, in which case the device could ring loudly.

It is also contemplated that the device could change its method of notification based on the physical orientation of the device, such as whether it has a clamp shell that is opened or closed or whether it is being placed on a user's belt or on a device crib. For example, a device could be configured to vibrate softly if the device is out of the cradle and to have the LED indicator flashing when the device is in the cradle.

The invention claimed is:

1. An electronic device for receiving live communications comprising:
 a microcomputer configured to execute an application for scheduling a calendar event; said calendar event having a notification profile associated therewith; said microcomputer further configured to process said notification profile to determine whether to accept a live communication during said scheduled calendar event; said microcomputer further arranged to execute a separate notification profile settings application to enable a user to associate with said calendar event a notification criterion; said notification criterion including a string of text that is established by a user; said notification criterion indicative of said notification profile associated with said calendar event; said notification profile being defined within said separate notification profile settings application; such that said notification profile is selected by said microcomputer based on said string of text appearing in said calendar event.

2. The device of claim 1 wherein if said live communication is not accepted during said scheduled calendar event then said communication is directed to a message application.

3. The device of claim 2 wherein said message application is a voicemail application.

4. The device of claim 1 wherein said live communication is selected from the group consisting of a voice telephone call, an instant message service message, and a push-to-talk call.

5. The device of claim 1 wherein said notification profile for said scheduled calendar event is additionally based on at least one criterion that is associated with said live communication.

6. The electronic device of claim 1 wherein said device is selected from the group consisting of a cell phone, a smart telephone, a desktop computer or a laptop having telephony equipment, a personal digital assistant with cell phone features, and a personal digital assistant with wireless broadband communications.

7. An electronic device for receiving live communications comprising:
 a microcomputer configured to execute an application for scheduling a calendar event; said calendar event having a notification profile associated therewith; said microcomputer further configured to processing said notification profile to determine whether to accept a live communication during said scheduled calendar event; said microcomputer further arranged to execute a separate notification profile settings application to enable a user to associate with said calendar event a notification criterion; said notification criterion indicative of said notification profile associated with said calendar event; said notification profile being defined within said separate notification profile settings application; wherein if said live communication is not accepted during said scheduled calendar event then said communication is directed to a message application; wherein said microcomputer is operable to execute said voicemail application and said electronic device includes a storage device for storing said communication when said communication is directed to said voicemail application.

8. A method for modifying behaviour of an electronic device for receiving live communications comprising:
 executing an application in said device to schedule a calendar event;
 associating a notification profile with said scheduled calendar event;
 upon receipt of a live communication, processing the notification profile to determine whether to accept said live communication during said scheduled calendar event;
 executing a separate notification profile settings application in said device so as to associate a notification criterion with said scheduled calendar event, said notification criterion being indicative of said notification profile associated with said scheduled calendar event, said notification criterion including a string of text that is established by a user; said notification profile being defined within the separate notification profile settings application; wherein said notification profile is selected based on said string of text appearing in said calendar event.

9. The method of claim 8, including executing the separate notification profile settings application so as to select as said notification criterion for the scheduled calendar event one of a plurality of notification criteria, said plurality of criteria being indicative of different, respective notification profiles.

10. The method of claim 8 wherein said live communication is any of a telephone call, an instant message service message or an email.

11. The method of claim 8 wherein if said live communication is not accepted then said communication is directed to a message application.

12. The method of claim 11 wherein said message application is a voicemail application.

13. The method of claim 11 wherein said notification profile for said scheduled calendar event is additionally determined from a criterion that is associated with said live communication.

* * * * *